(12) United States Patent
Yamashita et al.

(10) Patent No.: US 9,537,120 B2
(45) Date of Patent: Jan. 3, 2017

(54) POLYMER BATTERY MODULE PACKAGING SHEET AND A METHOD OF MANUFACTURING THE SAME

(75) Inventors: Takanori Yamashita, Shinjuku-Ku (JP); Masataka Okushita, Shinjuku-Ku (JP); Kazuki Yamada, Shinjuku-Ku (JP); Rikiyama Yamashita, Shinjuku-Ku (JP); Hiroshi Miyama, Shinjuku-Ku (JP); Youichi Mochizuki, Shinjuku-Ku (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 13/495,740

(22) Filed: Jun. 13, 2012

(65) Prior Publication Data
US 2012/0258353 A1 Oct. 11, 2012

Related U.S. Application Data

(60) Division of application No. 13/275,918, filed on Oct. 18, 2011, which is a continuation of application No.
(Continued)

(30) Foreign Application Priority Data

Dec. 17, 1999 (JP) .................................. 1999-358229
Jan. 20, 2000 (JP) .................................. 2000-11402
(Continued)

(51) Int. Cl.
B32B 15/20 (2006.01)
B32B 15/088 (2006.01)
(Continued)

(52) U.S. Cl.
CPC .......... *H01M 2/0275* (2013.01); *B32B 15/085* (2013.01); *B32B 15/088* (2013.01);
(Continued)

(58) Field of Classification Search
CPC  H01M 2/0275; H01M 2/0277; H01M 2/0287; H01M 10/05; Y10T 29/49114; Y10T 29/49112; Y10T 29/4911; Y10T 29/49115; Y10T 428/31692; Y10T 428/31928; Y10T 428/31681; Y10T 428/31913; Y10T 428/31678; B32B 15/20; B32B 15/088; B32B 15/085; B32B 27/16; C23C 22/05
See application file for complete search history.

(56) References Cited

U.S. PATENT DOCUMENTS 3,773,609 A   11/1973  Haruta et al.
4,002,502 A   1/1977   Bainbridge et al.
(Continued)

FOREIGN PATENT DOCUMENTS

DE   12191595 A   3/1969
JP   75037688 B   12/1975
(Continued)

OTHER PUBLICATIONS

Sep. 13, 2012 Office Action issued in U.S. Appl. No. 13/275,918.
(Continued)

*Primary Examiner* — Kevin R Kruer
(74) *Attorney, Agent, or Firm* — Oliff PLC

(57) ABSTRACT

A polymer battery module packaging sheet includes, as essential components, a base layer (61), an aluminum layer (62), chemical conversion coatings (64*a*, 64*b*) coating the opposite surfaces of the aluminum layer (62), and an innermost layer (63). The chemical conversion coatings (64*a*, 64*b*) are formed by processing the opposite surfaces of the
(Continued)

aluminum layer (62) by a phosphate treatment method. The base layer (61) and the innermost layer (63) are bonded to the chemical conversion coatings (64a, 64b) of the aluminum layer (62) with adhesive layers (65a, 65b), respectively.

4 Claims, 12 Drawing Sheets

Related U.S. Application Data

11/378,235, filed on Mar. 20, 2006, now Pat. No. 8,067,113, which is a division of application No. 09/913,501, filed as application No. PCT/JP00/08959 on Dec. 18, 2000, now Pat. No. 7,048,822.

(30) Foreign Application Priority Data

| Jan. 20, 2000 | (JP) | 2000-11422 |
|---|---|---|
| Feb. 16, 2000 | (JP) | 2000-37598 |
| Feb. 16, 2000 | (JP) | 2000-37637 |
| Feb. 16, 2000 | (JP) | 2000-37658 |
| Feb. 16, 2000 | (JP) | 2000-37676 |
| Mar. 15, 2000 | (JP) | 2000-73013 |
| Mar. 16, 2000 | (JP) | 2000-73842 |
| Mar. 16, 2000 | (JP) | 2000-74045 |

(51) Int. Cl.
*B32B 15/085* (2006.01)
*B32B 27/16* (2006.01)
*H01M 2/02* (2006.01)
*C23C 22/05* (2006.01)
*H01M 10/05* (2010.01)

(52) U.S. Cl.
CPC .............. *B32B 15/20* (2013.01); *B32B 27/16* (2013.01); *C23C 22/05* (2013.01); *H01M 2/0277* (2013.01); *H01M 2/0287* (2013.01); *H01M 10/05* (2013.01); *Y10T 29/4911* (2015.01); *Y10T 29/49112* (2015.01); *Y10T 29/49114* (2015.01); *Y10T 29/49115* (2015.01); *Y10T 428/31678* (2015.04); *Y10T 428/31681* (2015.04); *Y10T 428/31692* (2015.04); *Y10T 428/31913* (2015.04); *Y10T 428/31928* (2015.04)

(56) References Cited

U.S. PATENT DOCUMENTS

| 4,156,672 | A |   | 5/1979  | Fitko et al. |
|---|---|---|---|---|
| 4,597,818 | A |   | 7/1986  | Aoyama et al. |
| 4,664,994 | A |   | 5/1987  | Koike et al. |
| 4,785,835 | A |   | 11/1988 | Bray |
| 4,828,136 | A |   | 5/1989  | Kawahara et al. |
| 5,134,046 | A |   | 7/1992  | Chow et al. |
| 5,242,714 | A |   | 9/1993  | Steele et al. |
| 5,650,243 | A |   | 7/1997  | Ferment |
| 6,080,508 | A |   | 6/2000  | Dasgupta et al. |
| 6,083,336 | A |   | 7/2000  | Kiriazis |
| 6,084,048 | A | * | 7/2000  | Hozumi ............... C08F 210/06 502/103 |
| 6,106,973 | A |   | 8/2000  | Sonozaki et al. |
| 6,149,735 | A | * | 11/2000 | Oue et al. ..................... 148/267 |
| 6,238,783 | B1 |   | 5/2001  | Komai et al. |
| 6,242,131 | B1 |   | 6/2001  | Noh |
| 6,245,456 | B1 |   | 6/2001  | Fukuda et al. |
| 6,296,971 | B1 | * | 10/2001 | Hara ............................. 429/163 |
| 6,379,838 | B1 | * | 4/2002  | Olsen et al. ................... 429/163 |
| 6,632,538 | B1 | * | 10/2003 | Yamazaki ............ H01M 2/021 428/213 |
| 6,797,430 | B1 |   | 9/2004  | Hatta et al. |
| 7,048,822 | B2 |   | 5/2006  | Yamashita et al. |
| 7,285,334 | B1 |   | 10/2007 | Yamashita et al. |
| 7,358,007 | B1 |   | 4/2008  | Sawada et al. |
| 2007/0128513 | A1 |   | 6/2007  | Hatta et al. |

FOREIGN PATENT DOCUMENTS

| JP | 57170946 A | 10/1982 |
|---|---|---|
| JP | 61206158 A | 9/1986 |
| JP | 403202480 A | 9/1991 |
| JP | 08212334 | 8/1996 |
| JP | 11-045688 * | 2/1999 |
| JP | 11067168 A | 3/1999 |
| JP | 11-195404 | 7/1999 |
| JP | 11-224652 | 8/1999 |
| JP | 11-345599 | 12/1999 |
| JP | 2000-215861 | 8/2000 |
| JP | 2001-35453 | 2/2001 |
| JP | 2001-57181 | 2/2001 |
| WO | WO 99/40634 | 8/1999 |
| WO | WO 00/62354 | 10/2000 |

OTHER PUBLICATIONS

Mar. 14, 2013 Office Action issued in U.S. Appl. No. 13/275,918.
Oct. 17, 2013 Office Action issued in U.S. Appl. No. 13/275,918.
Apr. 10, 2014 Office Action issued in U.S. Appl. No. 13/275,918.

* cited by examiner

POLYMER BATTERY MODULE PACKAGING SHEET AND A METHOD OF MANUFACTURING THE SAME

This is a Division of application Ser. No. 13/275,918 filed Oct. 18, 2011, which is a Continuation of application Ser. No. 11/378,235 filed Mar. 20, 2006 (now U.S. Pat. No. 8,067,113 B2 issued Nov. 29, 2011), which is a Division of application Ser. No. 09/913,501 filed Aug. 15, 2001 (now U.S. Pat. No. 7,048,822 B2 issued May 23, 2006), which is a National Stage of Application No. PCT/JP00/08959 filed Dec. 18, 2000. The prior applications, including the specifications, drawings and abstracts are incorporated herein by reference in their entirety.

TECHNICAL FIELD

The present invention relates to a moistureproof, formable packaging sheet for forming a package for packaging a polymer battery module with a solid organic electrolyte (polyelectrolyte), resistant to the detrimental effects of the polymer battery module, and to a method of manufacturing the packaging sheet.

BACKGROUND ART

A polymer battery, which is also called a lithium secondary battery, uses a polyelectrolyte, generates current by the migration of lithium ions and has positive and negative electrodes formed of active polymers.

The lithium secondary battery comprises a lithium battery module having a positive electrode collector (aluminum or nickel), a positive electrode active substance layer (metal oxide, carbon black, a metal sulfide, an electrolytic solution or a polymer for forming a positive electrode, such as polyacrylonitrile), an electrolytic layer (a carbonate electrolytic solution of propylene carbonate, ethylene carbonate, dimethyl carbonate or ethylene methyl carbonate, an inorganic solid electrolyte of a lithium salt or a gelled electrolyte), a negative electrode active layer (lithium, an alloy, carbon, an electrolytic solution or a polymer, such as polyacrylonitrile) and a negative electrode collector (copper, nickel, a stainless steel), and a package containing the lithium battery module therein.

The polymer battery is used as a power supply for personal computers, portable terminal devices (portable telephone sets and PDSs), video cameras, electric vehicles, energy storage batteries, robots, artificial satellites and the like.

The package of the polymer battery is a cylindrical or parallelepipedic metal can formed by pressing a metal sheet or a pouch formed by processing a laminated sheet consisting of a base layer, an aluminum layer and a sealant layer.

Such known packages for polymer batteries have the following problems. The meal can has rigid walls and hence the shape of the lithium battery module is dependent on that of the metal can. Since the hardware is designed so as to conform to the shape of the battery, the dimensions of the hardware are dependent on the shape of the battery, which reduces the degree of freedom of designing the shape of the hardware.

A pouch formed by heat-sealing two laminated sheets to contain a polymer battery module therein and an embossed package formed in the shape of a vessel by subjecting the laminated sheet to an embossing process to contain a polymer battery therein have been developed. The embossed package, as compared with the pouch, is a compact package.

Satisfactory moistureproof property, strength including piecing resistance and insulating property are essential to polymer battery packages. Satisfactory formability is an additional important property of a laminated sheet for forming the embossed package.

More specifically, a packaging laminated sheet having a nylon layer, an adhesive layer, an aluminum layer, an adhesive layer and a cast polypropylene (PP) resin layer is an example of a polymer battery module packaging sheet for forming embossed packages. Even if the packaging laminated sheet is fabricated by a dry lamination process that makes the adhesive layers bond the adjacent layers with stable, high adhesive strength, sometimes, the packaging laminated sheet is delaminated and the nylon layer and the aluminum layer are separated when the packaging laminated sheet is subjected to an embossing process or when a package formed from the packaging laminated sheet is subjected to a heat-sealing process to heat-seal a peripheral part thereof after putting a polymer battery module in the package. Sometimes, the packaging laminated sheet is delaminated by hydrogen fluoride produced by the interaction of the electrolyte of the polymer battery module and moisture and the aluminum layer and the cast PP layer are separated.

DISCLOSURE OF THE INVENTION

It is an object of the present invention to provide a polymer battery module packaging sheet excellent in protective property for protecting a polymer battery module and formability, and a method of manufacturing the same.

According to the present invention, a polymer battery module packaging sheet for packaging a polymer battery module includes, as essential components, a base layer, an aluminum layer, a chemical conversion coating, and an innermost layer, wherein the innermost layer consists of a single layer.

According to the present invention, a polymer battery module packaging sheet for packaging a polymer battery module includes, as essential components, a base layer, an aluminum layer, a chemical conversion coating formed by chemical conversion treatment and an innermost layer, wherein the innermost layer consists of an adhesive resin layer and an innermost resin layer.

According to the present invention, a polymer battery module packaging sheet manufacturing method comprises the steps of: processing one of surfaces of an aluminum layer by chemical conversion treatment; dry-laminating the aluminum layer to a base layer with the other surface thereof not processed by the chemical conversion treatment bonded to the base layer; and bonding an innermost layer to the surface processed by the chemical conversion treatment of the aluminum layer by extruding a molten resin for forming the innermost layer in a molten resin film by an extrusion process while a surface of the molten resin film facing the aluminum layer is processed by ozone treatment.

According to the present invention, a polymer battery module packaging sheet manufacturing method comprises the steps of: processing one of surfaces of an aluminum layer by chemical conversion treatment; dry-laminating the aluminum layer to a base layer with the other surface thereof not processed by the chemical conversion treatment bonded to the base layer; and laminating a film consisting of an innermost layer and an adhesive resin layer to the surface processed by the chemical conversion treatment of the aluminum layer by a coextrusion lamination method while a surface of a molten resin film forming the adhesive resin layer facing the aluminum layer by ozone treatment.

According to the present invention, a polymer battery module packaging sheet manufacturing method comprises the steps of: processing one of surfaces of an aluminum layer by chemical conversion treatment; dry-laminating the aluminum layer to a base layer; laminating a film of an adhesive resin forming an innermost layer to the surface processed by the chemical conversion treatment of the aluminum layer by extruding the adhesive resin by a sandwich lamination method while a surface of the film of the molten adhesive resin by ozone treatment.

According to the present invention, a polymer battery module packaging sheet manufacturing method comprises the step of sequentially laminating at least a base layer, an aluminum layer, a chemical conversion coating and an innermost layer, wherein the innermost layer is formed of a polyethylene resin (PE resin).

According to the present invention, a polymer battery module packaging sheet manufacturing method comprises the steps of: processing both the surfaces of an aluminum layer by chemical conversion treatment; dry-laminating a base layer to one of the surfaces of the aluminum layer; and laminating an innermost layer to the other surface of the aluminum layer by extruding a molten resin in a molten resin film by an extrusion process while a surface of the molten resin film facing the aluminum layer is processed by ozone treatment.

According to the present invention, a polymer battery module packaging sheet manufacturing method comprises the steps of: processing both the surfaces of an aluminum layer by chemical conversion treatment; dry-laminating a base layer to one of the surfaces of the aluminum layer; and laminating a film of a molten adhesive resin film for forming an adhesive resin layer, and an innermost layer formed by a coextrusion lamination method to the other surface of the aluminum layer while a surface of the molten adhesive resin film facing the aluminum layer is processed by ozone treatment.

According to the present invention, a polymer battery module packaging sheet manufacturing method comprises the steps of: processing both the surfaces of an aluminum layer by chemical conversion treatment; dry-laminating a base layer to one of the surfaces of the aluminum layer; and extruding an adhesive resin on the aluminum layer in a molten adhesive resin film, sandwich-laminating a film forming an innermost layer to the other surface of the aluminum layer by the molten adhesive resin film while a surface of the molten adhesive resin film facing the aluminum layer is processed by ozone treatment.

According to the present invention, a polymer battery module packaging sheet manufacturing method comprises the steps of: processing at least one of surfaces of an aluminum layer by chemical conversion treatment; dry-laminating a base layer to a surface not processed by the chemical conversion treatment of the aluminum layer; forming a laminated sheet by laminating a film consisting of an adhesive resin layer and an innermost layer and formed by a coextrusion lamination method to the surface processed by the chemical conversion treatment of the aluminum layer; and heating the laminated sheet so that the adhesive resin layer is heated at a temperature not lower than its softening point.

According to the present invention, a polymer battery module packaging sheet manufacturing method comprises the steps of: processing at least one of surfaces of an aluminum layer by chemical conversion treatment; dry-laminating a base layer to one of the surfaces of the aluminum layer; forming a laminated sheet by bonding a polypropylene resin film (hereinafter referred to as "PP resin film") with an adhesive resin layer of an acid-modified polypropylene resin (hereinafter referred to as "PPa resin") to the other surface processed by the chemical conversion treatment of the aluminum layer by a sandwich lamination process; and heating the laminated sheet so that the adhesive resin layer is heated at a temperature not lower than its softening point.

According to the present invention, a polymer battery module packaging sheet manufacturing method comprises the steps of: processing at least one of surfaces of an aluminum layer by chemical conversion treatment; dry-laminating a base layer to one of the surfaces of the aluminum layer; forming a laminated sheet by laminating a film consisting of a film of an acid-modified polyethylene resin (hereinafter referred to as "PEa resin") and a film of a polyethylene resin (hereinafter referred to as "PE resin") to the surface processed by the chemical conversion treatment of the aluminum layer by a coextrusion lamination method; and heating the laminated sheet so that the film of the PEa resin is heated at a temperature not lower than the softening point of the PEa resin.

According to the present invention, a polymer battery module packaging sheet manufacturing method comprises the steps of: processing at least one of surfaces of an aluminum layer by chemical conversion treatment; dry-laminating a base layer to one of the surfaces of the aluminum layer; forming a laminated sheet by bonding a film of a PE resin with an adhesive resin layer of a PEa resin to the surface treated by the chemical conversion treatment of the aluminum layer by a sandwich lamination process; and heating the laminated sheet so that the adhesive resin layer is heated at a temperature not lower than the softening point of the Ape resin.

According to the present invention, a polymer battery module packaging sheet manufacturing method comprises the steps of: processing at least one of surfaces of an aluminum layer by chemical conversion treatment; dry-laminating a base layer to one of the surfaces of the aluminum layer; forming a laminated sheet by laminating a film consisting of an adhesive resin film of an acid-modified polypropylene resin (hereinafter referred to as "PPa resin") and a film of an ethylene-rich random polypropylene resin (hereinafter referred to as "ERRPP resin") to the other surface of the aluminum layer by a coextrusion lamination method; and heating the laminated sheet at a temperature not lower than the softening point of the PPa resin.

According to the present invention, a polymer battery module packaging sheet manufacturing method comprises the steps of: processing at least one of surfaces of an aluminum layer by chemical conversion treatment; dry-laminating a base layer to one of the surfaces of the aluminum layer; and forming a laminated sheet by heating the surface processed by the chemical conversion treatment of the aluminum layer at a temperature not lower than the softening point of a PPa resin and laminating a film consisting of an adhesive resin film of the PPa resin and a film of an ethylene-rich random PP resin (hereinafter referred to as "ERRPP resin") to the surface processed by the chemical conversion treatment of the aluminum layer by a coextrusion lamination method.

According to the present invention, a polymer battery module packaging sheet manufacturing method comprises the steps of: processing at least one of surfaces of an aluminum layer by chemical conversion treatment; dry-laminating a base layer to one of the surfaces of the aluminum layer; forming a laminated sheet by bonding an innermost layer of an ERRPP resin with an adhesive resin layer of a PPa resin by a sandwich lamination process; and heating the laminated sheet so that the adhesive resin layer is heated at a temperature not lower than the softening point of the PPa resin forming the adhesive resin layer.

According to the present invention, a polymer battery module packaging sheet manufacturing method comprises the steps of: processing at least one of surfaces of an aluminum layer by chemical conversion treatment; dry-laminating a base layer to one of the surfaces of the aluminum layer; and forming a laminated sheet by heating the surface processed by the chemical conversion treatment of the aluminum layer at a temperature not lower than the softening point of a PPa resin and bonding an innermost layer of an ERRPP resin with an adhesive resin layer of the PPa resin by a sandwich lamination method.

BEST MODE FOR CARRYING OUT THE INVENTION

First Embodiment

A polymer battery module packaging sheet in a first embodiment according to the present invention is intended for forming an embossed package having a hollow for containing a polymer battery module. The present invention will be described with reference to the accompanying drawings.

Figure 1:
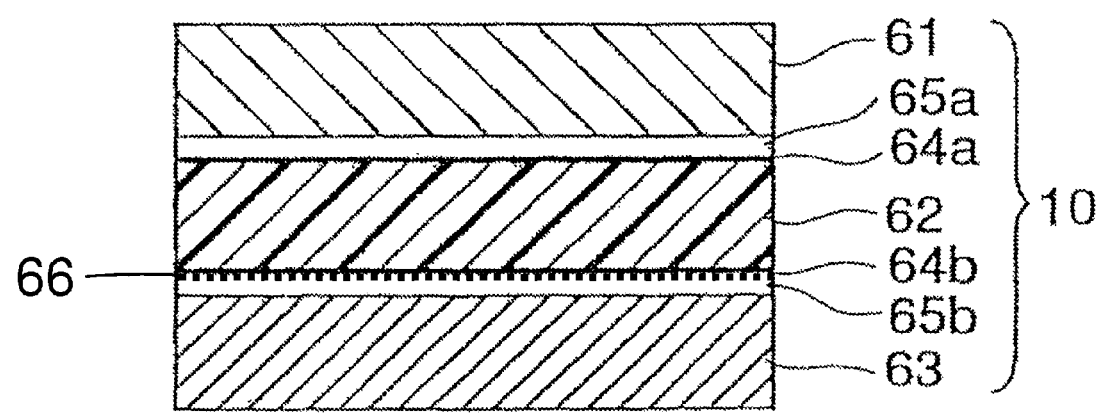
FIG. 1 is a sectional view of a polymer battery module packaging sheet in a first embodiment according to the present invention.

FIG. 1 is a sectional view of a polymer battery module packaging sheet in a first embodiment according to the present invention.

Figure 2:
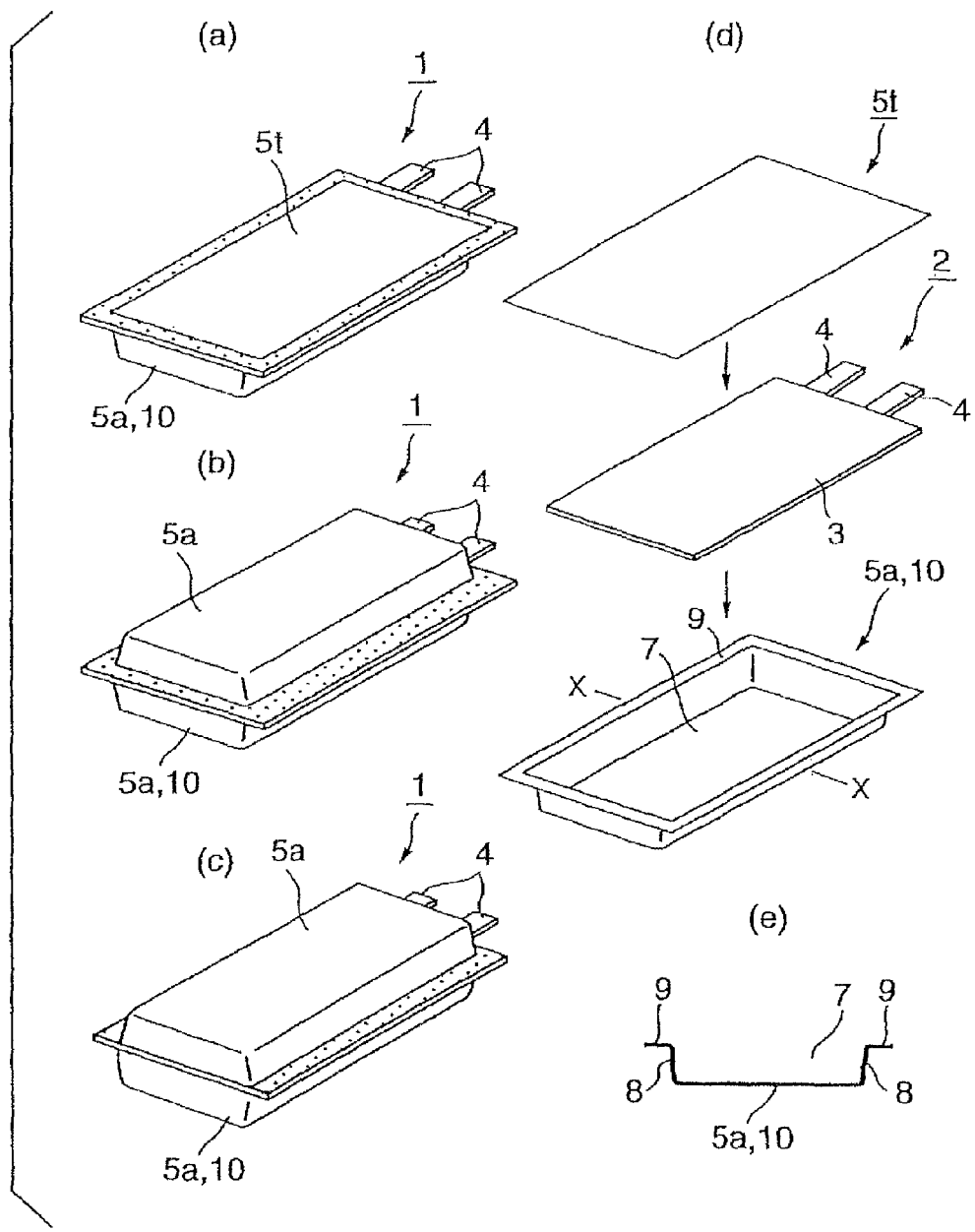
FIG. 2 is a view of assistance in explaining a polymer battery employing an embossed package.
Figure 3:
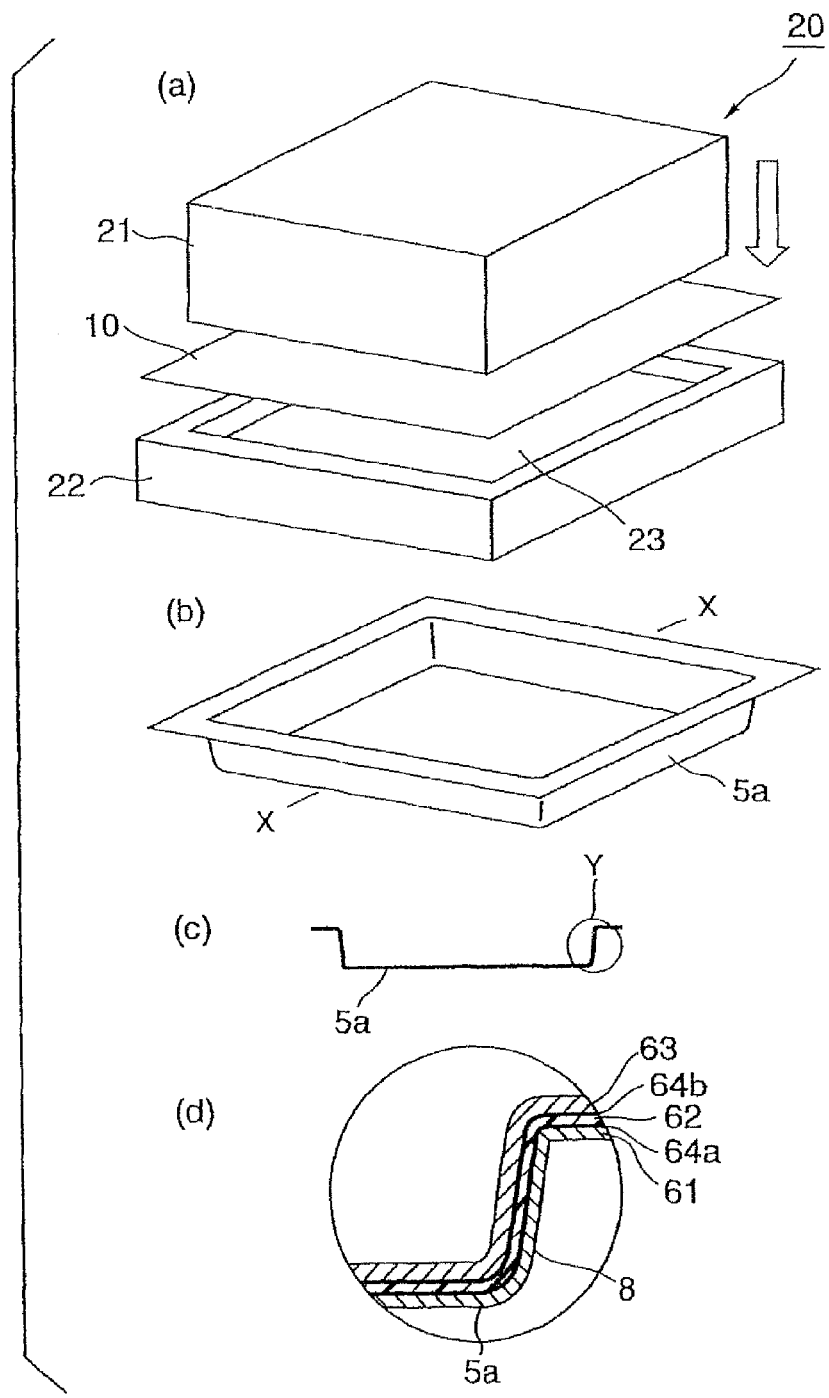
FIG. 3 is a view of assistance in explaining a method of forming an embossed package.

FIGS. 2(a) to 2(e) are views of polymer packages of different types, and FIGS. 3(a) to 3(d) are views of assistance in explaining an embossed structure, in which FIG. 3(a) is a perspective view, FIG. 3(c) is a sectional view taken on line X-X in FIG. 3(b), and FIG. 3(d) is an enlarged view of a part indicated at Y in FIG. 3(c).

FIGS. 4(a) to 4(f) are views of assistance in explaining a method of attaching an adhesive film for bonding tabs to a polymer battery module packaging sheet.

As shown in FIGS. 2(a) and 2(d), a polymer battery 1 with an embossed package includes a package body 5a formed by embossing a packaging laminated sheet 10, i.e., a polymer battery module packaging sheet, and provided with a hollow part 7 and a flange 9, a polymer battery module 2 placed in the hollow part 7 of the package body 5a, and a cover 5t formed by cutting the packaging laminated sheet 10 and bonded to the flange 9 of the package body 5a by heat-sealing.

The polymer battery 1, which is also called a lithium secondary battery, employs a polyelectrolyte, generates current by the agency of the migration of lithium ions and has positive and negative electrodes containing high polymers as active substances.

The polymer battery module 2 of the lithium secondary battery 1 includes a cell part (energy storage part) 3, and tabs (electrodes) 4. The cell part 3 includes a positive electrode collector (aluminum or nickel), a positive electrode active substance layer (metal oxide, carbon black, a metal sulfide, an electrolytic solution or a polymer for forming a positive electrode, such as polyacrylonitrile), an electrolytic layer (a carbonate electrolytic solution of propylene carbonate, ethylene carbonate, dimethyl carbonate or ethylene methyl carbonate, an inorganic solid electrolyte of a lithium salt or a gelled electrolyte), a negative electrode active layer (lithium, an alloy, carbon, an electrolytic solution or a polymer for a negative electrode, such as polyacrylonitrile) and a negative electrode collector (copper, nickel, a stainless steel).

As shown in FIGS. 2(b) and 2(c), two package bodies 5a may be joined together instead of covering one package body 5a with the cover 5t. The entire flanges of the joined package bodies 5a may be bonded together by heat-sealing as shown in FIG. 2(b) or three parts of the flange of the package body 5a extending along the three sides of the package body 5a may be bonded to those of the other package body 5a by heat-sealing as shown in FIG. 2(c).

It is desirable that the side walls 8 of the package body 5a rise as upright as possible relative to the bottom wall as shown in FIG. 2(e) in order that the polymer battery module 2 can be closely contained in the package body 5a. Therefore, the packaging laminated sheet must have sufficient ductility, i.e., formability, suitable for forming.

When the packaging laminated sheet is a structure: nylon layer/adhesive layer/aluminum layer/adhesive layer/cast polypropylene layer, and the adhesive layers are formed by a dry lamination method, it often occurs that parts of the aluminum layer and the base layer forming the side walls are separated by delamination when the packaging laminated sheet is subjected to an embossing process and, sometimes, parts of the packaging laminated sheet forming peripheral parts of the package are delaminated when the same peripheral parts are subjected to heat-sealing after putting the polymer battery module in the package. Sometimes, the inner surface of the aluminum foil is corroded by hydrogen fluoride produced by the interaction of the electrolyte of the polymer battery module and moisture and the packaging laminated sheet is delaminated.

The inventors of the present invention made earnest studies to develop a packaging laminated sheet, i.e., a polymer battery module packaging sheet, that will not be delaminated by embossing and heat-sealing and has satisfactory properties required of battery module packaging sheets for packaging a polymer battery, including chemical resistance to the detrimental effects of a polymer battery module, found that the foregoing problems can be solved by employing an aluminum foil having both the surfaces finished by chemical conversion treatment and have made the present invention. As shown in FIG. 1, the packaging laminated sheet 10, i.e., a polymer battery module packaging sheet, according to the present invention includes, at least, a base layer 61, an adhesive layer 65a, an aluminum foil (aluminum layer) 62 having surfaces coated with chemical conversion coatings (additional chemically converted layers) 64a and 64b formed by subjecting the opposite surfaces of the aluminum foil 62 to chemical conversion treatment, an adhesive layer 65b and a heat-sealable resin layer (innermost layer) 63. The packaging laminated sheet 10 is featured by the chemical conversion coatings formed by subjecting the aluminum foil 62 to chemical conversion treatment.

Preferably, the base layer 61 of the polymer battery module packaging sheet of the present invention is a polyester or nylon film. Possible polyester resins are PE terephthalate (PET) resins, polybutylene terephthalate (PBT) resins, PE naphthalate (PEN) resins, polybutylene naphthalate (PBN) resins, interpolyester resins, polycarbonate (PC) resins and the like. Possible nylon resins are nylon 6, nylon 66, copolymers of nylon 6 and nylon 66, nylon 610, polymethaxylilene adipamide (MXD6) and the like.

When the polymer battery is used on a piece of hardware, the base layer 61 comes into direct contact with the piece of hardware. Therefore, it is basically desirable to form the base layer 61 of an intrinsically insulating resin. Since a film forming the base layer 61 has pinholes and pinholes will be formed in the film during processing, the thickness of the base layer 61 must be 6 μm or above, preferably, in the range of 12 to 25 μm. The base layer 61 may be a laminated film in view of providing the base layer 61 with pinhole resistance and improved insulating ability.

A laminated film for the base layer 61 includes at least one resin layer consisting of two or more layers each having a thickness of 6 μm or above, preferably, in the range of 12 to 25 μm. The following laminated structures 1) to 7), not shown, are examples of the laminated base layer 61.
1) PET resin layer/Nylon layer
2) Nylon layer/PET resin layer TO improve the mechanical aptitude (stability when passed through processing machines and a packaging machine) and surface protecting ability (heat resistance and electrolyte resistance) of the packaging sheet and to reduce friction between a die and the base layer when forming the embossed package body, the base layer 11 may consist of plural layers and the surface of the base layer 11 may be coated with a fluorocarbon resin, an acrylic resin or a silicone resin. The base layer 11 may be any one of the following laminated films.
3) Fluorocarbon resin layer/PET resin layer (the fluorocarbon resin layer may be a fluorocarbon resin film or a film formed by spreading a liquid fluorocarbon resin in a film and drying the same.)
4) Silicone resin layer/PET resin layer (the silicone resin layer may be a silicone resin film or a film formed by spreading a liquid silicone resin in a film and drying the same.)
5) Fluorocarbon resin layer/PET resin layer/Nylon layer (the fluorocarbon resin layer may be a fluorocarbon resin film or a film formed by spreading a liquid fluorocarbon resin in a film and drying the same.)
6) Silicone resin layer/PET resin layer/Nylon layer
7) Acrylic resin layer/Nylon layer (the acrylic resin layer may be an acrylic resin film or a film formed by spreading an acrylic resin and drying the same.)

The base layer 61 is laminated to the aluminum foil 62 by a dry lamination method, an extrusion lamination method or any suitable method.

The aluminum foil 62, which will be also referred to as a barrier layer 62, of the polymer battery module packaging sheet prevents the penetration of moisture into the polymer battery. To avoid the adverse effect of pinholes that may be formed in the barrier layer 62, to stabilize the workability (ease of fabricating pouches or embossing) and to provide the barrier layer 62 with pinhole resistance, the barrier layer 62 has a thickness of 15 μm or above and is formed from a metal foil, such as an aluminum foil or a nickel foil, or a film coated with an inorganic compound, such as silicon dioxide or alumina, by evaporation. Preferably, the barrier layer 62 is an aluminum foil of a thickness in the range of 20 to 80 μm.

The inventors of the present invention made studies to reduce pinholes and to prevent the cracking of an embossed package and found that aluminum having an iron content in the range of 0.3 to 9.0% by weight, preferably, 0.7 to 2.0% by weight is more satisfactory in ductility than aluminum not containing any iron, an aluminum foil (barrier layer 62) of such aluminum is less subject to the formation of pinholes when the packaging laminated sheet is bent and is more capable of facilitating forming the side walls of the embossed package than an aluminum foil of aluminum not containing any iron. Aluminum foils of aluminum having an iron content less than 0.3% by weight are not satisfactorily pinhole-resistant and do not improve the formability of the packaging laminated sheet. Aluminum foils of aluminum having an iron content exceeding 0.9% by weight are unsatisfactory in flexibility and affect adversely to the workability of the packaging laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of forming may be used.

The inventors of the present invention found that the separation of the aluminum foil 62 and the base layer 61 during an embossing process can be effectively prevented, the dissolution and corrosion of the surfaces of the aluminum foil, particularly, aluminum oxide films coating the aluminum foil, by hydrogen fluoride produced by the interaction of the electrolyte of the polymer battery and moisture can be effectively prevented and the adhesion of the aluminum foil 62 to the innermost layer 63 can be stabilized by forming the chemical conversion coatings 64a and 64b, i.e., acid-resistant layers 64a and 64b, on the surface of the aluminum foil 62 by chemical conversion treatment using a phosphate, a chromate, a fluoride or a triazine thiol compound.

It was found through the examination of various chemical conversion treatment methods that a phosphate treatment method using trivalent chromium phosphate has remarkable effect.

The aluminum foil 62 having the surfaces coated with the chemical conversion coatings 64a and 64b of the polymer battery module packaging sheet is laminated to the innermost layer 63 by a dry lamination method.

Parts of the innermost layer 63 of the polymer battery module packaging sheet can be bonded together by heat-sealing. Desirably, the innermost layer 63 is a film of a material having necessary properties including a heat-resistant property, a moistureproof property and press-formability, such as a cast PP resin film, or a material excellent in low-temperature resistance and impact resistance and having a melting point not lower than 115° C., such as a linear low-density PE resin (hereinafter referred to as "LLDPE resin"), a medium-density PE resin (hereinafter referred to as "MDPE resin") car a high-density PE resin (hereinafter referred to as HDPE resin").

The packaging laminated sheet 10, i.e., the polymer battery module packaging sheet, may be provided, in addition to the base layer 61, the barrier layer 62 and the innermost layer 63, an intermediate layer 66 sandwiched between the barrier layer 62 and the innermost layer 63. The intermediate layer 66 is employed to enhance the strength of the packaging laminated sheet 10 and to improve and stabilize the barrier property of the packaging laminated sheet.

The base layer 61, the barrier layer 62 and the innermost layer 63, i.e., a cast PP resin film, are laminated to form the packaging laminated sheet 10. The aluminum foil 62, i.e., the barrier layer 62, is subjected to chemical conversion treatment before lamination to form the chemical conversion coatings 64a and 64b on the surfaces of the aluminum foil 62. The opposite surfaces of the aluminum foil 62 is subjected individually to chemical conversion treatment. Chemical conversion treatment using chromium phosphate applies a chromium phosphate solution to a surface of the aluminum foil by a roll coating method or the like and heats the aluminum foil at a surface temperature in the range of 170 to 200° C. to form the acid-resistant layer 64a on the surface of the aluminum foil 62.

The base layer 61 is bonded to the surface provided with the acid-resistant layer 64a of the aluminum foil 62, and the innermost layer 63, i.e., a heat-sealable resin layer 63, is laminated to the other surface provided with the acid-resistant layer 64a of the aluminum foil 62 to provide the packaging laminated sheet 10. Those layers may be laminated to the aluminum foil 62 by an extrusion lamination method, a dry lamination method or a hot lamination method. A dry lamination method is most preferable from the viewpoint of productivity and providing chemical resistance to the detrimental effect of the battery module to be contained in a package formed from the packaging laminated sheet 10.

Adhesives suitable for forming the adhesive layers 65a and 65b of the packaging laminated sheet 10 include polyester adhesives, polyethylene imine adhesives, polyether adhesives, polyether urethane adhesives, polyester urethane adhesives and epoxy adhesives. Polyether urethane adhesives and polyester urethane adhesives are particularly preferable.

The package body 5a can be made by subjecting the packaging laminated sheet 10 to an embossing process using a male mold 21 and a female mold 22 as shown in FIG. 3(a). The package body 5a may be of a one-side pressed type or a two-side pressed type. The one-side pressed type needs deeper pressing.

Figure 4:
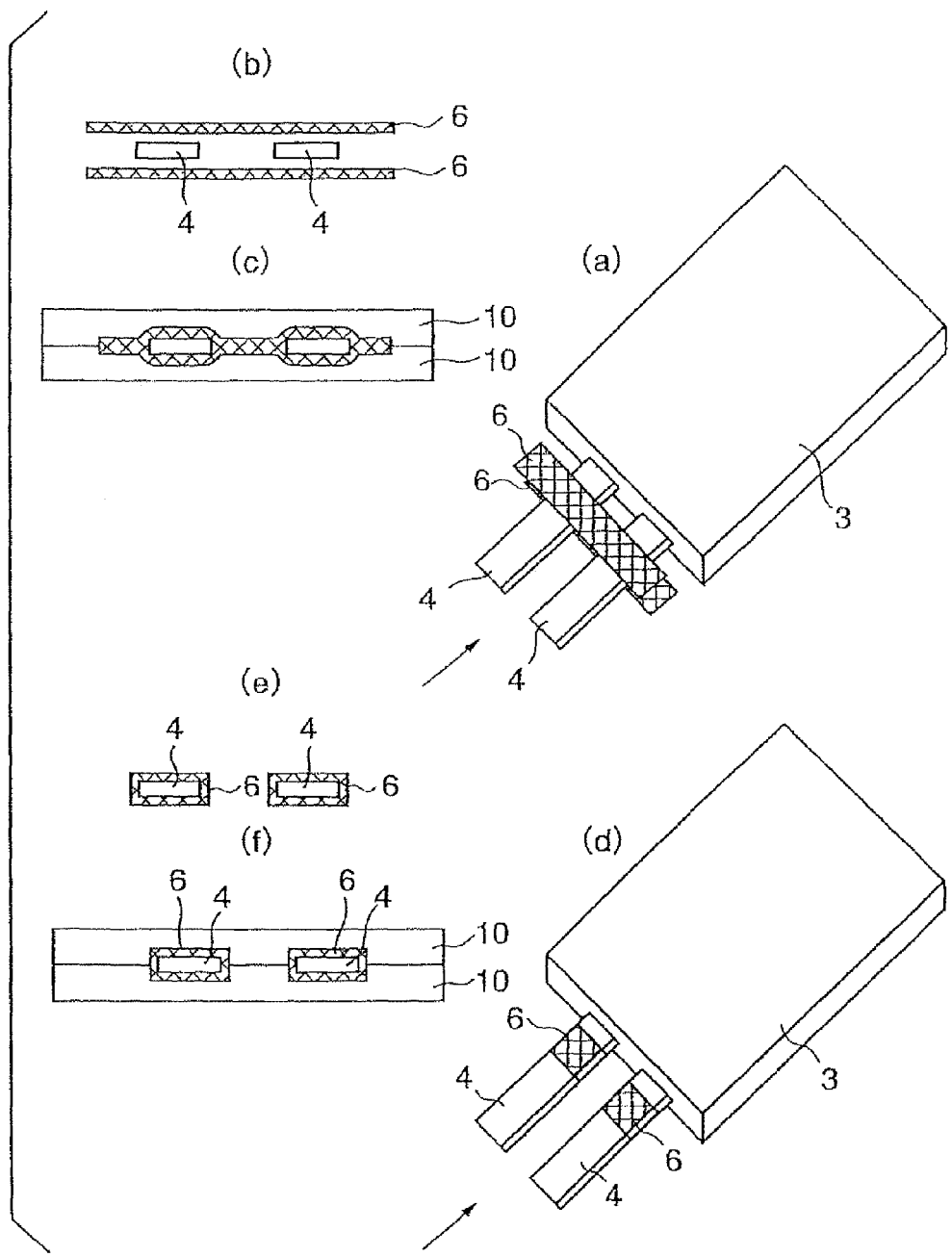
FIG. 4 is a view of assistance in explaining a method of attaching tabs to a polymer battery module packaging sheet.

A cast PP resin film is a desirable as the innermost layer 63 of the packaging laminated sheet 10. The cast PP resin film has properties suitable for heat-sealing, protective physical properties, such as a moistureproof property and heat resistance, required of the innermost layer 63 of the packaging laminated sheet 10 and satisfactory workability for lamination and embossing. However, the cast PP resin film cannot be bonded to a metal member by heat-sealing. Therefore, when bonding the tabs 4 of the polymer battery 1 to the packaging laminated sheets 10, adhesive films 6 that can be bonded to both a metal member and a cast PP resin film by heat-sealing is interposed between the tabs 4 and the innermost layers 63 of the packaging laminated sheets 10 as shown in FIGS. 4(a), 4(b) and 4(c) to ensure that gaps between the tables 4 and the innermost layers 63 are sealed. The adhesive films 6 may be wound round predetermined parts of the tabs 4 as shown in FIGS. 4(d), 4(e) and 4(f).

EXAMPLES

Examples of the packaging laminated sheet 10 in the first embodiment will be described hereinafter.

A 25 m thick nylon film, a 40 m thick aluminum foil and a 30 in thick cast PP resin film were used as the base layers 61, the barrier layers 62 and the innermost layers 63, respectively, of both packaging laminated sheets in examples and comparative examples.

The chemical conversion treatment used an aqueous solution of a phenolic resin, a chromium fluoride compound and phosphoric acid as a processing liquid. The processing liquid was applied to the surface of the aluminum foil by a roll coating method in a film, and the film was baked at 180° C. or above. The weight per unit area of the film was 10 mg/m$^2$ (dry weight).

An unsaturated carboxylic acid graft random propylene film of 50 μm in thickness was used for forming the adhesive films 6 to seal gaps around the tabs 4. The adhesive films 6 were wound round parts of the tabs 4, the tabs 4 were sandwiched between the packaging laminated sheets and the packaging laminated sheets and the tabs 4 were bonded together by heat-sealing.

Example 1-1

Both the surfaces of an aluminum foil 62 were processed by chemical conversion treatment to form chemical conversion coatings 64a and 64B. A base layer 61 was bonded to the surface provided with the chemical conversion coating 64a of the aluminum foil 62 by a dry lamination method, and the innermost layer 63, i.e., a cast PP resin film, was bonded to the other chemical conversion coating 64b by a dry lamination method to form a packaging laminated sheet in Example 1-1.

Forming and Packaging

A package was formed by embossing the packaging laminated sheet in Example 1-1, a polymer battery module 2 was packaged in the package to complete a polymer battery. The polymer battery was tested.

Comparative Example 1-1

A packaging laminated sheet in Comparative example 1-1 was formed under the same conditions as those under which the packaging laminated sheet in Example 1-1 was formed, except that an aluminum foil 62 included in the packaging laminated sheet in Comparative example 1-1 was not processed by chemical conversion treatment.

Method of Evaluation

1) Delamination During Forming Process

Samples were inspected for the separation of the base layer 61 and the aluminum foil 62 immediately after forming.

2) Chemical Resistance Test

Samples were inspected for the separation of the aluminum foil 62 and the innermost resin film 63, i.e., a cast PP resin film, after keeping the samples in an atmosphere of 60° C. and 90% RH in a thermostat for seven days.

3) Delamination During Heat-Sealing Process

Samples were inspected for the separation of the base layer 61 and the aluminum foil 62 immediately after heat-sealing.

Results

No problem arose in the packaging laminated sheet in Example 1-1 during forming and heat-sealing, and the base layer 61 and the aluminum foil 62 were not separated. Forty-five samples among hundred sample packaging laminated sheets in Comparative example 1-1 were delaminated by heat-sealing. All the hundred sample packaging laminated sheets in Comparative example 1-1 were delaminated by the chemical resistance test.

The chemical conversion treatment of the opposite surfaces of the aluminum foil prevents the separation of the base layer and the aluminum foil during an embossing process and heat-sealing. The separation of the aluminum foil and the innermost layer can be prevented because the surfaces of the aluminum foil are not corroded by hydrogen fluoride that may be produced by interaction between the electrolyte of the polymer battery module and moisture.

Second Embodiment

A polymer battery module packaging sheet in a second embodiment according to the present invention is a moistureproof packaging laminated sheet resistant to chemicals, capable of being manufactured at a high productivity and resistant to cracking when subjected to a heat-sealing process. The polymer battery module packaging sheet and a method of manufacturing the same will be described.

Figure 8:
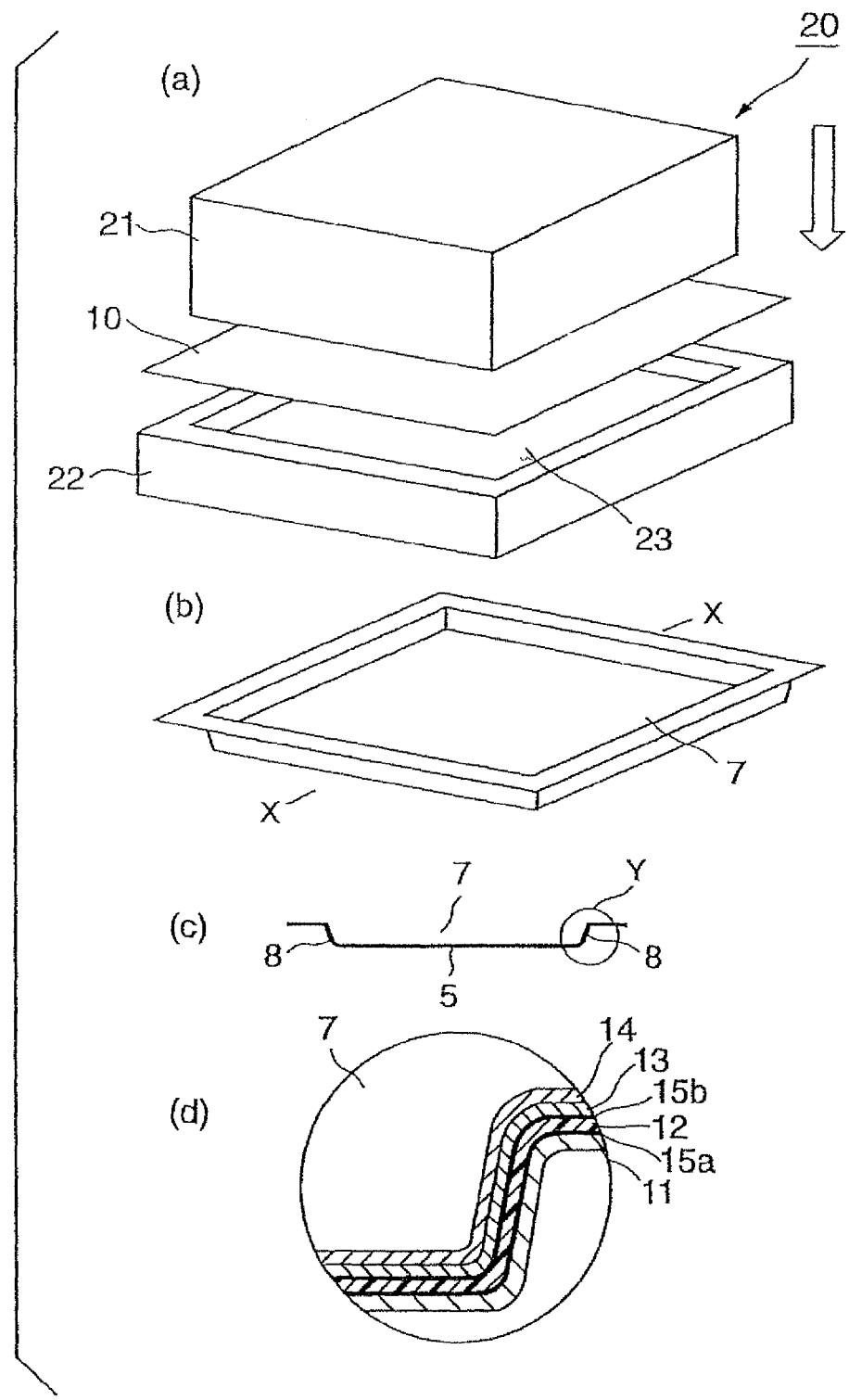
FIG. 8 is a view of assistance in explaining a method of forming an embossed package.
Figure 9:
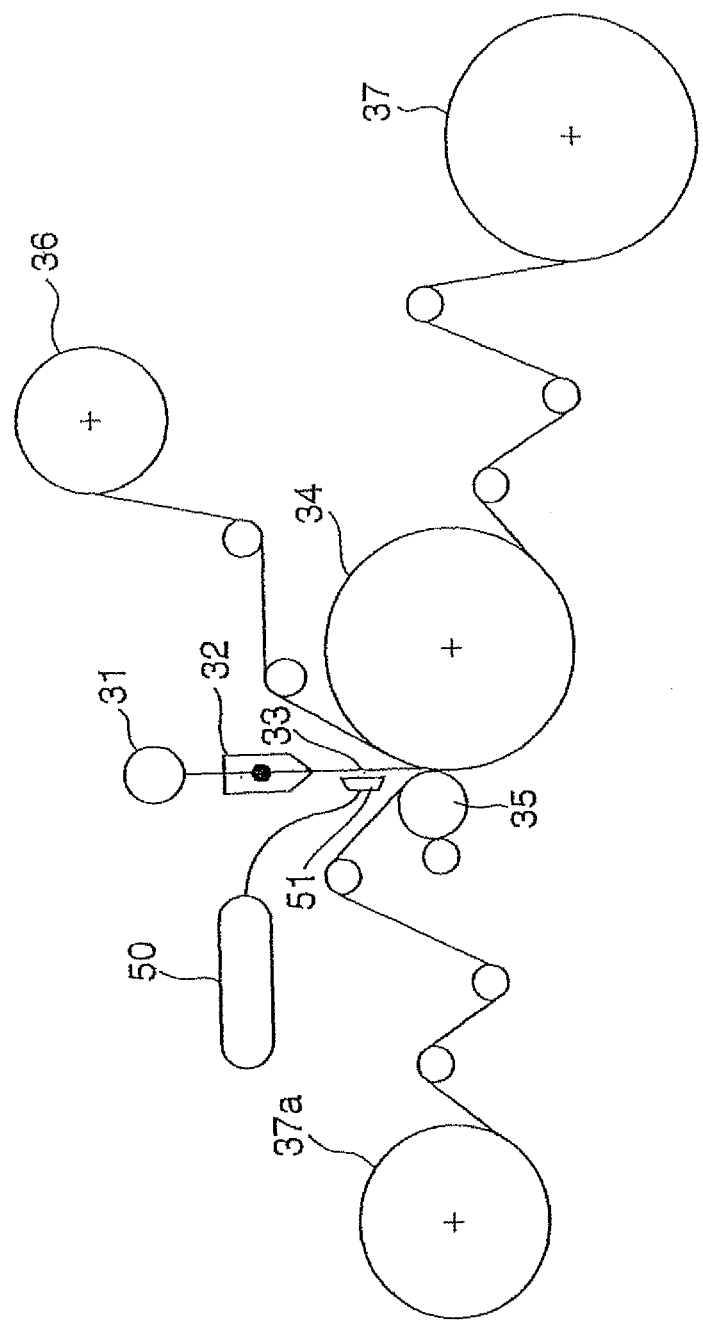
FIG. 9 is a diagrammatic view of assistance in explaining a sandwich lamination method to be applied to manufacturing a polymer battery module packaging sheet.
Figure 10:
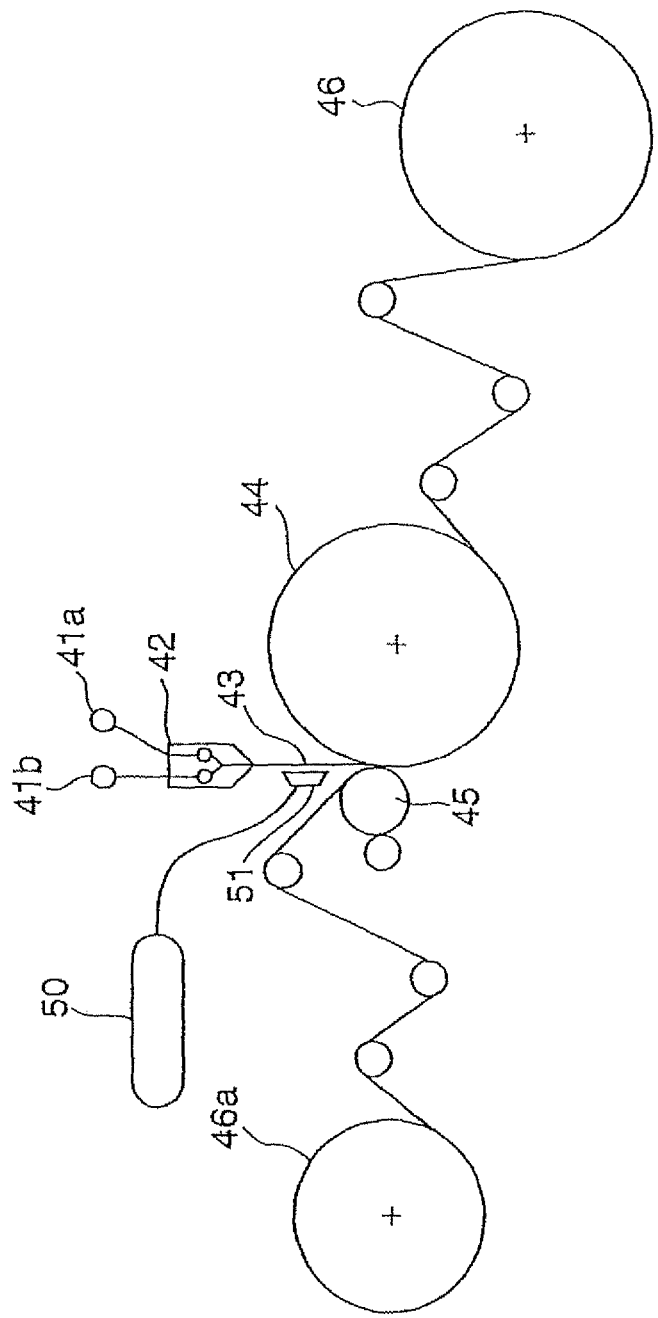
FIG. 10 is a diagrammatic view of assistance in explaining a coextrusion lamination method to be applied to manufacturing a polymer battery module packaging sheet.

FIG. 5(a) is a sectional view of a packaging laminated sheet formed by an extrusion lamination process, FIG. 5(b) is a sectional view of a packaging laminated sheet formed by a sandwich lamination process, FIG. 5(c) is a sectional view of a packaging laminated sheet formed by a coextrusion lamination process, FIG. 5(d) is an enlarged view of a part $Y_2$ in FIG. 5(b), FIG. 5(f) is an enlarged view of a part $Y_1$ in FIG. 5(a) and FIG. 5(f) is an enlarged view of a part $Y_3$ in FIG. 5(c). FIG. 6 is a perspective view of assistance in explaining a heat-sealed pouch for a polymer battery. FIGS. 7(a) to 7(e) are perspective views of assistance in explaining an embossed package. FIG. 8(a) is a perspective view of assistance in explaining an embossing process for forming an embossed package, FIG. 8(b) is a perspective view of embossed package body, FIG. 8(c) is a sectional view taken on line X-X in FIG. 8(b) and FIG. 8(d) is an enlarged view of a part Y in FIG. 8(c). FIG. 9 is a diagrammatic view of assistance in explaining a sandwich lamination process for manufacturing a polymer battery module packaging sheet. FIG. 10 is a diagrammatic view of assistance in explaining a coextrusion lamination process for manufacturing a polymer battery module packaging sheet.

The inventors of the present invention made earnest studies to develop a packaging laminated sheet, i.e., a polymer battery module packaging sheet, that will not be delaminated by embossing and heat-sealing and has satisfactory chemical resistance to the detrimental effects of a polymer battery module, have found that a packaging laminated sheet having component layers firmly bonded together can be formed by employing an aluminum foil having both the surfaces finished by chemical conversion treatment, bonding a base layer to one of the surfaces of the aluminum foil by a dry lamination process, bonding a PE resin film to the other surface of the aluminum foil by an extrusion lamination process, a sandwich lamination process or a coextrusion lamination process, processing a surface on the side of the aluminum foil of a heat-sealable resin layer or a bonding layer by ozone treatment and heating the packaging laminated sheet. According to the present invention, both the bonding layer and the heat-sealable resin layer are PE resins. The polymer battery module packaging sheet of the present invention is excellent in workability, can be manufactured by using comparatively in expensive materials and has satisfactory properties.

Referring to FIG. 5(a) a packaging laminated sheet 10, i.e., a polymer battery module packaging sheet, in a second embodiment according to the present invention includes at least a base layer 11, a bonding layer 16, an aluminum foil (aluminum layer) 12 having surfaces coated with chemical conversion coatings 15a and 15b, and a heat-sealable resin layer 14. A packaging laminated sheet 10 in the second embodiment may include, as shown in FIG. 5(b), a base layer 11, a bonding layer 16, an aluminum foil 12 having surfaces coated with chemical conversion coatings 15a and 15b, an adhesive resin layer 13 of an adhesive resin and a heat-sealable resin layer 14. The heat-sealable resin layer 14 is an innermost layer forming an innermost layer by itself or together with the adhesive resin layer 13.

A first method of manufacturing the packaging laminated sheet 10 shown in FIG. 5(a) forms the chemical conversion coatings 15a and 15b on the opposite surfaces of the aluminum foil (barrier layer) 12 and forms the heat-sealable resin layer 14 by directly extruding a molten resin film on the chemical conversion coating 15b formed on the inner surface of the aluminum foil 12. A surface of the molten resin film forming the heat-sealable resin layer 14 on the side of the aluminum foil 12 is processed by ozone treatment to form an ozonated surface 17. The packaging laminated sheet 10 thus formed is heated at a temperature not lower than the softening point of the resin forming the heat-sealable resin layer 14. The heat-sealable resin layer 14 may be formed of a LLDPE resin or a MDPE resin.

A second method of manufacturing the packaging laminated sheet 10 shown in FIG. 5(b) forms the chemical conversion coatings 15a and 15b on the opposite surfaces of the aluminum foil (barrier layer) 12, bonds a heat-sealable film for the heat-sealable resin layer 14 to the chemical conversion coating 15b formed on the inner surface of the aluminum foil 12 with the adhesive resin layer 13 by a sandwich lamination method. A surface of a molten adhesive resin film for the adhesive resin layer 13 on the side of the aluminum foil 12 is processed by ozone treatment to form the ozonated surface 17. The packaging laminated sheet 10 thus formed is heated at a temperature not lower than the softening point of the adhesive resin layer 13. The adhesive resin layer 13 may be formed of a LLDPE resin or a MDPE resin.

A third method of manufacturing the packaging laminated sheet 10 shown in FIG. 5(c) forms chemical conversion coatings 15a and 15b on the opposite surfaces of an aluminum foil (barrier layer) 12, bonds a heat-sealable film for a heat-sealable resin layer 14 to the chemical conversion coating 15b formed on the inner surface of the aluminum foil 12 with an adhesive resin layer 13 by extruding a molten adhesive resin film for the adhesive resin layer 13 and a molten resin film for the heat-sealable resin layer 14 by a coextrusion lamination method. A surface of the molten adhesive resin film far the adhesive resin layer 13 on the side of the aluminum foil 12 is processed by ozone treatment to form the ozonated surface 17. The packaging laminated sheet 10 thus formed is heated at a temperature not lower than the softening point of the adhesive resin layer 13. The adhesive resin layer 13 may be formed of a LLDPE resin or a MDPE resin.

The packaging laminated sheet 10 may be heated during a lamination process. The first method of manufacturing the packaging laminated sheet 10 shown in FIG. 5(a) forms the chemical conversion coatings 15a and 15b on the opposite surfaces of the aluminum foil 12, heats the chemical conversion coating 15b at a temperature not lower than the softening point of the resin forming the heat-sealable resin layer 14 and extrudes the resin for forming the heat-sealable resin layer 14 in a film on the surface of the heated chemical conversion coating 15b, and processes the surface of the molten resin film for the heat-sealable resin layer 14 on the side of the aluminum foil 12 by ozone treatment. The heat-sealable resin layer 14 may be formed of a LLDPE resin or a MDPE resin.

The second method of manufacturing the packaging laminated sheet 10 shown in FIG. 5(b) forms the chemical conversion coatings 15a and 15b on the opposite surfaces of the aluminum foil 12, heats the chemical conversion coating 15b at a temperature not lower than the softening point of the adhesive resin forming the adhesive resin layer 13 and extrudes the adhesive resin for forming the adhesive resin layer 13 in a film on the surface of the heated chemical conversion coating 15b to bond a film for the heat-sealable resin layer 14 to the aluminum foil by sandwich lamination, and processes the surface of the molten adhesive resin film for adhesive resin layer 13 on the side of the aluminum foil 12 by ozone treatment. The adhesive resin layer 13 may be formed of a LLDPE resin or a MDPE resin.

Referring to FIG. 9, when manufacturing the packaging laminated sheet 10 shown in FIG. 5(b) a laminated film formed by bonding together the base layer 11 and the aluminum foil 12 is unwound from a laminated film roll 37a, a heat-sealable film is unwound from a heat-sealable film roll 36, the laminated film and the heat-sealable film are joined and pressed together between a chill roller 34 and a pressure roller 35, and a molten resin film 33 is extruded between the laminated film and the heat-sealable film through a die 32 by an extruder 31 and ozone is blown against a surface of the molten resin film 33 on the side of the aluminum foil 12 through an ozone blowing head 51 by an ozonating device 50. The packaging laminated sheet 10 thus formed is rolled in a packaging laminated sheet roll 37.

The third method of manufacturing the packaging laminated sheet 10 shown in FIG. 5(c) forms the chemical conversion coatings 15a and 15b on the opposite surfaces of the aluminum foil 12, heats the chemical conversion coating 15b at a temperature not lower than the softening point of the adhesive resin forming the adhesive resin layer 13 and extrudes an adhesive resin film for the adhesive resin layer 13 and a heat-sealable resin film for the heat-sealable resin layer 14 on the surface of the heated chemical conversion coating 15b by coextrusion to bond the heat-sealable film for the heat-sealable resin layer 14 to the aluminum foil, and processes the surface of the molten adhesive resin film for adhesive resin layer 13 on the side of the aluminum foil 12 by ozone treatment. The adhesive resin layer 13 may be formed of a LLDPE resin or a MDPE resin.

Referring to FIG. 10, when manufacturing the packaging laminated sheet 10 shown in FIG. 5(c), a laminated film formed by bonding together the base layer 11 and the aluminum foil 12 is unwound from a laminated film roll 46a, a molten resin film 43 consisting of an adhesive resin film for the adhesive resin layer 13 and a heat-sealable film for the heat-sealable resin layer 14 is extruded through a die 42 by extruders 41a and 41b onto a surface of the laminated film of the base layer 11 and the aluminum foil 12, and ozone is blown against a surface of the molten resin film 43 on the side of the aluminum foil 12 through an ozone blowing head 51 by an ozonating device 50. The packaging laminated sheet 10 thus formed is rolled in a packaging laminated sheet roll 46.

An ozone treatment method employed by the present invention blows ozone generated by an ozone generator against the surface of the molten resin film. Thus a surface processed by ozone treatment of the resin film on the side of the aluminum foil 12 is polarized, which improves the adhesive strength between the chemical conversion coating 15b formed on the aluminum foil 12, and the heat-sealable resin layer 14 or the adhesive resin layer 13. The extruded resin film can be firmly bonded to the chemical conversion coating by forming the molten resin film while the aluminum foil 12 is heated or by heating the aluminum foil 12 after forming the molten resin film on the aluminum foil 12.

The present invention employs an ozone generator that generates an ozone gas of an ozone concentration in the range of 0.6 to 10 g/m$^3$ at an ozone generating rate in the range of 2 to 20 l/min. An ozone gas of an ozone concentration of 400 g/m$^3$ or below is blown against the resin film.

The packaging laminated sheet 10 is heated for postheating at a temperature not lower than the softening point of the resin forming the molten resin film extruded onto the chemical conversion coating.

The packaging laminated sheet 10 is heated for preheating so that the surface facing the molten resin film of the chemical conversion coating is heated at a temperature not lower than the softening point of the resin forming the molten resin film.

The package body 5a for containing the polymer battery module 2, and the cover 5t are formed from the packaging laminated sheet, i.e., the polymer battery module packaging sheet. A pouch as shown in FIG. 6 or an embossed package as shown in FIG. 7(a), 7(b) or 7(c) is used for packaging the polymer battery module 2. The pouch may be a pillow-type pouch as shown in FIG. 6, a three-sided seal pouch or a four-sided seal pouch.

Figure 7:
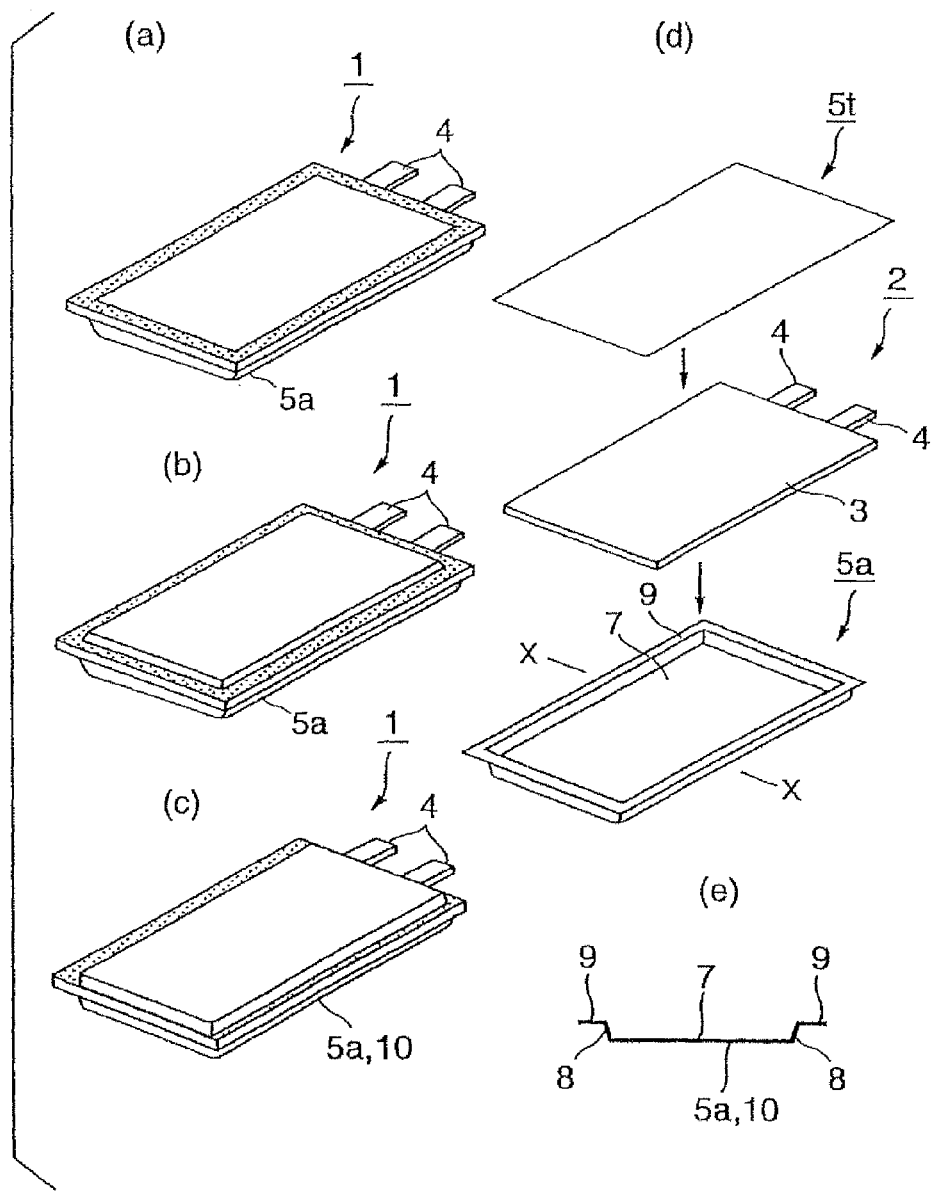
FIG. 7 is a view of assistance in explaining a polymer battery employing an embossed package.

The embossed package may be such as having a package body 5a having a hollow part 7 as shown in FIG. 7(a), such as formed by joining together two package bodies 5a each having a hollow part 7 and a flange and bonding together the corresponding four sides of the flanges as shown in FIG. 7(b) after putting a polymer battery module therein or such as formed by joining together two package bodies 5a each having a hollow part 7 and a flange and bonding together the corresponding three sides of the flanges as shown in FIG. 7(*c*) after putting a polymer battery module 2 therein.

Materials of the component layers of the packaging laminated sheet 10 according to the present invention and a method of laminating the component layers will be described hereinafter.

The base layer 11 of the packaging laminated sheet according to the present invention is a film of an oriented polyester resin or an oriented nylon resin. Possible polyester resins are PET resins, PBT resins, PEN resins, interpolyester resins, PC resins and the like. Possible nylons, i.e., polyamide resins, are nylon 6, nylon 66, copolymers of nylon 6 and nylon 66, nylon 610, polymethaxylilene adipamide (MXD6) and the like.

When the polymer battery is used on a device (hardware), the base layer 11 touches the device. Therefore, it is desirable to form the base layer 11 of an intrinsically insulating resin. Since a film forming the base layer 11 has pinholes and pinholes will be formed in the film during processing, the thickness of the base layer 11 must be 6 μm or above. Preferably, the thickness of the base layer 11 is in the range of 12 to 25 μm.

The base layer 11 may be a laminated film in view of providing the base layer 11 with a high pinhole-resistant property and an improved insulating ability.

Preferably, the base layer 11 includes at least one resin layer consisting of two or more layers each having a thickness of 6 μm or above, preferably, in the range of 12 to 25 μm. The following laminated structures 1) to 7) are examples of the laminated base layer 11.
1) Oriented PET resin layer/Oriented nylon layer
2) Oriented nylon layer/Oriented PET layer To improve the mechanical aptitude (stability when passed through processing machines and a packaging machine) and surface protecting ability (heat resistance and electrolyte resistance) of the packaging sheet and to reduce friction between a die and the base layer 11 when forming the embossed package body, it is preferable that the base layer 11 consists of plural layers and the surface of the base layer 11 is coated with a coating of a fluorocarbon resin, an acrylic resin, a silicone resin or a polyester resin. The base layer 11 may be any one of the following laminated films.
3) Fluorocarbon resin layer/Oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same.)
5) Fluorocarbon resin layer/Oriented PET resin layer/Oriented nylon layer
6) Silicone resin layer/Oriented PET resin layer/Oriented nylon layer
7) Acrylic resin layer/Oriented nylon layer (the acrylic resin layer may be an acrylic resin film or a film formed by spreading an acrylic resin and drying the same.)

The barrier layer (aluminum layer) 12 prevents the penetration of moisture into the polymer battery. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 μm or above and is formed from a foil of a metal, such as aluminum or nickel, or a film coated with an inorganic compound, such as silicon dioxide or alumina, by evaporation. Preferably, the barrier layer 12 is an aluminum foil of a thickness in the range of 20 to 80 μm.

The inventors of the present invention made studies to reduce pinholes and to prevent the cracking of an embossed battery package and found that an aluminum having an iron content in the range of 0.3 to 9.0% by weight, preferably, in the range of 0.7 to 2.0% by weight is more satisfactory in ductility than aluminum not containing any iron, and an aluminum foil of such aluminum is less subject to the formation of pinholes when a laminated sheet including the aluminum foil of such aluminum is folded and is more capable of facilitating forming walls of an embossed battery package than an aluminum foil of aluminum not containing any iron. Aluminum having an iron content less than 0.3% by weight is unable to form a satisfactorily pinhole-resistant foil and does not have improved formability. Aluminum having an iron content exceeding 9.0% by weight is unsatisfactory in flexibility and affects adversely to the workability of the laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of embossing may be used.

The inventors of the present invention found through studies that a satisfactory packaging laminated sheet can be formed by using an aluminum foil having opposite surfaces coated with the chemical conversion coatings 15*a* and 15*b* formed by chemical conversion treatment as the barrier layer 12. The chemical conversion treatment forms an acid-resistant film of a phosphate, a chromate, a fluoride or a triazine thiol compound. Thus the separation of the aluminum foil 12 and the base layer 11 during an embossing process can be prevented, the dissolution and corrosion of the surfaces of the aluminum foil 12, particularly, aluminum oxide films coating the aluminum foil, by hydrogen fluoride produced by the interaction of the electrolyte of the polymer battery module and moisture can be effectively prevented, the adhesive property (wettability) of the surface of the aluminum foil 12 is improved, the separation of the base layer and the aluminum foil can be prevented and the separation of the aluminum foil and the innermost layer due to the effect of hydrogen fluoride produced by the interaction between the electrolyte and moisture can be effectively prevented by the chemical conversion treatment of the aluminum foil.

It was found through experimental chemical conversion treatment using various substances that chemical conversion treatment method using a mixture of a phenolic resin, trivalent chromium phosphate and phosphoric acid has satisfactory effect.

When the packaging laminated sheet is intended for use for forming pouches, only one surface on the side of the innermost layer of the aluminum foil needs to be processed by the chemical conversion treatment.

When both the surfaces of the aluminum foil are coated with the chemical conversion coatings 15*a* and 15*b*, the separation of the aluminum foil and the base layer can be prevented when processing the packaging laminated sheet to form an embossed package. The packaging laminated sheet including the aluminum foil having both the surfaces coated with the chemical conversion coatings may be used for forming pouches.

As mentioned above, when the polymer battery module packaging sheet manufacturing method is used, the heat-sealable resin layer 14 or the adhesive resin layer 13 for bonding the heat-sealable resin layer 14 to the aluminum foil 12 may be a film of a PE resin.

When a film of a PE resin or a PEa resin for forming the adhesive resin layer 13 is bonded to the chemical conversion coating 15b by a sandwich lamination process, the adhesion of the film of the PE resin or the PEa resin to the chemical conversion coating 15b is insufficient. If an emulsion of the PEa resin is applied to the chemical conversion coating 15b by a roll coating method, the emulsion is dried in an emulsion film, the emulsion film is baked at a temperature in the range of 170 to 200° C. and the adhesive resin layer 13 of the PEa resin is bonded to the chemical conversion coating 15b by a sandwich lamination process, the adhesive strength between the chemical conversion coating 15b and the adhesive resin layer 13 is improved. However, the emulsion film is baked at a very low baking speed and the efficiency of the adhesive resin layer forming process is very low.

The inventors of the present invention made studies to develop a bonding method capable of bonding the adhesive resin layer 13 and the chemical conversion coating 15b with stable adhesive strength and have found that a packaging laminated sheet 10 having component layers bonded together with desired adhesive strength can be formed by bonding a base layer 11 to one of the surfaces processed by chemical conversion treatment of a barrier layer 12 by a dry lamination process while the molten resin film is subjected to ozone treatment and heating the packaging laminated sheet 10 or by subjecting the molten resin film to ozone treatment, heating the aluminum foil.

The packaging laminated sheet 10 may be heated by any one of a contact heating method using a hot roller, a hot air heating method using hot air and an infrared heating method using near or far infrared rays, provided that the adhesive resin can be heated at a temperature not lower than the softening point thereof.

PPa resins and PEa resins are possible resins for forming the heat-sealable resin layer 14. The packaging laminated sheet manufacturing method according to the present invention may use PE resins excellent in protective performance, workability and heat-sealability. Possible PE resins are MDPE resins, low-density PE resins (hereinafter referred to as "LDPE resins"), LLDPE resins and high-density PE resins (hereinafter referred to as "HDPE resins"). Preferably, the first method forms the heat-sealable resin layer of a MDPE resin or a MDPE resin. The second and the third method may use a MDPE resin or a LLDPE resin as the adhesive resin, and may use a LLDPE resin or a MDPE resin for forming the heat-sealable resin layer 14 may use a film of a LLDPE resin or a MMDPE resin as the heat-sealable resin layer 14.

Desired physical properties of the LLDPE resin are:
Softening point: 70° C. or above
Melting point: 112° C. or above
Density: 0.91 or above
Desired physical properties of the MDPE resin are:
Softening point: 80° C. or above
Melting point: 120° C. or above
Density: 0.92 or above The following are resins or combinations of resins for forming the heat-sealable resin layer 14, or the adhesive resin layer 13 and the heat-sealable resin layer 14.

Single-Film Extrusion
Heat-sealable resin layer 14: MDPE resin
Adhesive resin layer 13 as heat-sealable resin layer
(1) Adhesive resin layer 13 of MDPE resin/Heat-sealable resin layer 14 of LLDPE resin
(2) Adhesive resin layer 13 of MDPE resin/Heat-sealable resin layer 14 of MDPE resin The LLDPE and the MDPE resins may contain, as additives, a low-crystalline ethylene-butene copolymer, a low-crystalline propylene-butene copolymer, a terpolymer of ethylene, butene and propylene, silica, zeolite, an antiblocking agent (AB agent), such as acrylic resin beads, and/or a fatty amide lubricant.

The packaging laminated sheet 10 may have, in addition to the base layer 11, the barrier layer 12, the adhesive resin layer 13 and the heat-sealable resin layer 14 of a PE resin, an intermediate layer of a biaxially oriented film of a polyimide resin or a PET resin sandwiched between the barrier layer 12 and the heat-sealable resin layer 14. The intermediate layer is used to enhance the strength of the packaging laminated sheet to improve and stabilize barrier property and to prevent short circuit due to contact between the tabs and the barrier layer during a heat-sealing process.

The component layers of the packaging laminated sheet 10 may be processed by a surface activating treatment, such as a corona discharge treatment, a blasting treatment, an oxidation treatment or ozone treatment, to improve and stabilize film forming property, lamination property, formability (ease of forming pouches or embossed packages). The packaging laminated sheet may be coated with liquid paraffin in a coating weight in the range of 2 to 6 g/m$^2$.

Desirably, the base layer 11 of the packaging laminated sheet 10 is laminated to the chemical conversion coating of the barrier layer 12 by a dry lamination method.

Possible adhesive resins for forming the bonding layer 16 bonding the base layer 11 to the chemical conversion coating 15a of the barrier layer 12 are polyester resins, polyethylene imine resins, polyether resins, cyanoacrylate resins, urethane resins, organic titanium compounds, polyether-urethane resins, epoxy reins, polyester-urethane resins, imide resins, isocyanate resins, polyolefin resins and silicone resins.

EXAMPLES

Examples of the polymer battery module packaging sheet in the second embodiment will be described.

The chemical conversion treatment used an aqueous solution of a phenolic resin, a trivalent chromium fluoride compound and phosphoric acid as a processing liquid. The processing liquid was applied to the surface of the aluminum foil by a roll coating method in a film, and the film was baked at 180° C. or above. The weight per unit area of the film was 10 mg/m$^2$ (dry weight).

The following examples and comparative examples used an MDPE resin having a softening point of 110° C. and a melting point of 125° C., and an LLDPE resin having a softening point of 98° C. and a melting point of 115° C.

The ozone treatment process used a slit nozzle to blow ozone against the entire width of an extruded molten resin film. The ozone treatment was carried out under ozonizing conditions (A) and (B).

Ozonizing Condition (A)
Ozone gas generating rate: 20 l/min
Ozone concentration (as generated): 10 g/m$^3$ Ozone concentration (as used): 400 g/m$^3$
Ozonizing Condition (B)
Ozone gas generating rate: 2 l/min
Ozone concentration (as generated): 0.6 g/m$^3$
ozone concentration (as used): 5 g/m$^3$ Packaging laminated sheets in Examples 2-1 to 2-3 and Comparative examples 2-1 to 2-3 and 2-7 to 2-9 were subjected to heat-sealing to form 50 mm×80 mm pillow type pouches and polymer battery modules 2 were sealed in the pillow type pouches, respectively.

Packaging laminated sheets in Examples 2-4 to 2-6, Comparative examples 2-4 to 2-6 and 2-10 to 2-11 were subjected to an embossing process to form embossed packages each having a hollow part of 30 mm×50 mm×3.5 mm. The formability of the packaging laminated sheets was evaluated.

Example 2-1

Pouch

One of the surfaces of a 20 μm thick aluminum foil was subjected to chemical conversion treatment. A 16 μm thick oriented polyester film was laminated to the other surface, i.e., the surface not processed by the chemical conversion treatment, of the aluminum foil by a dry lamination method. A 30 μm thick molten resin film of an MDPE resin for forming a heat-sealable resin layer was extruded onto the surface processed by the chemical conversion treatment of the aluminum foil while a surface thereof to be joined to the aluminum foil was processed by ozone treatment to form a heat-sealable resin layer. A packaging laminated sheet thus formed was heated for postheating at a temperature not lower than the softening point of the MDPE resin to obtain a packaging laminated sheet in Example 2-1.

Example 2-2

Pouch

Both the surfaces of a 20 μm thick aluminum foil were subjected to chemical conversion treatment. A 12 μm thick oriented polyester film was laminated to one of the surfaces of the aluminum foil by a dry lamination method. A 30 μm thick molten resin film of an MDPE resin for forming a bonding layer was extruded onto the other surface processed by the chemical conversion treatment of the aluminum foil while a surface thereof to be joined to the aluminum foil was processed by ozone treatment to form an adhesive resin layer, and a 40 μm thick LLDPE resin film was bonded to the aluminum foil by the adhesive resin layer by a sandwich lamination method. A packaging laminated sheet thus formed was heated for postheating at a temperature not lower than the softening point of the MDPE resin to obtain a packaging laminated sheet in Example 2-2.

Example 2-3

Pouch

One of the surfaces of a 20 μm thick aluminum foil was subjected to chemical conversion treatment. A 16 μm thick oriented polyester film was laminated to the other surface not processed by the chemical conversion treatment of the aluminum foil by a dry lamination method. A 20 μm thick film of a molten MDPE resin for forming an adhesive resin layer and a 30 μm thick film of a molten LLDPE resin for forming a heat-sealable resin layer were coextruded through a coextrusion die onto the surface processed by the chemical conversion treatment of the aluminum foil while a surface to be joined to the aluminum foil of the molten resin film of the MDPE resin was processed by ozone treatment. A packaging laminated sheet thus formed was heated for postheating at a temperature not lower than the softening point of the MDPE resin to obtain a packaging laminated sheet in Example 2-3.

Example 2-4

Embossed Package

Both the surfaces of a 40 μm thick aluminum foil were subjected to chemical conversion treatment. A 25 μm thick oriented nylon film was laminated to one of the surfaces of the aluminum foil by a dry lamination method. A 30 μm thick molten resin film of an MDPE resin for forming a heat-sealable resin layer was extruded onto the other surface of the aluminum foil while a surface thereof to be joined to the aluminum foil was processed by ozone treatment. A packaging laminated sheet thus formed was heated for postheating at a temperature not lower than the softening point of the MDPE resin to obtain a packaging laminated sheet in Example 2-4.

Example 2-5

Embossed Package

Both the surfaces of a 40 μm thick aluminum foil were subjected to chemical conversion treatment. A 25 μm thick oriented nylon film was laminated to one of the surfaces of the aluminum foil by a dry lamination method. A 20 μm thick molten resin film of an MDPE resin for forming an adhesive resin layer was extruded onto the other surface of the aluminum foil while a surface thereof to be joined to the aluminum foil was processed by ozone treatment to form an adhesive resin layer, and a 30 μm thick film of LLDPE resin for forming a heat-sealable resin layer was bonded to the aluminum foil by the adhesive resin layer by a sandwich lamination method. A packaging laminated sheet thus formed was heated for postheating at a temperature not lower than the softening point of the MOPE resin to obtain a packaging laminated sheet in Example 2-5.

Example 2-6

Embossed Package

Both the surfaces of a 40 μm thick aluminum foil were subjected to chemical conversion treatment. A laminated film as a base layer consisting of a 12 μm thick biaxially oriented polyester film and a 15 μm thick biaxially oriented nylon film was laminated to one of the surfaces of the aluminum foil by a dry lamination method with the nylon film in contact with the aluminum foil. A 20 μm thick molten resin film of an MOPE resin for forming an adhesive resin layer and a 30 μm thick molten resin film of an LLDPE for forming a heat-sealable resin layer were coextruded through a coextrusion die while a surface to be joined to the aluminum foil of the molten resin film of the MOPE resin was processed by ozone treatment. A packaging laminated sheet thus formed was heated for postheating at a temperature not lower than the softening point of the MOPE resin to obtain a packaging laminated sheet in Example 2-6.

Comparative Example 2-1

Pouch

One of the surfaces of a 20 µm thick aluminum foil was subjected to chemical conversion treatment. A 16 µm thick oriented polyester film was laminated to the other surface not processed by the Chemical conversion treatment of the aluminum foil by a dry lamination method. A 30 µm thick molten resin film of an MOPE resin for forming a heat-sealable resin layer was extruded onto the surface processed by the chemical conversion treatment of the aluminum foil to form a heat-sealable resin layer. A packaging laminated sheet thus formed was heated for postheating at a temperature not lower than the softening point of the MDPE resin to obtain a packaging laminated sheet in Comparative example 2-1.

Comparative Example 2-2

Pouch

Both the surfaces of a 20 µm thick aluminum foil were subjected to chemical conversion treatment. A 12 µm thick oriented polyester flint was laminated to one of the surfaces of the aluminum foil by a dry lamination method. A 30 µm thick molten resin film of an MOPE resin forming an adhesive resin layer was extruded onto the other surface of the aluminum foil to form an adhesive resin layer, and a 40 µm thick film of LLDPE resin was bonded to the aluminum foil by the adhesive resin layer by a sandwich lamination method. A packaging laminated sheet thus formed was heated for postheating at a temperature not lower than the softening point of the NAPE resin to obtain a packaging laminated sheet in Comparative example 2-2.

Comparative Example 2-3

Pouch

One of the surfaces of a 20 µm thick aluminum foil was subjected to chemical conversion treatment. A 16 µm thick oriented polyester film was laminated to the other surface not processed by the chemical conversion treatment of the aluminum foil by a dry lamination method. A 20 µm thick molten resin film of an MDPE resin for forming an adhesive resin layer and a 30 µm thick molten resin film of an LLDPE resin for forming a heat-sealable resin layer were coextruded through a coextrusion die onto the surface processed by the chemical conversion treatment of the aluminum foil. A packaging laminated sheet thus formed was heated for postheating at a temperature not lower than the softening point of the MDPE resin to obtain a packaging laminated sheet in Comparative example 2-3.

Comparative Example 2-4

Embossed Package

One of the surfaces of a 40 µm thick aluminum foil was subjected to chemical conversion treatment. A 256 µm thick oriented nylon film was laminated to the other surface not processed by the chemical conversion treatment of the aluminum foil by a dry lamination method. A 30 µm thick molten resin film of an MOPE resin for forming a heat-sealable resin layer was extruded onto the surface processed by the chemical conversion treatment of the aluminum foil. A packaging laminated sheet thus formed was heated for postheating at a temperature not lower than the softening point of the MDPE resin to obtain a packaging laminated sheet in Comparative example 2-4.

Comparative Example 2-5

Embossed Package

One of the surfaces of a 40 µm thick aluminum foil was subjected to chemical conversion treatment. A 25 µm thick oriented nylon film was laminated to the other surface not processed by the chemical conversion treatment of the aluminum foil by a dry lamination method. A 20 µm thick molten resin film of an MDPE resin for forming an adhesive resin layer was extruded onto the surface processed by the chemical conversion treatment of the aluminum foil and a 30 µm thick film of an LLDPE resin for forming a heat-sealable resin layer was bonded to the aluminum foil by a sandwich lamination method. A packaging laminated sheet thus formed was heated for postheating at a temperature not lower than the softening point of the MDPE resin to obtain a packaging laminated sheet in Comparative example 2-5.

Comparative Example 2-6

Embossed Package

One of the surfaces of a 40 µm thick aluminum foil was subjected to chemical conversion treatment. A 25 µm thick oriented nylon film was laminated to the other surface not processed by the chemical conversion treatment of the aluminum foil by a dry lamination method. A 20 µm thick molten resin film of an MOPE resin for forming an adhesive resin layer and a 30 µm thick molten resin film of an LLDPE resin for forming a heat-sealable resin layer were coextruded through a coextrusion die onto the surface processed by the chemical conversion treatment of the aluminum foil. A packaging laminated sheet thus formed was heated for postheating at a temperature not lower than the softening point of the MOPE resin to obtain a packaging laminated sheet in Comparative example 2-6.

Comparative Example 2-7

Pouch

A packaging laminated sheet in Comparative example 2-7 was formed by the same method as that by which the packaging laminated sheet in Example 2-1 was formed, except that the former was not heated for postheating.

Comparative Example 2-8

Pouch

A packaging laminated sheet in Comparative example 2-8 was formed by the same method as that by which the packaging laminated sheet in Example 2-2 was formed, except that the former was not heated for postheating.

Comparative Example 2-9

Pouch

A packaging laminated sheet in Comparative example 2-9 was formed by the same method as that by which the packaging laminated sheet in Example 2-3 was formed, except that the former was not heated for postheating.

Comparative Example 2-10

Pouch

A packaging laminated sheet in Comparative example 2-10 was formed by the same method as that by which the packaging laminated sheet in Example 2-4 was formed, except that the former was not heated for postheating.

Comparative Example 2-11

Pouch

A packaging laminated sheet in Comparative example 2-11 was formed by the same method as that by which the packaging laminated sheet in Example 2-5 was formed, except that the former was not heated for postheating.

Comparative Example 2-12

Pouch

A packaging laminated sheet in Comparative example 2-12 was formed by the same method as that by which the packaging laminated sheet in Example 2-6 was formed, except that the former was not heated for postheating.

Fabrication of Pouches and Embossed Packages and Packaging

Pouches were formed by processing the packaging laminated sheets in Examples 2-1 to 2-3 and those in Comparative examples 2-1 to 2-3 and 2-7 to 2-12. Embossed packages were formed by embossing the packaging laminated sheets in Examples 2-4 to 2-6 and those in Comparative examples 2-4 to 2-6. Polymer battery modules were sealed in those pouches and embossed packages to form polymer batteries, respectively. The polymer batteries were subjected to tests and their performance was evaluated. One hundred test samples were tested for each of the aforesaid conditions.

Method of Evaluation

1) Chemical Resistance Test

Samples were inspected for the separation of the aluminum foil and the PE resin film after keeping the samples in an atmosphere of 60° C. and 90% RH in a thermostat for seven days.

2) Delamination During Heat-Sealing Process

Samples were inspected for the separation of the base layer and the aluminum foil after keeping the same at 90° C. for 24 hr after the packaging laminated sheets had been processed for heat-sealing or embossing at 190° C. and 98 N/cm² for 5 s.

Results

None of the packaging laminated sheets in Examples 2-1 to 2-6 formed under the ozonizing conditions (A) and (B) was delaminated by embossing or heat-sealing and the base layer and the aluminum foil of each of the sample packaging laminated sheets in Examples 2-1 to 2-6 were not separated by the detrimental effect of the polymer battery modules on the pouches and embossed packages.

None of the packaging laminated sheets in Comparative examples 2-1 to 2-3 was not delaminated during the fabrication of the pouches. However, all the packaging laminated sheets in Comparative examples 2-1 to 2-3 were delaminated by the chemical resistance test.

Eighty sample packaging laminated sheets among the hundred sample packaging laminated sheets in Comparative examples 2-4 to 2-6 were delaminated by heat-sealing. However, all the packaging laminated sheets in Comparative examples 2-4 to 2-6 were delaminated by the chemical resistance test.

None of the packaging laminated sheets in Comparative examples 2-7 to 2-9 formed under the ozonizing conditions (A) and (B) was delaminated heat-sealing for the formation of the pouches. However, all the packaging laminated sheets in Comparative examples 2-7 to 2-9 were delaminated by the chemical resistance test.

The base layer and the aluminum foil of each of the sample packaging laminated sheets in Comparative examples 2-10 to 2-12 formed under the ozonizing conditions (A) and (B) were not separated during heat-sealing. However, all the packaging laminated sheets in Comparative examples 2-10 to 2-12 were delaminated by the chemical resistance test.

The chemical conversion treatment of the opposite surfaces of the aluminum foil prevents the separation of the base layer and the aluminum foil during embossing and heat-sealing. The separation of the aluminum foil and the innermost layer can be prevented because the surfaces of the aluminum foil are not corroded by hydrogen fluoride that may be produced by interaction between the electrolyte of the polymer battery module and moisture.

When forming the heat-sealable resin layer of the packaging laminated sheet by an extrusion lamination method, a sandwich lamination method or a coextrusion lamination method, the surface of the molten resin film of the resin to be bonded to the surface processed by the chemical conversion treatment of the aluminum foil is subjected to the ozonizing treatment and the packaging laminated sheet as formed is heated at a temperature not lower than the softening point of the resin. Therefore the heat-sealable resin layer can be formed of a polyethylene resin, which is advantageous in respect of workability and economy as compared with acid-modified polyolefin resins and metal crosslinked polyethylene resins.

Third Embodiment

A packaging laminated sheet, i.e., a polymer battery module packaging sheet, in a third embodiment according to the present invention has component layers laminated with stable adhesive strength and is capable of being efficiently produced. Materials of the packaging laminated sheet and methods of forming the packaging laminated sheet will be described hereinafter.

The inventors of the present invention found through earnest studies of packaging sheets for packaging polymer batteries to develop packaging laminated sheets that will not be delaminated by heat-sealing that a satisfactory packaging structure can be made by processing the opposite surfaces of an aluminum foil to chemical conversion treatment, laminating a molten resin film of a PPa resin, such as an unsaturated carboxylic acid graft random propylene resin, and a molten resin film of a PP resin to one of the surfaces of the aluminum foil by a coextrusion lamination method and subjecting the packaging laminated sheet to postheating and have made the present invention.

As shown in FIGS. 5(b) and 5(c), a packaging laminated sheet 10, i.e., a polymer battery module packaging sheet, in the third embodiment includes, at least a base layer 11, a bonding layer 16, an aluminum foil 12, a chemical conversion coating 15b formed on one of the opposite surfaces of the aluminum foil 12, a chemical conversion coating 15b formed on the other surface of the aluminum foil, an adhesive resin layer 13 and an innermost layer 14. The adhesive resin layer 13 and the innermost layer 14 are formed by a coextrusion lamination method.

As shown in FIGS. 5(b) and 5(c), the opposite surfaces of the aluminum foil (barrier layer) 12 are coated with the chemical conversion coatings 15a and 15b, the adhesive resin layer 13 and the innermost layer 14 are laminated to the inner surface of the aluminum foil 12 by a coextrusion lamination method and a structure thus formed is subjected to postheating that heats the structure at a temperature not lower than the softening point of the adhesive resin forming the adhesive resin layer 13 to complete the packaging laminated sheet 10.

The base layer 11 is an oriented polyester or nylon film. Possible polyester resins are PET resins, PET resins, PEN resins, PEN resins, interpolyester resins, PC resins and the like. Possible nylon resins are nylon 6, nylon 66, copolymers of nylon 6 and nylon 66, nylon 610, polymethaxylilene adipamide (MXD6) and the like.

When the polymer battery is used on a piece of hardware, the base layer 11 comes into direct contact with the piece of hardware. Therefore, it is basically desirable to form the base layer 11 of an intrinsically insulating resin. Since a film forming the base layer 11 has pinholes and pinholes will be formed in the film during processing, the thickness of the base layer 11 must be 6 µm or above, preferably, in the range of 12 to 25 µm.

The base layer 11 may be a laminated film in view of providing the base layer 11 with pinhole resistance and improved insulating ability.

A laminated film for the base layer 11 includes at least one resin layer consisting of two or more layers each having a thickness of 6 µm or above, preferably, in the range of 12 to 25 µm. The following laminated structures 1) to 7), not shown, are examples of the laminated base layer 11.

1) Oriented PET resin layer/Oriented nylon layer
2) Oriented nylon layer/oriented PET resin layer To improve the mechanical aptitude (stability when passed through processing machines and a packaging machine) and surface protecting ability (heat resistance and electrolyte resistance) of the packaging sheet and to reduce friction between a die and the base layer 11 when embossing the packaging laminated sheet, it is preferable that the base layer 11 consists of plural layers and the surface of the base layer 11 is coated with a fluorocarbon resin, an acrylic resin or a silicone resin. The base layer 11 may be any one of the following laminated films.

3) Fluorocarbon resin layer/Oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same.)
5) Fluorocarbon resin layer/Oriented PET resin layer/Oriented nylon layer
6) Silicone resin layer/Oriented PET resin layer/Oriented PET resin layer/Oriented nylon layer
7) Acrylic resin layer/oriented nylon layer (the acrylic resin layer may be an acrylic resin film or a film formed by spreading an acrylic resin and drying the same.)

The base layer 11 is laminated to the aluminum foil 12 by a dry lamination method, an extrusion lamination method or any suitable method.

The aluminum foil 12, which will be also referred to as a barrier layer 12, of the polymer battery module packaging sheet prevents the penetration of moisture into the polymer battery. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 µm or above and is formed from a metal foil, such as an aluminum foil or a nickel foil, having a thickness of 15 µm or above, or a film coated with an inorganic compound, such as silicon dioxide or alumina, by evaporation. Preferably, the barrier layer 12 is an aluminum foil of a thickness in the range of 15 to 80 µm.

The inventors of the present invention made studies to reduce pinholes and to prevent the cracking of an embossed package and found that aluminum having an iron content in the range of 0.3 to 9.0% by weight, preferably, 0.7 to 2.0% by weight is more satisfactory in ductility than aluminum not containing any iron and an aluminum foil (barrier layer 12) of such aluminum is less subject to the formation of pinholes when the packaging laminated sheet is bent and is more capable of facilitating forming the side walls of the embossed package than an aluminum foil of aluminum not containing any iron. Aluminum foils of aluminum having an iron content less than 0.3% by weight are not satisfactorily pinhole-resistant and do not improve the formability of the packaging laminated sheet. Aluminum foils of aluminum having an iron content exceeding 0.9% by weight are unsatisfactory in flexibility and affect adversely to the workability of the packaging laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a slightly or completely annealed, soft aluminum foils are preferable to unannealed, hard aluminum foils.

The inventors of the present invention found that the dissolution and corrosion of the inner surface of the aluminum foil, particularly, an aluminum oxide film coating the aluminum foil, by hydrogen fluoride produced by the interaction of the electrolyte of the polymer battery and moisture can be prevented, the adhesive property (wettability) of the surfaces of the aluminum foil can be improved and the adhesive strength between the aluminum foil and the adhesive resin layer when forming the packaging laminated sheet can be stabilized by forming acid-resistant coating on the surfaces of the aluminum foil and subjecting the packaging laminated sheet to an adhesive strength enhancing process.

Component layers of the layer on the inner surface of the aluminum foil 12 of the packaging laminated sheet are formed by a coextrusion lamination method. The adhesive resin layer 13 and the innermost layer 14 are formed and are bonded to the surface of the aluminum foil coated with the chemical conversion coating by coextrusion. The innermost layers 14 can be bonded together by heat-sealing. Desirably, the innermost layer 14 is a film of a material having necessary properties including a heat-resistant property, a moistureproof property and press-formability, such as a cast PP resin (CPP resin). A PPa resin film and a cast PP resin film are coextruded in a laminated film onto the surface of the aluminum foil coated with the chemical conversion coating with the PPa resin film in contact with the aluminum foil.

The packaging laminated sheet i.e., the polymer battery module packaging sheet, may be provided, in addition to the base layer 11, the barrier layer 12, the adhesive resin layer 13 and the innermost layer (CPP resin layer) 14, an intermediate layer sandwiched between the barrier layer 12 and the adhesive resin layer 13. The intermediate layer is employed to enhance the strength of the packaging laminated sheet and to improve and stabilize the barrier property of the packaging laminated sheet.

The inventors of the present invention found through studies that a satisfactory packaging laminated sheet can be formed by using an aluminum foil having opposite surfaces coated with the chemical conversion coatings 15a and 15b formed by chemical conversion treatment as the barrier layer 12 as shown in FIGS. 5(b) and 5(c). The chemical conversion treatment forms acid-resistant films of a phosphate, a chromate, a fluoride or a triazine thiol compound. Thus the separation of the aluminum foil 12 and the base layer 11 during an embossing process can be prevented, the dissolution and corrosion of the surfaces of the aluminum foil 12, particularly, aluminum oxide films coating the aluminum foil, by hydrogen fluoride produced by the interaction of the electrolyte of the polymer battery module and moisture can be prevented, the adhesive property (wettability) of the surface of the aluminum foil 12 is improved, the separation of the base layer and the aluminum foil during heat-sealing can be prevented and the separation of the aluminum foil and the base layer during embossing can be prevented.

It was found through experimental chemical conversion treatment using various substances that chemical conversion treatment method using a mixture of a phenolic resin, trivalent chromium fluoride and phosphoric acid has satisfactory effect. The weight per unit area of the film is on the order of 10 mg/m$^a$ (dry weight).

When the packaging laminated sheet is intended for use for forming pouches, only one surface on the side of the innermost layer of the aluminum foil 12 needs to be processed by the chemical conversion treatment.

When both the surfaces of the aluminum foil are processed by the chemical conversion treatment, the separation of the aluminum foil 12 and the base layer 11 can be prevented when embossing the packaging laminated sheet. The packaging laminated sheet including the aluminum foil 12 having both the surfaces processed by the chemical conversion treatment may be used for forming pouches.

When manufacturing the packaging laminated sheet of the present invention, the opposite surfaces of the aluminum foil 12, i.e., the barrier layer, are processed by chemical conversion treatment the base layer is bonded to one of the surfaces of the aluminum foil 12 by a dry lamination method, and molten resin films of resins for forming the adhesive resin layer 13 and the innermost layer 14 are extruded by a coextrusion lamination method onto the other surface of the aluminum foil 12.

Although the productivity of the laminating process using coextrusion is satisfactory, the adhesion of the adhesive resin layer 13 to the chemical conversion coating of the aluminum foil is not as high as an adhesion required of the packaging laminated sheet when a film of a PPa resin for forming the adhesive resin layer 13 and a film of a CPP resin for forming the innermost layer 14 are coextruded onto the surface treated by chemical conversion treatment of the aluminum foil. The inventors of the present invention found through earnest studies that the adhesive strength between the adhesive resin layer and the chemical conversion coating can be increased by heating the packaging laminated sheet as formed. The packaging laminated sheet may be heated by any one of a contact heating method using a hot roller, a hot air heating method using hot air and an infrared heating method using near or fax infrared rays, provided that the adhesive resin forming the adhesive resin layer can be heated at a temperature not lower than the softening point thereof.

Cast PP resin films are suitable for forming the innermost layer 14. Cast PP resin films are satisfactory in heat-sealability, have excellent protective properties including moistureproof and heat-resistant properties required of the innermost layer 14, facilitate a lamination process and an embossing process for embossing the packaging laminated sheet.

Possible resins for forming the cast PP resin film are ham type PP resins having a melting point of 150° C. or above, ethylene-propylene copolymers (random copolymers) having a melting point of 130° C. or above, ethylene-butene-propylene terpolymers. Those resins may be used either individually or in combination. The innermost layer 14 may be either a single-layer film or a multilayer film.

The PP resin forming the cast PP resin film may contain 5% or above of a low-crystalline ethylene-butene copolymer, a low-crystalline propylene-butene copolymer, an amorphous ethylene-propylene copolymer or an amorphous propylene-ethylene copolymer to give the packaging laminated sheet flexibility to improve the folding property of the packaging laminated sheet and to prevent the cracking of the packaging laminated sheet during forming.

Possible resins for forming the bonding layer 16 used for bonding together the base layer 11 and the barrier layer 12 by dry lamination are polyester resins, polyethylene imine resins, polyether resins, cyanoacrylate resins, urethane resins, organic titanium compounds, polyether-urethane resins, epoxy resins, polyester-urethane resins, imide resins, isocyanate resins, polyolefin resins, silicone resins and the like.

EXAMPLES

Packaging laminated sheets in examples of the third embodiment will be described hereinafter.

The chemical conversion treatment used an aqueous solution of a phenolic resin, a trivalent chromium fluoride compound and phosphoric acid as a processing liquid. The processing liquid was applied to the surface of the aluminum foil by a roll coating method in a film, and the film was baked at 180° C. or above. The weight per unit area of the film was 10 mg/m$^2$ (dry weight).

Packaging laminated sheets in Example 3-1 and Comparative examples 3-1 and 3-3 were subjected to heat-sealing to form 50 mm×80 mm pillow type pouches and polymer battery modules were sealed in the pillow type pouches, respectively.

Packaging laminated sheets in Example 3-2 and Comparative examples 3-2 and 3-4 were subjected to an embossing process to form embossed packages each having a hollow part of 30 mm×50 mm×3.5 mm. The formability of the packaging laminated sheets was evaluated.

Adhesive films of unsaturated carboxylic acid graft random polypropylene resin having a thickness of 20 μm were wound around parts to be contiguous with the pouch or the embossed package of the tabs of polymer battery modules, and the pouch or the embossed package was heat-sealed.

Example 3-1

Pouch

Both the surfaces of a 20 μm thick aluminum foil were subjected to chemical conversion treatment. An oriented polyester film was laminated to one of the surfaces of the aluminum foil by a dry lamination method. A laminated film of a 20 μm thick molten resin film of a PPa resin having a softening point of 120° C. and a 30 μm thick molten resin film of a PP resin was bonded to the other surface of the aluminum foil by a coextrusion lamination method such that the molten resin film of the PPa resin is in contact with the surface of the aluminum foil. A packaging laminated sheet thus formed was heated so that the surfaces of the aluminum foil were heated at 150° C. to obtain the packaging laminated sheet in Example 3-1.

Example 3-2

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick molten resin film of a PPa resin having a softening point of 120° C. and a 30 μm thick molten resin film of a PP resin was bonded to the other surface of the aluminum foil by a coextrusion lamination method such that the molten resin film of the PPa resin is in contact with the aluminum foil. A packaging laminated sheet thus formed was heated so that the surfaces of the aluminum foil were heated at 150° C. to obtain a packaging laminated sheet in Example 3-2.

Comparative Example 3-1

Pouch

Both the surfaces of a 20 μm thick aluminum foil were subjected to chemical conversion treatment. An oriented polyester film was laminated to one of the surfaces of the aluminum foil by a dry lamination method. A laminated film of a 20 μm thick molten resin film of a PPa resin having a softening point of 120° C. and a 30 μm thick molten resin film of a PP resin was bonded to the other surface of the aluminum foil by a coextrusion lamination method such that the molten resin film of the PPa resin is in contact with the surface of the aluminum foil to obtain a packaging laminated sheet in Comparative example 3-1.

Comparative Example 3-2

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick molten resin film of a PPa resin having a softening point of 120° C. and a 30 μm thick molten resin film of a PP resin was bonded to the other surface of the aluminum foil by a coextrusion lamination method such that the molten resin film of the PPa resin is in contact with the aluminum foil to obtain a packaging laminated sheet in Comparative example 3-2.

Comparative Example 3-3

Pouch

An oriented polyester film was laminated to one of the surfaces of a 40 μm thick aluminum foil by a dry lamination method. A laminated film of a 20 μm thick molten resin film of a PPa resin having a softening point of 120° C. and a 30 μm thick molten resin film of a PP resin was bonded to the other surface of the aluminum foil by a coextrusion lamination method such that the molten resin film of the PPa resin is in contact with the aluminum foil to obtain a packaging laminated sheet in Comparative example 3-3.

Comparative Example 3-4

Embossed Package

A 25 μm thick nylon film was laminated to one of the surfaces of a 40 μm thick aluminum foil by a dry lamination method. A laminated film of a 20 μm thick molten resin film of a PPa resin having a softening point of 120° C. and a 30 μm thick molten resin film of a PP resin was bonded to the other surface of the aluminum foil by a coextrusion lamination method such that the molten resin film of the PPa resin is in contact with the aluminum foil to complete a packaging laminated sheet in Comparative example 3-4.

Embossing and Packaging

Pouches were formed by processing the packaging laminated sheets in Example 3-1 and Comparative examples 3-1 and 3-3, embossed packages were formed by press-forming the packaging laminated sheets in Example 3-2 and Comparative examples 3-2 and 3-4, and polymer battery modules were packaged in the pouches and the embossed packages to form polymer batteries. The polymer batteries were evaluated by the following methods.

Evaluating Methods

1) Delamination During Forming

Samples were inspected for the separation of the base layer and the aluminum foil immediately after forming.

2) Chemical Resistance Test

Samples were inspected for the separation of the aluminum foil and the innermost film, i.e., a cast PP resin film, after keeping the samples in an atmosphere of 60° C. and 90% RH in a thermostat for seven days.

3) Delamination During Seat-Sealing Process

Samples were inspected for the separation of the innermost layer and the aluminum foil immediately after heat-sealing.

Results

The packaging laminated sheets in Examples 3-1 and 3-2 were not delaminated by embossing and heat-sealing. The packaging laminated sheets in Comparative examples 3-1 and 3-2 were not delaminated by heat-sealing. The packaging laminated sheet in Comparative example 3-2 was not delaminated by embossing. All the hundred sample packaging laminated sheets in Comparative examples 3-1 and 3-2 were delaminated, which was not due to the corrosion of the inner surface of the aluminum foil but was due to the separation of the PPa resin film from the surface treated by the chemical conversion treatment of the aluminum foil.

Forty sample packaging laminated sheets out of one hundred sample packaging laminated sheets in Comparative example 3-3 and forty-six sample packaging laminated sheets out of one hundred sample packaging laminated sheets in Comparative example 3-4 were delaminated by heat-sealing. Twenty-two sample packaging laminated sheets out of one hundred sample packaging laminated sheets in Comparative example 3-4 were delaminated by embossing. All the one hundred sample packaging laminated sheets were delaminated due to the corrosion of the inner surface of the aluminum foils caused by the chemical resistance test.

The chemical conversion treatment of the opposite surfaces of the aluminum foil prevents the separation of the base layer and the aluminum foil during an embossing process and heat-sealing. The separation of the aluminum foil and the innermost layer can be prevented because the surfaces of the aluminum foil are not corroded by hydrogen fluoride that may be produced by interaction between the electrolyte of the polymer battery module and moisture.

Since the formation of the innermost layer and the lamination of the same to the aluminum foil can be simultaneously accomplished, the packaging laminated sheet can be efficiently manufactured. Postheating can enhance the adhesive strength between the adjacent layers of the packaging laminated sheet.

Fourth Embodiment

A packaging laminated sheet, i.e., a polymer battery module packaging sheet, in a fourth embodiment according to the present invention has a moistureproof property, and is resistant to the detrimental effects of the polymer battery module and capable of being manufactured at a high productivity. When forming the packaging laminated sheet, the opposite surfaces of a barrier layer are subjected to chemical conversion treatment, a heat-sealable film is laminated to the barrier layer by a sandwich lamination method to form a laminated sheet and the laminated sheet is subjected to a heating process to enhance the adhesive strength between the barrier layer and the heat-sealable film.

The inventors of the present invention made earnest studies to develop a packaging laminated sheet that will not be delaminated by embossing and heat-sealing, is resistant to the detrimental effect of a polymer battery and has satisfactory properties, found that such a packaging laminated sheet can be obtained by subjecting both the surfaces of an aluminum foil to chemical conversion treatment, forming an adhesive resin layer by extruding a PPa resin, such as an unsaturated carboxylic acid graft random propylene resin, on the inner surface of the aluminum foil, bonding a PP resin film to the aluminum foil by the adhesive resin layer by a sandwich lamination method to form a laminated sheet and subjecting the laminated sheet to postheating, and have made the present invention.

As shown in FIGS. 5(b) and 5(c), a packaging laminated sheet 10, i.e., a polymer battery module packaging sheet, in the fourth embodiment has, as essential components, a base layer 11, a bonding layer 16, a chemical conversion coating 15a, a barrier layer (an aluminum foil) 12, a chemical conversion coating 15b, an adhesive resin layer 13 and a heat-sealable resin layer (innermost layer) 14, such as a PP resin film. The heat-sealable resin layer 14 is bonded to the chemical conversion coating 15b with the adhesive resin layer 13 by sandwich lamination. The packaging laminated sheet 10 is subjected to postheating after the same has been formed to enhance the adhesive strength between the adjacent layers. The adhesive resin layer 13 and the heat-sealable resin layer 14 constitute an innermost layer.

As shown in FIGS. 5(b) and 5(c), the chemical conversion coatings 15a and 15b coat both the surfaces of the aluminum foil 12, respectively, and the heat-sealable resin layer 14 is bonded to the inner surface of the barrier 12 with the extruded adhesive resin layer 13 by sandwich lamination. The packaging laminated sheet 10 is subjected to postheating to heat the same at a temperature not lower than the softening point of the resin forming the adhesive resin layers.

As shown in FIGS. 5(b) and 5(c), the packaging laminated sheet 10 has at least the base layer 11, the chemical conversion coating 15a, the barrier layer 12, the chemical conversion coating 15b, the adhesive resin layer 13 and the heat-sealable resin layer 14. The heat-sealable resin layer 14 is bonded to the barrier layer 14 by a sandwich lamination method. The heat-sealable resin layer 14 is a nonoriented PP resin film. When the packaging laminated sheet 10 is intended for forming an embossed package body 5a as shown in FIG. 2, the packaging laminated sheet 10 must be excellent in formability. Materials of the layers and processes for bonding the layers will be described hereinafter.

The base layer 11 is an oriented polyester film or an oriented nylon film. Possible polyester resins for forming the base layer 11 are PET resins, PBT resins, PEN resins, PBN resins, interpolyester resins, PC resins and the like. Possible nylon resins for forming the base layer 11 are polyamide resins including nylon 6, nylon 66, copolymers of nylon 6 and nylon 66, nylon 610, polymethaxylilene adipamide (MXD6) and the like.

When the polymer battery is used on a piece of hardware, the base layer 11 comes into direct contact with the piece of hardware. Therefore, it is basically desirable to form the base layer 11 of an intrinsically insulating resin. Since a film forming the base layer 11 has pinholes and pinholes will be formed in the film during processing, the thickness of the base layer 11 must be 6 µm or above, preferably, in the range of 12 to 25 µm.

The base layer 11 may be a laminated film in view of providing the base layer 11 with pinhole resistance and improved insulating ability.

A laminated film for the base layer 11 includes at least one resin layer consisting of two or more layers each having a thickness of 6 µm or above, preferably, in the range of 12 to 25 µm. The following laminated structures 1) to 7), not shown, are examples of the laminated base layer 11.
1) Oriented PET resin layer/Oriented nylon layer
2) Oriented nylon layer/Oriented PET resin layer
To improve the mechanical aptitude (stability when passed through processing machines and a packaging machine) and surface protecting ability (heat resistance and electrolyte resistance) of the packaging sheet and to reduce friction between a die and the base layer 11 when forming the embossed package body 5a, it is preferable that the base layer 11 consists of plural layers and the surface of the base layer 11 is coated with a fluorocarbon resin, an acrylic resin or a silicone resin. The base layer 11 may be any one of the following laminated films.
3) Fluorocarbon resin layer/Oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same.)
5) Fluorocarbon resin layer/Oriented PET resin layer/Oriented nylon layer
6) Silicone resin layer/oriented PET resin layer/Oriented nylon layer 7) Acrylic resin layer/Oriented nylon layer (the acrylic resin layer may be an acrylic resin film or a film formed by spreading an acrylic resin and drying the same.)

The aluminum foil (barrier layer) 12 prevents the penetration of moisture into the polymer battery. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 μm or above and is formed from a metal foil, such as an aluminum foil or a nickel foil, or a film coated with an inorganic compound, such as silicon dioxide or alumina, by evaporation. Preferably, the barrier layer 12 is an aluminum foil of a thickness in the range of 20 to 80 μm.

The inventors of the present invention made studies to reduce pinholes and to prevent the cracking of an embossed package and found that aluminum having an iron content in the range of 0.3 to 9.0% by weight, preferably, 0.7 to 2.0% by weight is more satisfactory in ductility than aluminum not containing any iron, an aluminum foil of such aluminum is less subject to the formation of pinholes when the packaging laminated sheet is bent and is more capable of facilitating forming the side walls of the embossed package than an aluminum foil of aluminum not containing any iron. Aluminum foils of aluminum having an iron content less than 0.3% by weight are not satisfactorily pinhole-resistant and do not improve the formability of the packaging laminated sheet. Aluminum foils of aluminum having an iron content exceeding 0.9% by weight are unsatisfactory in flexibility and affect adversely to the workability of the packaging laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of forming may be used.

The inventors of the present invention found through studies that a satisfactory packaging laminated sheet can be formed when both the surfaces of the aluminum foil 12 are processed by chemical conversion treatment. The chemical conversion treatment forms an acid-resistant film of a phosphate, a chromate, a fluoride or a triazine thiol compound. The acid-resistant film prevents the separation of the aluminum foil and the base layer during an embossing process, and the dissolution and corrosion of the surfaces of the aluminum foil, particularly, aluminum oxide films coating the aluminum foil, by hydrogen fluoride produced by the interaction of the electrolyte of the polymer battery module and moisture, improves the adhesive property (wettability) of the surfaces of the aluminum foil, and prevents the separation of the aluminum foil and the base layer during an embossing process and a heat-sealing process and the separation of the aluminum foil and the heat-sealable resin layer due to the effect of hydrogen fluoride produced by the interaction of the electrolyte and moisture.

It was found through the examination of various chemical conversion treatment methods that chemical conversion treatment method using a mixture of a phenolic resin, trivalent chromium fluoride and phosphoric acid forms a satisfactory acid-resistant film.

Then the packaging laminated sheet is to be used for forming a pouch for containing a polymer battery module, only the inner surface of the aluminum foil may be processed by chemical conversion treatment.

When the packaging laminated sheet is to be used for forming an embossed package for containing a polymer battery module, both the surfaces of the aluminum foil 12 are processed by chemical conversion treatment to prevent the separation of the aluminum foil 12 and the base layer 11 during an embossing process. The packaging laminated sheet provided with the aluminum foil having both the surfaces processed by the chemical conversion treatment may be used for forming pouches.

When a molten PPa resin is extruded to form the adhesive resin layer 13 and the heat-sealable resin layer 14 of a CPP resin is bonded to the aluminum foil by sandwich lamination, the adhesion of the extruded PPa resin to the chemical conversion coating formed on the aluminum foil 12 is insufficient. If an emulsion of the PEa resin is applied to the chemical conversion coatings 15*a* and 15*b* by a roll coating method, the emulsion is dried in an emulsion film, the emulsion films are baked at a temperature in the range of 170 to 200° C. and the adhesive resin layer 13 of the PPa resin is bonded to the chemical conversion coating 15*b* by a sandwich lamination process, the adhesive strength between the chemical conversion coating 15*b* and the adhesive resin layer 13 is improved. However, the emulsion films are baked at a very low baking speed and the efficiency of the adhesive resin layer forming process is very low.

The inventors of the present invention made studies to develop a bonding method capable of bonding the adhesive resin layer 13 and the chemical conversion coating 15*b* with stable adhesive strength without applying the emulsion of the PPa resin and without baking the film of the emulsion and found that a packaging laminated sheet 10 having the component layers bonded together with desired adhesive strength can be formed by bonding is a base layer 11 to one of the surfaces processed by the chemical conversion treatment of a barrier layer 12 by a dry lamination process, bonding a PP resin film for the heat-sealable resin layer with a PPa resin to the other surface of the barrier layer 12 by sandwich lamination to form the packaging laminated sheet 10 and heating the packaging laminated sheet 10 at a temperature not lower than the softening point of the PPa resin.

The packaging laminated sheet 10 may be heated by any one of a contact heating method using a hot roller, a hot air heating method using hot air and an infrared heating method using near or far infrared rays, provided that the PPa resin can be heated at a temperature not lower than the softening point thereof.

The packaging laminated sheet 10 may have, in addition to the base layer 11, the barrier layer 12, the adhesive resin layer 13 and the heat-sealable resin layer 14 of a CPP resin, an intermediate layer sandwiched between the barrier layer 12 and the heat-sealable resin layer 14. The intermediate layer is used to enhance the strength of the packaging laminated sheet to improve and stabilize barrier property.

The component layers of the packaging laminated sheet 10 may be processed by a surface activating treatment, such as a corona discharge treatment, a blasting treatment, an oxidation treatment or ozone treatment, to improve and stabilize film forming property, lamination property, formability (ease of forming pouches or embossed packages).

A CPP resin is a suitable material for forming the heat-sealable layer 14. Films of a CPP resin can be easily bonded together by heat-sealing, meet protective properties including moistureproof property and heat resistance required of the heat-sealable resin layer of a polymer battery module packaging sheet, and have desirable properties suitable for lamination and embossing.

Possible resins for forming the CPP resin film are (1) homo type PP resins having a melting point of 150° C. or above, (2) ethylene-propylene copolymers (random copolymers) having a melting point of 130° C. or above, (3) ethylene-butene-propylene terpolymers. Those resins may be used either individually or in combination. The heat-sealable resin layer 14 may be either a single-layer film or a multilayer film.

The CPP resin may contain 5% or above of a low-crystalline ethylene-butene copolymer having a density of 900 kg/m$^3$ or below, a low-crystalline propylene-butene copolymer, an amorphous ethylene-propylene copolymer or an amorphous propylene-ethylene copolymer to form a flexible film and to improve fold resistance and to prevent the cracking of the laminated sheet during a forming process.

Desirably, the base layer 11 is bonded to the chemical conversion coating 15*a* of the barrier layer 12 by a dry lamination method.

Possible adhesive resins for forming the bonding layer 16 for bonding the base layer 11 to the surface processed by the chemical conversion treatment of the aluminum foil 12 are polyester resins, polyethylene imine resins, polyether resins, cyanoacrylate resins, urethane resins, organic titanium compounds, polyether-urethane resins, epoxy reins, polyester-urethane resins, imide resins, isocyanate resins, polyolefin resins and silicone resins.

EXAMPLES

Examples of the packaging laminated sheet in the fourth embodiment will be described.

The chemical conversion treatment used an aqueous solution of a phenolic resin, a trivalent chromium fluoride compound and phosphoric acid as a processing liquid. The processing liquid was applied to the surface of the aluminum foil by a roll coating method in a film, and the film was baked at 180° C. or above. The weight per unit area of the film was 10 mg/m$^2$ (dry weight).

Packaging laminated sheets in Examples 4-1 and Comparative examples 4-1 and 4-3 were subjected to heat-sealing to form 50 mm×80 mm pillow type pouches and polymer battery modules were sealed in the pillow type pouches, respectively.

Packaging laminated sheets in Example 4-2 and Comparative examples 4-2 and 4-4 were subjected to an embossing process to form embossed packages each having a hollow part of 30 mm×50 mm×3.5 mm. The formability of the packaging laminated sheets was evaluated.

Adhesive films of unsaturated carboxylic acid graft random polypropylene resin having a thickness of 20 µm were wound around parts to be contiguous with the pouch or the embossed package of the tabs of polymer battery modules, and the pouch or the embossed package was heat-sealed.

Example 4-1

Pouch

Both the surfaces of a 20 µm thick aluminum foil were subjected to chemical conversion treatment. A 16 µm thick oriented polyester film was laminated to one of the surfaces of the aluminum foil by a dry lamination method. A laminated film of a 20 µm thick molten resin film of a PPa resin having a softening point of 120° C. and a 30 µm thick film of a PP resin was bonded to the other surface of the aluminum foil by sandwich lamination. A packaging laminated sheet thus formed was heated so that the surfaces of the aluminum foil were heated at 150° C. to obtain the packaging laminated sheet in Example 4-1.

Example 4-2

Embossed Package

Both the surfaces of a 40 µm thick aluminum foil were subjected to chemical conversion treatment. A 25 µm thick nylon film was laminated to one of the surfaces of the aluminum foil by a dry lamination method. A laminated film of a 20 µm thick molten resin film of a PPa resin having a softening point of 120° C. and a 30 µm thick film of a PP resin was bonded to the other surface of the aluminum foil by sandwich lamination. A packaging laminated sheet thus formed was heated so that the surfaces of the aluminum foil were heated at 150° C. to obtain a packaging laminated sheet in Example 4-2.

Comparative Example 4-1

Pouch

Both the surfaces of a 20 µm thick aluminum foil were subjected to chemical conversion treatment. A 12 µm thick oriented polyester film was laminated to one of the surfaces of the aluminum foil by a dry lamination method. A laminated film of a 20 µm thick molten resin film of a PPa resin having a softening point of 120° C. and a 30 µm thick film of a PP resin was bonded to the other surface of the aluminum to obtain a packaging laminated sheet in Comparative example 4-1.

Comparative Example 4-2

Embossed Package

Both the surfaces of a 40 µm thick aluminum foil were subjected to chemical conversion treatment. A 25 µm thick nylon film was laminated to one of the surfaces of the aluminum foil by dry lamination. A laminated film of a 20 µm thick molten resin film of a PPa resin having a softening point of 120° C. and a 30 µm thick film of a PP resin was bonded to the other surface of the aluminum foil by sandwich lamination to obtain a packaging laminated sheet in Comparative example 4-2.

Comparative Example 4-3

Pouch

An oriented polyester film was laminated to one of the surfaces of a 20 µm thick aluminum foil by a dry lamination method. A laminated film of a 20 µm thick molten resin film of a PPa resin having a softening point of 120° C. and a 30 µm thick film of a PP resin was bonded to the other surface of the aluminum foil by sandwich lamination. A packaging laminated sheet thus formed was heated, such that the surfaces of the aluminum foil were heated at 150° C. to obtain a packaging laminated sheet in Comparative example 4-3.

Comparative Example 4-4

Embossed Package

A 25 μm thick nylon film was laminated to one of the surfaces of a 40 μm thick aluminum foil by a dry lamination method. A laminated film of a 20 μm thick molten resin film of a PPa resin having a softening point of 120° C. and a 30 μm thick film of a PP resin was bonded to the other surface of the aluminum foil by sandwich lamination. A packaging laminated sheet thus formed was heated such that the surfaces of the aluminum foil were heated at 150° C. to obtain a packaging laminated sheet in Comparative example 4-4.

Embossing and Packaging

Pouches were formed by processing the packaging laminated sheets in Example 4-1 and Comparative examples 4-1 and 4-3, embossed packages were formed by press-forming the packaging laminated sheets in Example 4-2 and Comparative examples 4-2 and 4-4, and polymer battery modules were packaged in the pouches and the embossed packages to form polymer batteries. The polymer batteries were evaluated by the following methods.

Evaluating Methods

1) Delamination During Forming

Samples were inspected for the separation of the base layer and the aluminum foil immediately after forming.

2) Chemical Resistance Test

Samples were inspected for the separation of the aluminum foil and the innermost resin film, i.e., the PP resin film, after keeping the samples in an atmosphere of 60° C. and 90% RH in a thermostat for seven days.

3) Delamination During Heat-Sealing Process

Samples were inspected for the separation of the innermost layer and the aluminum foil immediately after heat-sealing.

Results

The packaging laminated sheets in Examples 4-1 and 4-2 were not delaminated by embossing and heat-sealing.

The packaging laminated sheets in Comparative examples 4-1 and 4-2 were not delaminated by heat-sealing. The packaging laminated sheet in Comparative example 4-2 was not delaminated by embossing. The heat-sealable resin layers of all the hundred sample packaging laminated sheets in Comparative examples 4-1 and 4-2 were separated from the aluminum foils, which was not due to the corrosion of the inner surface of the aluminum foil but was due to the separation of the PPa resin film from the surface treated by the chemical conversion treatment of the aluminum foil.

Forty sample packaging laminated sheets out of one hundred sample packaging laminated sheets in Comparative example 4-3 and forty-six sample packaging laminated sheets out of one hundred sample packaging laminated sheets in Comparative example 4-4 were delaminated by heat-sealing. Twenty-two sample packaging laminated sheets out of one hundred sample packaging laminated sheets in Comparative example 4-4 were delaminated by embossing. All the one hundred sample packaging laminated sheets were delaminated due to the corrosion of the inner surface of the aluminum foil caused by the detrimental effect of the polymer battery modules.

The chemical conversion treatment of the opposite surfaces of the aluminum foil prevents the separation of the base layer and the aluminum foil during an embossing process and heat-sealing. The separation of the aluminum foil and the innermost layer can be prevented because the surfaces of the aluminum foil are not corroded by hydrogen fluoride that may be produced by interaction between the electrolyte of the polymer battery module and moisture.

Since the formation of the heat-sealable layer and the lamination of the same to the aluminum foil can be simultaneously accomplished by a sandwich lamination method, the packaging laminated sheet can be efficiently manufactured. Postheating can enhance the adhesive strength between the adjacent layers of the packaging laminated sheet.

Fifth Embodiment

A packaging laminated sheet, i.e., a polymer battery module packaging sheet, in a fifth embodiment according to the present invention has a moistureproof property, and is resistant to the detrimental effects of the polymer battery module and capable of being manufactured at a high productivity. When forming the packaging laminated sheet, the opposite surfaces of a barrier layer are subjected to chemical conversion treatment, an adhesive resin layer and an inner resin layer are formed by a coextrusion lamination method on the inner surface to be in contact with the polymer battery module of the barrier layer to form a laminated sheet and the laminated sheet is subjected to a heating process to enhance the adhesive strength between the barrier layer and the laminated sheet.

The inventors of the present invention made earnest studies to develop a packaging laminated sheet that will not be delaminated by embossing and heat-sealing, is resistant to the detrimental effect of a polymer battery module and has satisfactory properties, found that such a packaging laminated sheet can be obtained by subjecting both the surfaces of an aluminum foil to chemical conversion treatment, forming an adhesive resin layer by extruding a PPa resin, such as an unsaturated carboxylic acid graft random propylene resin, on the inner surface of the aluminum foil, bonding an innermost layer of an ethylene-butene-propylene terpolymer (hereinafter referred to as "T-PP resin") to the aluminum foil by the adhesive resin layer to form a laminated sheet, and have made the present invention. The inventors of the present invention found that the foregoing problems can be solved by a polymer battery module packaging sheet manufacturing method comprising the steps of processing the opposite surfaces of an aluminum foil by chemical conversion treatment, forming a laminated sheet by forming a layer of a PPa resin, such as an unsaturated carboxylic acid graft random propylene resin, as an adhesive resin layer, and a layer of a terpolymer on the inner surface of the aluminum foil by a coextrusion lamination method to form a laminated sheet, and subjecting the laminated sheet to a heating process, and have made the present invention.

As shown in FIGS. 5(b) and 5(c), a packaging laminated sheet 10, i.e., a polymer battery module packaging sheet, in the fifth embodiment has, as essential components, a base layer 11, a bonding layer 16, a chemical conversion coating 15a, an aluminum foil 12 as a barrier layer, a chemical conversion coating 15b, an adhesive resin layer 13 and an innermost layer 14, i.e., a film of a terpolymer of ethylene, butene and propylene. The adhesive resin layer 13 and the innermost layer 14 are formed by a coextrusion lamination method. The packaging laminated sheet 10 is subjected to postheating after the same has been formed to enhance the adhesive strength between the adjacent layers. The adhesive resin layer 13 and the innermost layer 14 constitute an innermost layer.

Figure 5:
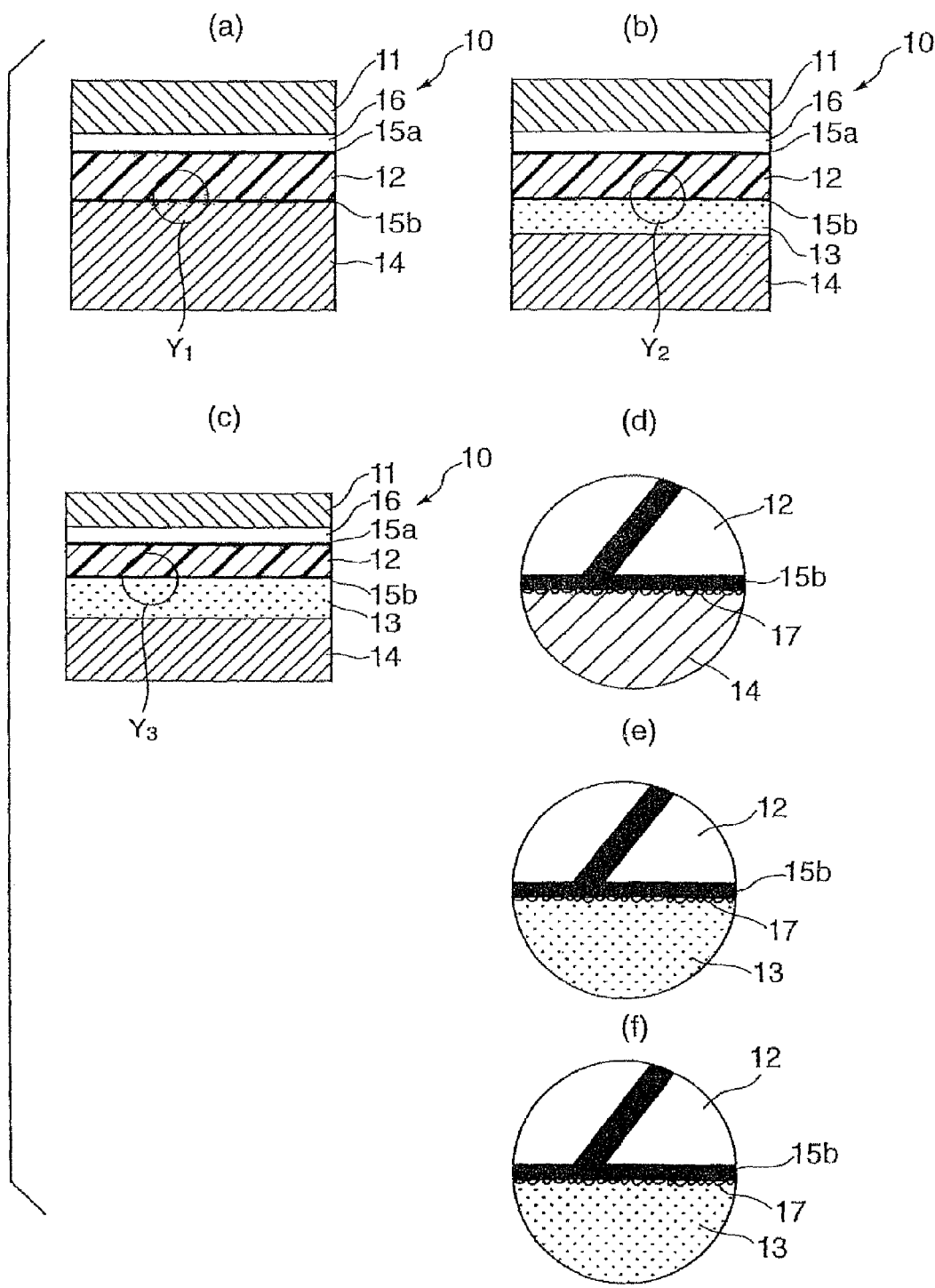
FIG. 5 is a sectional view of assistance in explaining packaging laminated sheets as polymer battery module packaging sheets in a second embodiment to an eighth embodiment according to the present invention.
Figure 6:
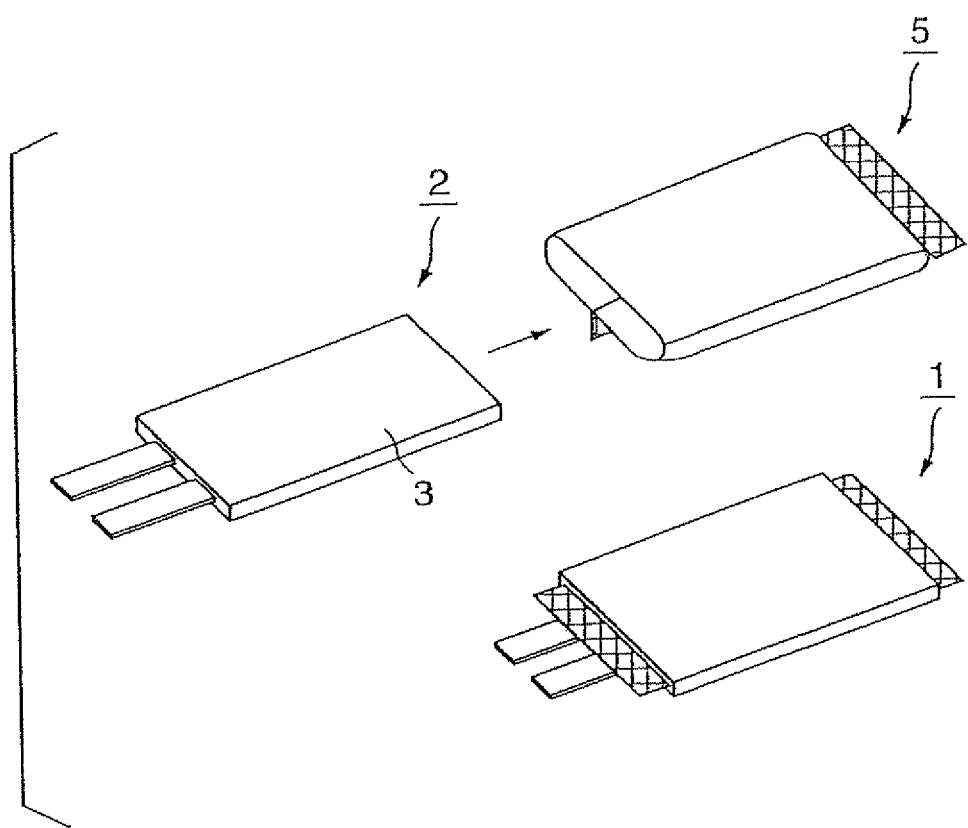
FIG. 6 is a perspective view of assistance in explaining a polymer battery employing a pouch as a package.

As shown in FIGS. 5(*b*) and 5(*c*), the chemical conversion coatings 15*a* and 15*b* coat both the surfaces of the aluminum foil 12 (barrier layer), respectively, and the innermost layer 14 of the T-PP resin is bonded to the inner surface of the aluminum foil 12 with the extruded adhesive resin layer 13 by coextrusion. The packaging laminated sheet 10 is subjected to postheating to heat the same at a temperature not lower than the softening point of the resin forming the adhesive resin layer.

As shown in FIGS. 5(*b*) and 5(*c*), the packaging laminated sheet 10 has at least the base layer 11, the chemical conversion coating 15*a*, the aluminum foil 12, the chemical conversion coating 15*b*, the adhesive resin layer 13 and the innermost layer 14. The adhesive resin layer 13 and the innermost layer 14 are formed by a coextrusion lamination method. The innermost layer 14 is formed of the T-PP resin. When the packaging laminated sheet 10 is intended for forming an embossed package body 5*a* as shown in FIG. 2, the packaging laminated sheet 10 must be excellent in formability to form the hollow part 7 for holding a polymer battery module 2. Materials of the layers of the packaging laminated sheet 10 and processes for bonding the layers will be described hereinafter.

The base layer 11 is an oriented polyester film or an oriented nylon film. Possible polyester resins for forming the base layer 11 are PET resins, PBT resins, PEN resins, PBN resins, interpolyester resins, PC resins and the like. Possible nylon resins for forming the base layer 11 are polyamide resins including nylon 6, nylon 66, copolymers of nylon 6 and nylon 66, nylon 610, polymethaxylilene adipamide (MXD6) and the like.

When a polymer battery using the packaging laminated sheet 10 is used on a piece of hardware, the base layer 11 comes into direct contact with the piece of hardware. Therefore, it is basically desirable to form the base layer 11 of an intrinsically insulating resin. Since a film forming the base layer 11 has pinholes and pinholes will be formed in the film during processing, the thickness of the base layer 11 must be 6 μm or above, preferably, in the range of 12 to 25 μm.

The base layer 11 may be a laminated film in view of providing the base layer 11 with pinhole resistance and improved insulating ability.

A laminated film for the base layer 11 includes at least one resin layer consisting of two or more layers each having a thickness of 6 μm or above, preferably, in the range of 12 to 25 μm. The following laminated structures 1) to 7), not shown, are examples of the laminated base layer 11.
1) Oriented PET resin layer/Oriented nylon layer
2) Oriented nylon layer/Oriented PET resin layer To improve the mechanical aptitude (stability when passed through processing machines and a packaging machine) and surface protecting ability (heat resistance and electrolyte resistance) of the packaging sheet and to reduce friction between a die and the base layer 11 when forming the embossed package body 5*a*, it is preferable that the base layer 11 consists of plural layers and the surface of the base layer 11 is coated with a fluorocarbon resin, an acrylic resin or a silicone resin. The base layer 11 may be any one of the following laminated films.
3) Fluorocarbon resin layer/oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same.)
5) Fluorocarbon resin layer/Oriented PET resin layer/Oriented nylon layer
6) Silicone resin layer/Oriented PET resin layer/Oriented nylon layer
7) Acrylic resin layer/Oriented nylon layer (the acrylic resin layer may be an acrylic resin film or a film formed by spreading an acrylic resin and drying the same.)

The barrier layer (aluminum foil) 12 prevents the penetration of moisture into the polymer battery. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 μm or above and is formed from a metal foil, such as an aluminum foil or a nickel foil, or a film coated with an inorganic compound, such as silicon dioxide or alumina, by evaporation. Preferably, the barrier layer 12 is an aluminum foil of a thickness in the range of 20 to 80 μm.

The inventors of the present invention made studies to reduce pinholes and to prevent the cracking of an embossed package and found that aluminum having an iron content in the range of 0.3 to 9.0% by weight, preferably, 0.7 to 2.0% by weight is more satisfactory in ductility than aluminum not containing any iron, an aluminum foil of such aluminum is less subject to the formation of pinholes when the packaging laminated sheet is bent and is more capable of facilitating forming the side walls of the embossed package than an aluminum foil of aluminum not containing any iron. Aluminum foils of aluminum having an iron content less than 0.3% by weight are not satisfactorily pinhole-resistant and do not improve the formability of the packaging laminated sheet. Aluminum foils of aluminum having an iron content exceeding 0.9% by weight are unsatisfactory in flexibility and affect adversely to the workability of the packaging laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of forming may be used.

The inventors of the present invention found through studies that a satisfactory packaging laminated sheet can be formed when both the surfaces of the barrier layer 12 of aluminum are processed by chemical conversion treatment. The chemical conversion treatment forms an acid-resistant film of a phosphate, a chromate, a fluoride or a triazine thiol compound. The acid-resistant film prevents the separation of the aluminum foil and the base layer during an embossing process, and the dissolution and corrosion of the surfaces of the aluminum foil, particularly, aluminum oxide films coating the aluminum foil, by hydrogen fluoride produced by the interaction of the electrolyte of the polymer battery module and moisture, improves the adhesive property (wettability) of the surfaces of the aluminum foil, and prevents the separation of the aluminum foil and the base layer during an embossing process and a heat-sealing process and the separation of the aluminum foil and the heat-sealable resin layer due to the effect of hydrogen fluoride produced by the interaction of the electrolyte and moisture.

It was found through the examination of various chemical conversion treatment methods that chemical conversion treatment method using a mixture of a phenolic resin, trivalent chromium fluoride and phosphoric acid forms a satisfactory acid-resistant film.

When the packaging laminated sheet is to be used for forming a pouch for containing a polymer battery module, only the inner surface of the aluminum foil may be processed by chemical conversion treatment.

When the packaging laminated sheet is to be used for forming an embossed package for containing a polymer battery module, both the surfaces of the aluminum foil 12 are processed by chemical conversion treatment to prevent the separation of the aluminum foil 12 and the base layer 11 during an embossing process. The packaging laminated sheet provided with the aluminum foil having both the surfaces processed by the chemical conversion treatment may be used for forming pouches.

The layers on the inner side of the barrier layer 12 of the packaging laminated sheet of the present invention are formed by a coextrusion lamination method using an apparatus shown in FIG. 10. The adhesive resin layer 13 and the innermost layer 14 are formed by coextrusion and are bonded to the surface processed by the chemical conversion treatment of the aluminum foil 12. Desirably, the innermost layer 14 is formed of a T-PP resin having satisfactory physical properties including heat-sealability, heat resistance, moistureproof property and press-formability. The PPa resin having high adhesion to the surface processed by the chemical conversion treatment of the aluminum foil and a T-PP resin are coextruded on the aluminum foil to laminate the PPa resin layer to the aluminum foil.

When fabricating the packaging laminated sheet of the present invention, the adhesive resin layer 13 formed on the inner surface treated by chemical conversion treatment of the aluminum foil is formed of a PPa resin, such as an unsaturated carboxylic acid graft random polypropylene resin. The adhesive resin layer 13 of the PPa resin prevents the corrosion of the aluminum foil 12 and bonds the innermost layer 14 of the T-PP resin firmly to the aluminum foil 12.

A laminating method of forming the adhesive resin layer 13 of the PPa resin and the innermost layer 14 on the surface processed by the chemical conversion treatment of the aluminum foil 12 by coextrusion is excellent in productivity. However, the adhesive strength of the adhesive resin layer 13 is insufficient when the packaging laminated sheet is used for packaging a polymer battery module.

The inventors of the present invention made studies to develop a laminating method capable of laminating layers so that the layers are kept bonded with stable adhesive strength and fabricated a laminated sheet having component layers bonded with predetermined adhesive strength by forming the packaging laminated sheet 10 by the steps of laminating the base layer 11 to one of the surfaces processed by the chemical conversion treatment of the barrier layer 12 by dry lamination, and forming the adhesive resin layer 13 of a PPa resin and the innermost layer 14 of a T-PP resin on the other surface of the barrier layer 12 by a coextrusion lamination method to form a laminated structure, and heating the laminated structure at a temperature not lower than the softening point of the PPa resin forming the adhesive resin layer 13.

The packaging laminated sheet 10 may be heated by any one of a contact heating method using a hot roller, a hot air heating method using hot air and an infrared heating method using near or far infrared rays, provided that the PPa resin forming the adhesive resin layer 13 can be heated at a temperature not lower than the softening point thereof.

A packaging laminated sheet having component layers bonded together with stage adhesive strength can be formed by another method that heats the surface on the side of the innermost layer 14 of the aluminum foil 12 at a temperature not lower than the softening point of the PPa resin forming the adhesive resin layer 13 when forming the adhesive resin layer 13 and the innermost layer 14 by coextrusion.

The PPa resin is (1) an acid-modified homopolypropylene resin having a Vicat softening point of 115° C. or above and a melting point of 150° C. or above, (2) an ethylene-propylene copolymer (random copolymer) having a Vicat softening point of 105° C. or above and a melting point of 130° C. or above or (3) a simple polymer or a blended of polymers containing a T-PP resin as a base resin having a melting point of 110° C. or above and produced by acid-modified polymerization using an unsaturated carboxylic acid.

The PPa resin may contain 5% or above of a low-crystalline ethylene-butene copolymer having a density of 900 kg/m$^3$ or below, a low-crystalline propylene-butene copolymer, an amorphous ethylene-propylene copolymer, an amorphous propylene-ethylene copolymer or an ethylene-butene-propylene terpolymer to give the PPa resin film flexibility, to improve bendability and to prevent cracking during a forming process.

Flexibility may be given to the PPa resin to improve the foldability of the PPa resin film and to prevent the cracking of the PPa resin film during a forming process by adding 5% or above of a T-PP resin (ethylene-butene-propylene terpolymer) to the PPa resin.

The packaging laminated sheet 10 of the present invention may include, in addition to the base layer 11, the barrier layer 12, the adhesive resin layer 13 and the innermost layer 14 of the T-PP resin, an intermediate layer between the barrier layer 12 and the innermost layer 14 to improve the strength of the packaging laminated sheet as a polymer battery module packaging sheet and to improve and stabilize the impermeability of the packaging laminated sheet.

The component layers of the packaging laminated sheet 10 may be processed by a surface activating treatment, such as a corona discharge treatment, a blasting treatment, an oxidation treatment or ozone treatment, to improve and stabilize film forming property, lamination property, formability (ease of forming pouches or embossed packages).

T-PP resins are suitable for forming the innermost layer 14 of the packaging laminated sheet 10. Films of a T-PP resin can be easily bonded together by heat-sealing, meet protective properties including moistureproof property and heat resistance required of the heat-sealable resin layer of a polymer battery module packaging sheet, and have desirable properties suitable for lamination and embossing.

Desirably, the innermost layer 14 has a thickness in the range of 30 to 100 μm and is formed of a T-PP resin having a melting point of 120° C. or above. Preferably, the innermost layer 14 is a PP resin layer containing 5% or above of a terpolymer or a multilayer structure having at least a PP resin layer containing 5% or above of a terpolymer.

Desirably, the base layer 11 is bonded to the chemical conversion coating 15a of the barrier layer 12 by a dry lamination method.

The followings are concrete examples of materials forming the component layers of the innermost layer.
(1) Terpolymer
(2) Terpolymer+PP resin
(3) Terpolymer/LLDPE/terpolymer
(4) Terpolymer+PP resin/LLDPE/terpolymer/PP resin
(5) Terpolymer+PP resin/PP resin/terpolymer+PP resin
(6) Terpolymer+PP resin/PP resin+LLDPE/terpolymer+PP resin
(7) Terpolymer+PP resin/PP resin+terpolymer/terpolymer+PP resin where "+" denotes blending, "/" indicates coextrusion, terpolymer content is 5% or above and the PP resin is of a random polymerization type.

The T-PP resin may contain 5% or above of a low-crystalline ethylene-butene copolymer having a density of 900 kg/m³ or below, a low-crystalline propylene-butene copolymer, an amorphous ethylene-propylene copolymer or an amorphous propylene-ethylene copolymer to give the T-PP resin film flexibility, to improve bendability and to prevent cracking during a forming process.

Desirably, the base layer 11 of the packaging laminated sheet of the present invention is bonded to the surface processed by the chemical conversion treatment (coating 15a) of the barrier layer 12 by a dry lamination method.

Possible adhesive resins for forming the bonding layer 16 for bonding the base layer 11 to the surface of the aluminum foil 12 processed by the chemical conversion treatment are polyester resins, polyethylene imine resins, polyether resins, cyanoacrylate resins, urethane resins, organic titanium compounds, polyether-urethane resins, epoxy reins, polyester-urethane resins, imide resins, isocyanate resins, polyolefin resins and silicone resins.

EXAMPLES

Examples of the packaging laminated sheet in the fifth embodiment will be described.

The chemical conversion treatment used an aqueous solution of a phenolic resin, a chromium fluoride compound and phosphoric acid as a processing liquid. The processing liquid was applied to the surface of the aluminum foil by a roll coating method in a film, and the film was baked at 180° C. or above. The weight per unit area of the film was 10 mg/m² (dry weight).

Examples of the packaging laminated sheet in the fifth embodiment will be described.

The packaging laminated sheets in examples and comparative examples used 25 μm thick nylon films for forming their base layers and used 40 μm thick aluminum foils for forming their barrier layers.

The innermost layers of the examples of the present invention contained a T-PP resin (ethylene-butene-propylene terpolymer).

Packaging laminated sheets in examples were subjected to single-side embossing to form embossed packages each having a hollow part of 30 mm×50 mm×3.5 mm. The formability of the packaging laminated sheets was evaluated.

Examples used a PPa resin produced by acid-modified polymerization using an unsaturated carboxylic acid and containing a random polypropylene resin (hereinafter referred to as "RPP resin") having a softening point of 105° C. and a melting point of 146° C. as a base resin.

Example 5-1

Both the surfaces of a 40 μm thick aluminum foil were subjected to chemical conversion treatment. A 25 μm thick nylon film was laminated to one of the surfaces of the aluminum foil by a dry lamination method. Each of sample packaging laminated sheets in Example 5-1 was formed by bonding a laminated film of a 20 μm thick Film of a PPa resin as an adhesive resin film and a 30 μm thick film of one of the following resins (1) to (6) by a coextrusion lamination method to the other surface of the aluminum foil.
(1) Terpolymer
(2) Terpolymer (5%)+RPP (95%)
(3) Terpolymer (50%)+RPP (50%)
(4) Terpolymer (80%)+RPP (20%)
(5) Terpolymer/RPP/terpolymer
(6) Terpolymer/RPP+LLDPE/terpolymer where "+" denotes blending, "/" indicates coextrusion, "RPP" denotes a random polypropylene resin and "LLDPE" denotes a linear low-density polyethylene resin. Packaging laminated sheets in Example 5-1 were completed by subjecting the laminated sheets to a heating process that heated the laminated sheets so that the surfaces of the aluminum foils were heated at 140° C.

Example 5-2

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick molten resin film of a PPa resin containing 10% of the terpolymer and a 30 μm thick molten resin film of a blend of 5% of the terpolymer and 95% of a PP resin bonded to the other surface of the aluminum foil by a coextrusion lamination method to obtain sample packaging laminated sheets in Example 5-2.

Example 5-3

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick molten resin film of a PPa resin containing 50% of the terpolymer and a 30 μm thick molten resin film of a blend of 5% of the terpolymer and 95% of a PP resin was bonded to the other surface of the aluminum foil by a coextrusion lamination method to obtain sample packaging laminated sheets in Example 5-3.

Comparative Example 5-1

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick molten resin film of a PPa resin and a 30 μm thick molten resin film of a homopolypropylene resin having a melting point of 151° C. was bonded to the other surface of the aluminum foil by a coextrusion lamination method to obtain a laminated sheet. The laminated sheets thus formed were heated so that the surfaces of the aluminum foils were heated at 150° C. to complete sample packaging laminated sheets in Comparative example 5-1.

Comparative Example 5-2

A 25 μm thick nylon film was bonded to one of the surfaces of a 40 μm thick aluminum foil by a dry lamination method. Each of sample packaging laminated sheets in Comparative example 5-2 was formed by bonding a laminated film of a 20 μm thick resin film of a PPa resin having a melting point of 120° C. as an adhesive resin film and a 30 μm thick film of one of the resins (1) to (6) used for forming the sample packaging laminated sheets in Example 5-1 by a coextrusion lamination method to the other surface of the aluminum foil. Laminated structures thus formed were heated so that the surfaces of the aluminum foils were heated at 150° C. to complete the packaging laminated sheets in Comparative example 5-2.

Embossing and Packaging

The sample packaging laminated sheets were subjected to an embossing process to form packages and polymer battery modules were packaged in the packages to form polymer batteries. The polymer batteries were evaluated by the following methods.

Evaluating Methods

1) Delamination During Forming

Samples were inspected for the separation of the base layer and the aluminum foil immediately after forming.

2) Chemical Resistance Test

Samples were inspected for the separation of the aluminum foil and the innermost layer after keeping the samples in an atmosphere of 60° C. and 90% RH in a thermostat for seven days.

3) Delamination During Heat-Sealing Process

Samples were inspected for the separation of the innermost layer and the aluminum foil immediately after heat-sealing.

Results

The packaging laminated sheets in Examples 5-1, 5-2 and 5-3 were not delaminated by embossing and heat-sealing. The aluminum foil and the base layer of each of the packaging laminated sheets in Examples 5-1, 5-2 and 5-3 were not separated. The packaging laminated sheets in Examples 5-1, 5-2 and 5-3 were not delaminated by the chemical resistance test. Any cracks were not formed in the innermost layers of the packaging laminated sheets in Examples 5-1, 5-2 and 5-3 during the embossing process and the bending process.

No problem arose during the embossing process and the heat-sealing process in the packaging laminated sheets in Comparative example 5-1 and the aluminum foil and the base layer of each of the packaging laminated sheets in Comparative example 5-1 were not separated. The packaging laminated sheets in Comparative example 5-1 were not delaminated by the chemical resistance test. However, cracks were formed during the embossing process in the innermost layers of all the hundred samples and cracks were formed during the bending process in the innermost layers of the forty-six samples out of the hundred samples.

Forty-eight sample packaging laminated sheets out of the hundred sample packaging laminated sheets in Comparative example 5-2 were delaminated during the embossing process and the heat-sealing process. All the hundred sample packaging laminated sheets in Comparative example 5-2 were delaminated by the chemical resistance test. Cracks were not formed in all the hundred sample packaging laminated sheets in Comparative example 5-2 during the embossing process and the bending process.

The chemical conversion treatment of the opposite surfaces of the aluminum foil prevents the separation of the base layer and the aluminum foil during an embossing process and heat-sealing. The separation of the aluminum foil and the innermost layer can be prevented because the surfaces of the aluminum foil are not corroded by hydrogen fluoride that may be produced by interaction between the electrolyte of the polymer battery module and moisture.

The innermost layer of the T-PP resin can be efficiently formed through the coextrusion of the PPa resin and the adhesive resin. Postheating can enhance the adhesive strength between the adjacent layers of the packaging laminated sheet. Thus, the laminated packaging structure of the fifth embodiment can be used for packaging polymer battery modules.

Sixth Embodiment

A packaging laminated sheet, i.e., a polymer battery module packaging sheet, in a sixth embodiment according to the present invention has a moistureproof property, and is resistant to the detrimental effects of the polymer battery module and capable of being manufactured at a high productivity. When forming the packaging laminated sheet, the opposite surfaces of a barrier layer are subjected to chemical conversion treatment, a heat-sealable film is laminated to the barrier layer by a sandwich lamination method to form a laminated sheet and the laminated sheet is subjected to a heating process to enhance the adhesive strength between the barrier layer and the heat-sealable film.

The inventors of the present invention found that problems in packaging laminated sheets can be solved by subjecting both the surfaces of an aluminum foil to chemical conversion treatment, forming an adhesive resin layer of a PPa resin, such as an unsaturated carboxylic acid graft random propylene resin, on the inner surface of the aluminum foil, and using a heat-sealable resin layer of a T-PP resin, and have made the present invention. The inventors of the present invention found that problems in packaging laminated sheets can be solved by a packaging laminated sheet manufacturing method including the steps of subjecting both the surfaces of an aluminum foil to chemical conversion treatment, forming an adhesive resin layer of a PPa resin, such as an unsaturated carboxylic acid graft random propylene resin, on the inner surface of the aluminum foil by extrusion, and forming a T-PP resin film by a sandwich lamination method on the adhesive resin layer to form a laminated sheet and subjecting the laminated sheet to postheating and have made the present invention.

As shown in FIGS. 5(b) and 5(c), a packaging laminated sheet 10, i.e., a polymer battery module packaging sheet, in the sixth embodiment has, as essential components, a base layer 11, a bonding layer 16, a chemical conversion coating 15a, an aluminum foil 12 as a barrier layer, a chemical conversion coating 15b, an adhesive resin layer 13 and a heat-sealable resin layer 14, i.e., a film of a T-PP resin. The adhesive resin layer 13 and the heat-sealable resin layer 14 of the T-PP resin are formed by a sandwich lamination method. The packaging laminated sheet 10 is subjected to postheating after the same has been faulted to enhance the adhesive strength between the adhesive resin layer 13 and the heat-sealable resin layer 14. The adhesive resin layer 13 and the heat-sealable resin layer 14 constitute an innermost layer.

As shown in FIGS. 5(b) and 5(c), the chemical conversion coatings 15a and 15b coat both the surfaces of the aluminum foil 12 (barrier layer), respectively, and the heat-sealable resin layer 14 of the T-PP resin is bonded to the inner surface of the aluminum foil 12 with the extruded adhesive resin layer 13. The packaging laminated sheet 10 is subjected to postheating to heat the same at a temperature not lower than the softening point of the resin forming the adhesive resin layer.

As shown in FIGS. 5(b) and 5(c), the packaging laminated sheet 10 has at least the base layer 11, the chemical conversion coating 15a, the aluminum foil 12, the chemical conversion coating 15b, the adhesive resin layer 13 and the heat-sealable resin layer 14. The heat-sealable resin layer 14 is bonded to the aluminum foil 12 by a sandwich lamination method. The heat-sealable resin layer 14 is formed of the T-PP resin. When the packaging laminated sheet 10 is intended for forming an embossed package body 5a as shown in FIG. 2, the packaging laminated sheet 10 must be excellent in formability to form the hollow part 7 for holding a polymer battery module 2. Materials of the layers of the packaging 20, laminated sheet 10 and processes for bonding the layers will be described hereinafter.

The base layer 11 is an oriented polyester film or an oriented nylon film. Possible polyester resins for forming the base layer 11 are PET resins, PBT resins, PEN resins, PBN resins, interpolyester resins, PC resins and the like. Possible nylon resins for forming the base layer 11 are polyamide resins including nylon 6, nylon 66, copolymers of nylon 6 and nylon 66, nylon 610, polymethaxylilene adipamide (MXD6) and the like.

When a polymer battery using the packaging laminated sheet 10 is used on a piece of hardware, the base layer 11 comes into direct contact with the piece of hardware. Therefore, it is basically desirable to form the base layer 11 of an intrinsically insulating resin. Since a film forming the base layer 11 has pinholes and pinholes will be formed in the film during processing, the thickness of the base layer 11 must be 6 μm or above, preferably, in the range of 12 to 25 μm.

The base layer 11 may be a laminated film in view of providing the base layer 11 with pinhole resistance and improved insulating ability.

A laminated film for the base layer 11 includes at least one resin layer consisting of two or more layers each having a thickness of 6 μm or above, preferably, in the range of 12 to 25 μm. The following laminated structures 1) to 7), not shown, are examples of the laminated base layer 11.
1) Oriented PET resin layer/Oriented nylon layer
2) Oriented nylon layer/Oriented PET resin layer To improve the mechanical aptitude (stability when passed through processing machines and a packaging machine) and surface protecting ability (heat resistance and electrolyte resistance) of the packaging sheet and to reduce friction between a die and the base layer 11 when forming an embossed package, it is preferable that the base layer 11 consists of plural layers and the surface of the base layer 11 is coated with a fluorocarbon resin, an acrylic resin or a silicone resin. The base layer 11 may be any one of the following laminated films.
3) Fluorocarbon resin layer/Oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same.)
5) Fluorocarbon resin layer/Oriented PET resin layer/Oriented nylon layer
6) Silicone resin layer/Oriented PET resin layer/Oriented nylon layer
7) Acrylic resin layer/Oriented nylon layer (the acrylic resin layer may be an acrylic resin film or a film formed by spreading an acrylic resin and drying the same.)

The barrier layer (aluminum foil) 12 prevents the penetration of moisture into the polymer battery. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 μm or above and is formed from a metal foil, such as an aluminum foil or a nickel foil, or a film coated with an inorganic compound, such as silicon dioxide or alumina, by evaporation. Preferably, the barrier layer 12 is an aluminum foil of a thickness in the range of 20 to 80 μm.

The inventors of the present invention made studies to reduce pinholes and to prevent the cracking of an embossed package and found that aluminum having an iron content in the range of 0.3 to 9.0% by weight, preferably, 0.7 to 2.0% by weight is more satisfactory in ductility than aluminum not containing any iron, an aluminum foil of such aluminum is less subject to the formation of pinholes when the packaging laminated sheet is bent and is more capable of facilitating forming the side walls of the embossed package than an aluminum foil of aluminum not containing any iron. Aluminum foils of aluminum having an iron content less than 0.3% by weight are not satisfactorily pinhole-resistant and do not improve the formability of the packaging laminated sheet. Aluminum foils of aluminum having an iron content exceeding 0.9% by weight are unsatisfactory in flexibility and affect adversely to the workability of the packaging laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of forming may be used.

The inventors of the present invention found through studies that a satisfactory packaging laminated sheet can be formed when both the surfaces of the barrier layer 12 of aluminum are processed by chemical conversion treatment. The chemical conversion treatment forms an acid-resistant film of a phosphate, a chromate, a fluoride or a triazine thiol compound. The acid-resistant film prevents the separation of the aluminum foil and the base layer during an embossing process, and the dissolution and corrosion of the surfaces of the aluminum foil, particularly, aluminum oxide films coating the aluminum foil, by hydrogen fluoride produced by the interaction of the electrolyte of the polymer battery module and moisture, improves the adhesive property (wettability) of the surfaces of the aluminum foil, and prevents the separation of the aluminum foil and the base layer during an embossing process and a heat-sealing process and the separation of the aluminum foil and the heat-sealable resin layer due to the effect of hydrogen fluoride produced by the interaction of the electrolyte and moisture.

It was found through the examination of various chemical conversion treatment methods that chemical conversion treatment method using a mixture of a phenolic resin, chromium fluoride and phosphoric acid forms a satisfactory acid-resistant film.

When the packaging laminated sheet is to be used for forming a pouch for containing a polymer battery module, only the inner surface of the aluminum foil may be processed by chemical conversion treatment.

When the packaging laminated sheet is to be used for forming an embossed package for containing a polymer battery module, both the surfaces of the aluminum foil 12 are processed by chemical conversion treatment to prevent the separation of the aluminum foil 12 and the base layer 11 during an embossing process. The packaging laminated sheet provided with the aluminum foil having both the surfaces processed by the chemical conversion treatment may be used for forming pouches.

In the packaging laminated sheet of the present invention, an adhesive resin layer 13 of a PPa resin, such as an unsaturated carboxylic acid graft random propylene resin, is formed on the inner surface processed by the chemical conversion treatment of the aluminum foil 12. The adhesive resin layer 13 of the PPa resin prevents the corrosion of the aluminum foil 12 and stabilizes the adhesion of a heat-sealable resin layer of a T-PP resin.

The inventors of the present invention made studies to develop a laminating method capable of laminating layers so that the layers are kept bonded with stable adhesive strength and fabricated a laminated sheet having component layers bonded with predetermined adhesive strength by forming the packaging laminated sheet 10 by the steps of laminating the base layer 11 to one of the surfaces processed by the chemical conversion treatment of the barrier layer 12 by dry lamination, and forming the adhesive resin layer 13 of a PPa resin and the innermost layer 14 of a T-PP resin on the other surface of the barrier layer 12 by a sandwich lamination method to form a laminated structure, and heating the laminated structure at a temperature not lower than the softening point of the PPa resin forming the adhesive resin layer 13.

The packaging laminated sheet 10 may be heated by any one of a contact heating method using a hot roller, a hot air heating method using hot air and an infrared heating method using near or far infrared rays, provided that the PPa resin forming the adhesive resin layer 13 can be heated at a temperature not lower than the softening point thereof.

A packaging laminated sheet having component layers bonded together with stable adhesive strength can be formed by another method that heats the surface on the side of the innermost layer 14 of the aluminum foil 12 at a temperature not lower than the softening point of the PPa resin forming the adhesive resin layer 13 when forming the adhesive resin layer 13 and the innermost layer 14 by sandwich lamination.

The T-PP resin contains an ethylene-butene-propylene copolymer as a base resin. The PPa resin is (1) a homo type PPa resin having a Vicat softening point of 115° C. or above and a melting point of 150° C. or above, (2) an ethylene-propylene copolymer (random copolymer) having a Vicat softening point of 105° C. or above and a melting point of 130° C. or above or (3) a simple resin or a blended resin containing a PPa resin modified by an unsaturated carboxylic acid and having a melting point of 110° C. or above.

The PPa resin may contain 5% or above of a low-crystalline ethylene-butene copolymer having a density of 900 kg/m$^3$ or below, a low-crystalline propylene-butene copolymer, an amorphous ethylene-propylene copolymer, an amorphous propylene-ethylene copolymer or an ethylene-butene-propylene terpolymer to give the PPa resin film flexibility, to improve bendability and to prevent cracking during a forming process.

Flexibility may be given to the PPa resin to improve the foldability of the PPa resin film and to prevent the cracking of the PPa resin film during a forming process by adding 5% or above of a T-PP resin (ethylene-butene-propylene terpolymer) to the PPa resin.

The packaging laminated sheet 10 of the present invention may include, in addition to the base layer 11, the barrier layer 12, the adhesive resin layer 13 and the innermost layer 14 of the T-PP resin, an intermediate layer sandwiched between the barrier layer 12 and the innermost layer 14 to improve the strength of the packaging laminated sheet as a polymer battery module packaging sheet and to improve and stabilize the impermeability of the packaging laminated sheet.

The component layers of the packaging laminated sheet of the present invention may be processed by a surface activating treatment, such as a corona discharge treatment, a blasting treatment, an oxidation treatment or ozone treatment, to improve and stabilize film forming property, lamination property, formability (ease of forming pouches or embossed packages).

T-PP resins are suitable for forming the innermost layer (heat-sealable resin layer) 14 of the packaging laminated sheet 10. Films of a T-PP resin can be easily bonded together by heat-sealing, meet protective properties including moistureproof property and heat resistance required of the heat-sealable resin layer of a polymer battery module packaging sheet, and have desirable properties suitable for lamination and embossing.

Desirably, the innermost layer 14 has a thickness in the range of 30 to 100 μm and is formed of a T-PP resin having a melting point of 120° C. or above. Preferably, the innermost layer 14 is a PP resin layer containing 5% or above of a terpolymer or a multilayer structure having at least a PP resin layer containing 5% or above of a terpolymer. The followings are concrete examples of materials forming the component layers of the innermost layer 14.

(1) Terpolymer
(2) Terpolymer+PP resin
(3) Terpolymer/LLDPE/terpolymer
(4) Terpolymer+PP resin/LLDPE/terpolymer/PP resin
(5) Terpolymer+PP resin/PP resin/terpolymer+PP resin
(6) Terpolymer+PP resin/PP resin+LLDPE/terpolymer+PP resin
(7) Terpolymer+PP resin/PP resin+terpolymer/terpolymer+PP resin where "+" denotes blending, "/" indicates coextrusion, terpolymer content is 5% or above and the PP resin is of a random polymerization type.

The T-PP resin may contain 5% or above of a low-crystalline ethylene-butene copolymer having a density of 900 kg/m$^3$ or below, a low-crystalline propylene-butene copolymer, an amorphous ethylene-propylene copolymer or an amorphous propylene-ethylene copolymer to give the T-PP resin film flexibility, to improve bendability and to prevent cracking during a forming process.

Desirably, the base layer 11 of the packaging laminated sheet of the present invention is bonded to the surface processed by the chemical conversion treatment (coating 15a) of the barrier layer 12 by a dry lamination method.

Possible adhesive resins for forming the bonding layer 16 for bonding the base layer 11 to the surface processed by the chemical conversion treatment of the aluminum foil 12 are polyester resins, polyethylene imine resins, polyether resins, cyanoacrylate resins, urethane resins, organic titanium compounds, polyether-urethane resins, epoxy reins, polyester-urethane resins, imide resins, isocyanate resins, polyolefin resins and silicone resins.

EXAMPLES

Examples of the packaging laminated sheet in the sixth embodiment will be described.

The chemical conversion treatment used an aqueous solution of a phenolic resin, a chromium fluoride compound and phosphoric acid as a processing liquid. The processing liquid was applied to the surface of the aluminum foil by a roll coating method in a film, and the film was baked at 180° C. or above. The weight per unit area of the film was 10 mg/m² (dry weight).

Examples of the packaging laminated sheet in the sixth embodiment will be described.

The packaging laminated sheets in examples and comparative examples used 25 μm thick nylon films for forming their base layers and used 40 μm thick aluminum foils for forming their barrier layers.

The innermost layers of the examples of the present invention contained a T-PP resin (ethylene-butene-propylene terpolymer).

Packaging laminated sheets in examples were subjected to single-side embossing to form embossed packages each having a hollow part of 30 mm×50 mm×3.5 mm. The formability of the packaging laminated sheets was evaluated.

Examples used a PPa resin produced by acid-modified polymerization using an unsaturated carboxylic acid and containing a RPP resin having a softening point of 105° C. and a melting point of 146° C. as a base resin.

Example 6-1

Both the surfaces of a 40 μm thick aluminum foil were subjected to chemical conversion treatment. A 25 μm thick nylon film was laminated to one of the surfaces of the aluminum foil by a dry lamination method. Each of sample packaging laminated sheets in Example 6-1 was formed by bonding a laminated film of a 20 μm thick Film of a PPa resin as an adhesive resin film and a 30 μm thick film of one of the following resins (1) to (6) by a sandwich lamination method to the other surface of the aluminum foil.
(1) Terpolymer
(2) Terpolymer (5%) 4 RPP (95%)
(3) Terpolymer (50%)+RPP (50%)
(4) Terpolymer (80%)+RPP (20%)
(5) Terpolymer/PP/terpolymer
(6) Terpolymer/PP+LLDPE/terpolymer
where "+" denotes blending, "/" indicates coextrusion, "RPP" denotes a random polypropylene resin and "LLDPE" denotes a linear low-density polyethylene resin. Packaging laminated sheets in Example 6-1 were completed by subjecting the laminated sheets to a heating process that heated the laminated sheets so that the surfaces of the aluminum foils were heated at 140° C.

Example 6-2

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick molten resin film of a PPa resin containing 10% of the terpolymer and a 30 μm thick molten resin film of a blend of 5% of the terpolymer and 95% of a PP resin was bonded to the other surface of the aluminum foil by a sandwich lamination method to obtain sample packaging laminated sheets in Example 6-2.

Example 6-3

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick molten resin film of a PPa resin containing 50% of the terpolymer and a 30 μm thick molten resin film of a blend of 5% of the terpolymer and 95% of a PP resin was bonded to the other surface of the aluminum foil by a sandwich lamination method to obtain sample packaging laminated sheets in Example 6-3.

Comparative Example 6-1

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick molten resin film of a PPa resin and a molten resin film of a cast homopolypropylene resin having a melting point of 151° C. was bonded to the other surface of the aluminum foil by a sandwich lamination method to obtain a laminated sheet. The laminated sheets thus formed were heated so that the surfaces of the aluminum foils were heated at 150° C. to complete sample packaging laminated sheets in Comparative example 6-1.

Comparative Example 6-2

A 25 μm thick nylon film was bonded to one of the surfaces of a 40 μm thick aluminum foil by a dry lamination method. Each of sample packaging laminated sheets in Comparative example 6-2 was formed by bonding a laminated film of a 20 μm thick resin film of a PPa resin having a melting point of 120° C. as an adhesive resin film and a 30 μm thick film of one of the resins (1) to (6) used for forming the sample packaging laminated sheets in Example 6-1 by a sandwich lamination method to the other surface of the aluminum foil. Laminated structures thus formed were heated so that the surfaces of the aluminum foils were heated at 150° C. to complete the packaging laminated sheets in Comparative example 6-2.

Embossing and Packaging

The sample packaging laminated sheets were subjected to an embossing process to form packages and polymer battery modules were packaged in the packages to form polymer batteries. The polymer batteries were evaluated by the following methods.

Evaluating Methods

1) Delamination During Forming

Samples were inspected for the separation of the base layer and the aluminum foil immediately after forming.

2) Chemical Resistance Test

Samples were inspected for the separation of the aluminum foil and the innermost layer after keeping the samples in an atmosphere of 60° C. and 90% RH in a thermostat for seven days.

3) Delamination During Heat-Sealing Process

Samples were inspected for the separation of the innermost layer and the aluminum foil immediately after heat-sealing.

Results

The packaging laminated sheets in Examples 6-1, 6-2 and 6-3 were not delaminated by embossing and heat-sealing. The aluminum foil and the base layer of each of the packaging laminated sheets in Examples 6-1, 6-2 and 6-3 were not separated. The packaging laminated sheets in Examples 6-1, 6-2 and 6-3 were not delaminated by the chemical resistance test. Any cracks were not formed in the innermost layers of the packaging laminated sheets in Examples 6-1, 6-2 and 6-3 during the embossing process and the bending process.

No problem arose during the embossing process and the heat-sealing process in the packaging laminated sheets in comparative example 6-1 and the aluminum foil and the base layer of each of the packaging laminated sheets in Comparative example 6-1 were not separated. The packaging laminated sheets in Comparative example 6-1 were not delaminated by the chemical resistance test. However, cracks wore formed during the embossing process in the innermost layers of all the hundred sample packaging laminated sheets in Comparative example 6-1 and cracks were formed during the bending process in the innermost layers of the fifty-six sample packaging laminated sheets out of the hundred sample packaging laminated sheets in Comparative example 6-1.

Forty-five sample packaging laminated sheets out of the hundred sample packaging laminated sheets in Comparative example 6-2 were delaminated during the embossing process and the heat-sealing process. All the hundred sample packaging laminated sheets in Comparative example 6-2 were delaminated by the chemical resistance test. Cracks were not formed in all the hundred sample packaging laminated sheets in Comparative example 6-2 during the embossing process and the bending process.

The chemical conversion treatment of the opposite surfaces of the aluminum foil prevents the separation of the base layer and the aluminum foil during an embossing process and heat-sealing. The separation of the aluminum foil and the innermost layer can be prevented because the surfaces of the aluminum foil are not corroded by hydrogen fluoride that may be produced by interaction between the electrolyte of the polymer battery module and moisture.

The innermost layer of the T-PP resin can be efficiently formed by sandwich lamination using the Film of a PPa resin as an adhesive resin film. Postheating can enhance the adhesive strength between the adjacent layers of the packaging laminated sheet. Thus, the laminated packaging structure of the sixth embodiment can be used for packaging polymer battery modules.

Seventh Embodiment

A packaging laminated sheet, i.e., a polymer battery module packaging sheet, in a seventh embodiment according to the present invention has a moistureproof property, and is resistant to the detrimental effects of the polymer battery module and capable of being manufactured at a high productivity. When forming the packaging laminated sheet, the opposite surfaces of a barrier layer are subjected to chemical conversion treatment, a base layer is bonded to one of the surfaces of the barrier layer by a dry lamination method, a laminated film is formed on the other surface of the barrier layer by coextruding molten resin films of a PPa resin and a PE resin onto the other surface of the barrier layer to form a laminated sheet and the laminated sheet is subjected to a heating process to enhance the adhesive strength between the component layers.

The inventors of the present invention made earnest studies to develop a packaging laminated sheet, i.e., a battery module packaging sheet, that will not be delaminated by embossing and heat-sealing and has satisfactory properties required of battery module packaging sheets for packaging a polymer battery, including chemical resistance to the detrimental effects of a polymer battery module, found that the foregoing problems can be solved by subjecting both the surfaces of an aluminum foil to chemical conversion treatment, forming a resin layer of a PEa resin, such as an unsaturated carboxylic acid graft linear polyethylene resin, and a PE resin film on the inner surface of the aluminum foil by a coextrusion lamination method and subjecting a laminated sheet thus formed to postheating and have made the present invention.

As shown in FIGS. 5(b) and 5(c), a packaging laminated sheet 10, i.e., a polymer battery module packaging sheet, in the seventh embodiment has, as essential components, a base layer 11, a bonding layer 16, a chemical conversion coating 15a, an aluminum foil (barrier layer) 12, a chemical conversion coating 15b, an adhesive resin layer 13 and a heat-sealable resin layer (PE resin layer) 14. The adhesive resin layer 13 and the heat-sealable resin layer 14 are formed by a coextrusion lamination method. The packaging laminated sheet 10 is subjected to postheating after the same has been formed to enhance the adhesive strength between the component layers. The adhesive resin layer 13 and the heat-sealable resin layer 14 constitute an innermost layer.

As shown in FIGS. 5(b) and 5(c), a method of manufacturing a polymer battery packaging sheet of the present invention comprises the steps of coating both the surfaces of the aluminum foil (barrier layer) 12 with the chemical conversion coatings 15a and 15b, forming the adhesive resin layer 13 of the PEa resin and the heat-sealable resin layer 14 of the PE resin by coextrusion on the inner surface of the aluminum foil 12 to form a laminated sheet and heating the laminated sheet by postheating at a temperature not lower than the softening point of the PEa resin forming the adhesive resin layer.

As shown in FIGS. 5(b) and 5(c), the packaging laminated sheet 10 of the present invention has at least the base layer 11, the chemical conversion coating 15a, the aluminum foil 12, the chemical conversion coating 15b, the adhesive resin layer 13 and the heat-sealable resin layer 14. The adhesive resin layer 13 and the heat-sealable resin layer 14 are formed by a coextrusion lamination method. The heat-sealable resin layer 14 is formed of the PE resin. When the packaging laminated sheet 10 is intended for forming an embossed package body 5a as shown in FIG. 2, the packaging laminated sheet 10 must be excellent in formability to form the hollow part 7 for holding a polymer battery module 2. Materials of the layers of the packaging laminated sheet 10 and processes for bonding the layers will be described hereinafter.

The base layer 11 is an oriented polyester film or an oriented nylon film. Possible polyester resins for forming the base layer 11 are PET resins, PBT resins, PEN resins, PBN resins, interpolyester resins, PC resins and the like. Possible nylon resins for forming the base layer 11 are polyamide resins including nylon 6, nylon 66, copolymers of nylon 6 and nylon 66, nylon 610, polymethaxylilene adipamide (MXD6) and the like.

When a polymer battery using the packaging laminated sheet 10 is used on a piece of hardware, the base layer 11 comes into direct contact with the piece of hardware. Therefore, it is basically desirable to form the base layer 11 of an intrinsically insulating resin. Since a film forming the base layer 11 has pinholes and pinholes will be formed in the film during processing, the thickness of the base layer 11 must be 6 μm or above, preferably, in the range of 12 to 25 μm.

The base layer 11 may be a laminated film in view of providing the base layer 11 with pinhole resistance and improved insulating ability.

A laminated film for the base layer 11 includes at least one resin layer consisting of two or more layers each having a thickness of 6 μm or above, preferably, in the range of 12 to 25 μm. The following laminated structures 1) to 7), not shown, are examples of the laminated base layer 11.

1) Oriented PET resin layer/Oriented nylon layer
2) Oriented nylon layer/Oriented PET resin layer To improve the mechanical aptitude (stability when passed through processing machines and a packaging machine) and surface protecting ability (heat resistance and electrolyte resistance) of the packaging sheet and to reduce friction between a die and the base layer 11 when forming an embossed package, it is preferable that the base layer 11 consists of plural layers and the surface of the base layer 11 is coated with a fluorocarbon resin, an acrylic resin or a silicone resin. The base layer 11 may be any one of the following laminated films.

3) Fluorocarbon resin layer/Oriented PET resin layer (the fluorocarbon resin layer may be a fluorocarbon resin film or a film formed by spreading a liquid fluorocarbon resin in a film and drying the same.)
4) Silicone resin layer/oriented PET resin layer (the silicone resin layer may be a silicone resin film or a film formed by spreading a liquid silicone resin in a film and drying the same.)
5) Fluorocarbon resin layer/Oriented PET resin layer/Oriented nylon layer
6) Silicone resin layer/Oriented PET resin layer/Oriented nylon layer
7) Acrylic resin layer/Oriented nylon layer (the acrylic resin layer may be an acrylic resin film or a film formed by spreading an acrylic resin and drying the same.)

The barrier layer (aluminum foil) 12 prevents the penetration of moisture into the polymer battery. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 μm or above and is formed from a metal foil, such as an aluminum foil or a nickel foil, or a film coated with an inorganic compound, such as silicon dioxide or alumina, by evaporation. Preferably, the barrier layer 12 is an aluminum foil of a thickness in the range of 20 to 80 μm.

The inventors of the present invention made studies to reduce pinholes and to prevent cracking of an embossed package and found that aluminum having an iron content in the range of 0.3 to 9.0% by weight, preferably, 0.7 to 2.0% by weight is more satisfactory in ductility than aluminum not containing any iron, an aluminum foil of such aluminum is less subject to the formation of pinholes when the packaging laminated sheet is bent and is more capable of facilitating forming the side walls of the embossed package than an aluminum foil of aluminum not containing any iron. Aluminum foils of aluminum having an iron content less than 0.3% by weight are not satisfactorily pinhole-resistant and do not improve the formability of the packaging laminated sheet. Aluminum foils of aluminum having an iron content exceeding 0.9% by weight are unsatisfactory in flexibility and affect adversely to the workability of the packaging laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of forming may be used.

The inventors of the present invention found through studies that a satisfactory packaging laminated sheet can be formed when both the surfaces of the barrier layer 12 of aluminum are processed by chemical conversion treatment. The chemical conversion treatment forms an acid-resistant film of a phosphate, a chromate, a fluoride or a triazine thiol compound. The acid-resistant film prevents the separation of the aluminum foil and the base layer during an embossing process, and the dissolution and corrosion of the surfaces of the aluminum foil, particularly, aluminum oxide films coating the aluminum foil, by hydrogen fluoride produced by the interaction of the electrolyte of the polymer battery module and moisture, improves the adhesive property (wettability) of the surfaces of the aluminum foil, and prevents the separation of the aluminum foil and the base layer during an embossing process and a heat-sealing process and the separation of the aluminum foil and the heat-sealable resin layer due to the effect of hydrogen fluoride produced by the interaction of the electrolyte and moisture.

It was found through the examination of various chemical conversion treatment methods that chemical conversion treatment method using a mixture of a phenolic resin, trivalent chromium fluoride and phosphoric acid forms a satisfactory acid-resistant film.

When the packaging laminated sheet is to be used for forming a pouch for containing a polymer battery module, only the inner surface of the aluminum foil on the side of the innermost layer 14 may be processed by chemical conversion treatment.

When the packaging laminated sheet is to be used for forming an embossed package for containing a polymer battery module, both the surfaces of the aluminum foil 12 are processed by chemical conversion treatment to prevent the separation of the aluminum foil 12 and the base layer 11 during an embossing process. The packaging laminated sheet provided with the aluminum foil having both the surfaces processed by the chemical conversion treatment may be used for forming pouches.

The inventors of the present invention made studies to develop a laminating method capable of laminating layers so that the layers are kept bonded with stable adhesive strength and fabricated a laminated sheet having component layers bonded with predetermined adhesive strength by forming the packaging laminated sheet 10 by the steps of laminating the base layer 11 to one surface processed by chemical conversion treatment (coating 15*a*) of the barrier layer 12 by a dry lamination method, and forming the laminated film of the adhesive resin layer 13 of a PEa resin and the innermost layer 14 of a PE resin on the other surface 15*b* processed by the chemical conversion treatment of the barrier layer 12 by a coextrusion lamination method to form a laminated structure, and heating the laminated structure at a temperature not lower than the softening point of the PEa resin forming the adhesive resin layer 13.

The packaging laminated sheet 10 may be heated by any one of a contact heating method using a hot roller, a hot air heating method using hot air and an infrared heating method using near or far infrared rays, provided that the PEa resin forming the adhesive resin layer 13 can be heated at a temperature not lower than the softening point thereof.

A packaging laminated sheet having component layers bonded together with stable adhesive strength can be formed by another method that heats the surface on the side of the innermost layer 14 of the aluminum foil 12 at a temperature not lower than the softening point of the PEa resin forming the adhesive resin layer 13 when forming the adhesive resin layer 13 and the innermost layer 14 by a coextrusion lamination method.

The PEa resin is a simple resin produced by denaturing a base resin such as (1) a linear low-density polyethylene resin (LLDPE resin) having a density of 0.91 g/cm$^3$ or above, a Vicat softening point of 80° C. or above and a melting point of 110° C. or above, (2) a medium-density polyethylene resin (MDPE resin) having a density of 0.92 g/cm$^3$ or above, a Vicat softening point of 80° C. or above and a melting point of 115° C. or above or (3) a high-density polyethylene resin (HDPE resin) having a density of 0.92 g/cm$^3$ or above, a Vicat softening point of 90° C. or above and a melting point of 125° C. or above by using an unsaturated carboxylic acid, or a blend of some of those resins.

The PEa resin forming the adhesive resin layer 13 may contain 5% or above of a low-crystalline ethylene-butene copolymer having a density of 900 kg/m$^3$ or below, a low-crystalline propylene-butene copolymer, an amorphous ethylene-propylene copolymer, an amorphous propylene-ethylene copolymer or an ethylene-butene-propylene terpolymer to give the adhesive resin layer 13 flexibility, to improve bendability and to prevent cracking during a forming process.

The packaging laminated sheet 10 of the present invention may include, in addition to the base layer 11, the barrier layer 12, the adhesive resin layer 13 and the innermost layer (heat-sealable resin layer) 14 of the PE resin, an intermediate layer sandwiched between the barrier layer 12 and the adhesive resin layer 13 to improve the strength of the packaging laminated sheet 10 as a polymer battery module packaging sheet and to improve and stabilize the impermeability of the packaging laminated sheet 10.

The component layers of the packaging laminated sheet of the present invention may be processed by a surface activating treatment, such as a corona discharge treatment, a blasting treatment, an oxidation treatment or ozone treatment, to improve and stabilize film forming property, lamination property, formability (ease of forming pouches or embossed packages).

PE resins are suitable for forming the innermost layer (heat-sealable resin layer) 14 of the packaging laminated sheet 10. Films of a PE resin can be easily bonded together by heat-sealing, meet protective properties including moistureproof property and heat resistance required of the heat-sealable resin layer of a polymer battery module packaging sheet, and have desirable properties suitable for lamination and embossing.

The innermost layer (heat-sealable resin layer) 14 is a single film or a multilayer film of (1) a linear low-density polyethylene resin (LLDPE resin) having a density of 0.91 g/cm$^3$ or above, a Vicat softening point of 80° C. or above and a melting point of 110° C. or above, (2) a medium-density polyethylene resin (MDPE resin) having a density of 0.92 g/cm$^3$ or above, a Vicat softening point of 80° C. or above and a melting point of 115° C. or above, (3) a high-density polyethylene resin (HDPE resin) having a density of 0.94 g/cm$^3$ or above, a Vicat softening point of 90° C. or above and a melting point of 125° C. or above or a blend of some of those resins.

The PE resin may contain 5% or above of a low-crystalline ethylene-butene copolymer having a density of 900 kg/m$^3$ or below, a low-crystalline propylene-butene copolymer, an amorphous ethylene-propylene copolymer, an amorphous propylene-ethylene copolymer or an ethylene-butene-propylene terpolymer to give the PE resin film flexibility, to improve bendability and to prevent cracking during a forming process. A PP resin may be added to the PE resin to make the packaging laminated sheet slide smoothly in an embossing process or a pouch forming process.

Desirably, the base layer 11 of the packaging laminated sheet of the present invention is bonded to the surface processed by the chemical conversion treatment (coating 15a) of the barrier layer 12 by a dry lamination method.

Possible adhesive resins for forming the bonding layer 16 for bonding the base layer 11 to the surface processed by the chemical conversion treatment (coating 15a) of the aluminum foil 12 are polyester resins, polyethylene imine resins, polyether resins, cyanoacrylate resins, urethane resins, organic titanium compounds, polyether-urethane resins, epoxy reins, polyester-urethane resins, imide resins, isocyanate resins, polyolefin resins and silicone resins.

EXAMPLES

Examples of the packaging laminated sheet in the seventh embodiment will be described.

The chemical conversion treatment used an aqueous solution of a phenolic resin, a chromium fluoride compound and phosphoric acid as a processing liquid. The processing liquid was applied to the surface of the aluminum foil by a roll coating method in a film, and the film was baked at 180° C. or above. The weight per unit area of the film was 10 mg/m$^2$ (dry weight).

Examples of the packaging laminated sheet in the seventh embodiment will be described.

Packaging laminated sheets in Example 7-1 and Comparative examples 7-2, 7-3 and 7-5 were processed to form 50 mm wide and 80 mm long pillow type pouches. Polymer battery modules were packaged and sealed in the pillow type pouches, respectively.

Packaging laminated sheets in Comparative examples 7-2, 7-4 and 7-6 were processed to form embossed package bodies each provided with a hollow part of 30 mm×50×3.5 mm.

A 20 μm thick adhesive film of an unsaturated carboxylic acid graft linear low-density PE resin was wound around parts of tabs of polymer battery modules corresponding to heat-sealed parts of the pouches and the embossed packages.

Example 7-1

Pouch

Both the surfaces of a 20 μm thick aluminum foil were subjected to chemical conversion treatment. A 16 μm thick oriented polyester resin film was laminated to one of the surfaces of the aluminum foil by a dry lamination method. A laminated film of a 20 μm thick film (adhesive resin layer) of a PEa resin having a softening point of 90° C. and a melting point of 122° C. and a 30 μm thick film of an LLDPE resin was formed on the other surface of the aluminum foil by a coextrusion lamination method to form a laminated sheet. The laminated sheet was heated so that the surfaces of the aluminum foil were heated at 110° C. to obtain sample packaging laminated sheets in Example 7-1.

Comparative Example 7-1

Pouch

Both the surfaces of a 20 μm thick aluminum foil were subjected to chemical conversion treatment. A 12 μm thick polyester resin film was laminated to one of the surfaces of the aluminum foil by a dry lamination method. A laminated film of a 20 μm thick film of a PEa resin having a softening point of 90° C. and a melting point of 122° C. (20 μm thick film of an LLDPE resin having a softening point of 115° C. and a melting point of 123° C.) and a 30 μm thick film of an LLDPE resin having a softening point of 115° C. and a melting point of 123° C.) was formed by a coextrusion lamination method on the other surface of the aluminum foil to obtain sample packaging laminated sheets in Comparative example 7-1.

Comparative Example 7-2

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick film of a PEa resin (HDPE) having a softening point of 120° C. and a melting point of 130° C. and a 30 μm thick film of an HDPE resin having a softening point of 125° C. and a melting point of 132° C. was formed on the other surface of the aluminum foil by a coextrusion lamination method to obtain sample packaging laminated sheets in Comparative example 7-2.

Comparative Example 7-3

Pouch

A 20 μm thick oriented polyester resin film was laminated to one of the surfaces of a 20 μm thick aluminum foil by a dry lamination method. A laminated film of a 20 μm thick film of a PEa resin (LLDPE) having a softening point of 90° C. and a melting point of 115° C. and a 30 μm thick film of an LLDPE resin having a softening point of 115° C. and a melting point of 123° C. was formed on the other surface of the aluminum foil to form a laminated sheet. The laminated sheet was heated so that the surfaces of the aluminum foil was heated at 130° C. to obtain sample laminated packaging sheets in Comparative example 7-3.

Comparative Example 7-4

Embossed Package

A 25 μm thick nylon film was bonded to one of the surfaces of a 40 μm thick aluminum foil by a dry lamination method. A laminated film of a film of a PEa (HDPE) having a softening point of 120° C. and a melting point of 130° C. and a 30 μm thick film of an HDPE resin having a softening point of 125° C. and a melting point of 132° C. was formed by a coextrusion lamination method to form a laminated sheet. The laminated sheet was heated so that the surfaces of the aluminum foil were heated at 150° C. to obtain sample packaging laminated sheets in Comparative example 7-4.

Comparative Example 7-5

Pouch

An oriented polyester film was bonded to one of the surfaces of a 20 μm thick aluminum foil by a dry lamination method. A laminated film of a 20 μm thick film of a PPa resin having a softening point of 120° C. and a 30 μm thick film of a PP resin having a softening point of 140° C. and a melting point of 157° C. was formed on the other surface of the aluminum foil by a coextrusion lamination method to form a laminated sheet. The laminated sheet was heated so that the surfaces of the aluminum foil were heated at 150° C. to obtain sample packaging laminated sheets in Comparative example 7-5.

Comparative Example 7-6

Pouch

An oriented polyester film was bonded to one of the surfaces of a 40 μm thick aluminum foil by a dry lamination method. A laminated film of a 20 μm thick film of a PPa resin having a softening point of 120° C. and a 30 μm thick film of a PP resin having a softening point of 140° C. and a melting point of 157° C. was formed on the other surface of the aluminum foil by a coextrusion lamination method to form a laminated sheet. The laminated sheet was heated so that the surfaces of the aluminum foil were heated at 150° C. to obtain sample packaging laminated sheets in Comparative example 7-6.

Pouch Formation, Embossing and Packaging

The sample packaging laminated sheets in Example 7-1 and Comparative examples 7-1, 7-3 and 7-5 were subjected to a pouch forming process to form pouches. The sample packaging laminated sheets in Comparative examples 7-2, 7-4 and 7-6 were subjected to an embossing process to form packages. Polymer battery modules were packaged in the pouches and the embossed packages to form polymer batteries. The polymer batteries were evaluated by the following methods.

Evaluating Methods

1) Delamination During Forming

Samples were inspected for the separation of the base layer and the aluminum foil immediately after forming.

2) Chemical Resistance Test

Samples were inspected for the separation of the aluminum foil and the innermost layer after keeping the samples in an atmosphere of 60° C. and 90% RH in a thermostat for seven days.

3) Delamination During Heat-Sealing Process

Samples were inspected for the separation of the innermost layer and the aluminum foil immediately after heat-sealing.

4) Low-Temperature Resistance

Each of sample packages was prepared by sealing an object in the package formed by processing the sample packaging laminated sheet by sealing the opening of the package by a heat-sealing process and the sample packages were dropped from a height of 50 cm in a cold environment of −40° C. Heat-sealed parts of the packages were examined for cracks.

Results

Sample packaging laminated sheets in Examples 7-1 and 7-2 were not delaminated by embossing, heat-sealing and the effect of the polymer battery modules. Any cracks were not formed in the heat-sealed parts by low-temperature resistance tests performed in the cold environment of −40° C.

Sample packaging laminated sheets in Comparative examples 7-1, 7-2, 7-3 and 7-5 were not delaminated by heat-sealing. Sample packaging laminated sheets in Comparative example 7-2 were not delaminated by embossing. The innermost layers of all the hundred sample packaging laminated sheets in Comparative examples 7-1, 7-2, 7-3 and 7-5 were separated from the aluminum foils, respectively.

Forty sample packaging laminated sheets out of the hundred sample packaging laminated sheets in Comparative example 7-4 and forty-six sample packaging laminated sheets out of the hundred sample packaging laminated sheets in Comparative example 7.4 were delaminated by heat-sealing. All the hundred sample packaging laminated sheets in each of Comparative examples 7-4 and 7-6 were delaminated by the chemical resistance test.

Cracks were formed in the heat-sealed parts of the twenty sample packaging laminated sheets out of the hundred sample packaging sheets in each of Comparative examples 7-5 and 7-6 when the sample polymer batteries were dropped from a height of 50 cm in the low-temperature environment of −40° C.

The chemical conversion treatment of the opposite surfaces of the aluminum foil prevents the separation of the base layer and the aluminum foil during embossing and heat-sealing. The separation of the aluminum foil and the innermost layer can be prevented because the surfaces of the aluminum foil are not corroded by hydrogen fluoride that may be produced by interaction between the electrolyte of the polymer battery module and moisture.

The laminated resin layer of the PEa resin and the PE resin can be efficiently formed by the coextrusion lamination method. Postheating can enhance the adhesive strength between the adjacent layers of the packaging laminated sheet. Thus, the laminated packaging structure of the seventh embodiment can be used for packaging polymer battery modules.

Eighth Embodiment

A packaging laminated sheet, i.e., a polymer battery module packaging sheet, in an eighth embodiment according to the present invention has a moistureproof property, and is resistant to the detrimental effects of the polymer battery module and capable of being manufactured at a high productivity. When forming the packaging laminated sheet, the opposite surfaces of a barrier layer are subjected to chemical conversion treatment, a heat-sealable resin film of a PE resin is laminated to one of the surfaces of the barrier layer by a sandwich lamination method, to form a laminated sheet and the laminated sheet is subjected to a heating process to enhance the adhesive strength between the component layers.

The inventors of the present invention made earnest studies to develop a packaging laminated sheet, i.e., a polymer battery module packaging sheet, that will not be delaminated by embossing and heat-sealing and has satisfactory properties required of battery module packaging sheets for packaging a polymer battery, including chemical resistance to the detrimental effects of a polymer battery module, found that the foregoing problems can be solved by subjecting both the surfaces of an aluminum foil to chemical conversion treatment, forming a resin layer of a PEa resin, such as an unsaturated carboxylic acid graft linear polyethylene resin, and a PE resin film as an adhesive resin layer on the inner surface of the aluminum foil by a sandwich lamination method and subjecting a laminated sheet thus formed to postheating and have made the present invention.

As shown in FIGS. 5(b) and 5(c), a packaging laminated sheet 10, i.e., a polymer battery module packaging sheet, in the eighth embodiment has, as essential components, a base layer 11, a bonding layer 16, a chemical conversion coating 15a, an aluminum foil (barrier layer) 12, a chemical conversion coating 15b, an adhesive resin layer 13 and a heat-sealable resin layer (PE resin layer) 14. The adhesive resin layer 13 and the heat-sealable resin layer 14 are formed by a sandwich lamination method. The packaging laminated sheet 10 is subjected to postheating after the same has been formed to enhance the adhesive strength between the component layers. The adhesive resin layer 13 and the heat-sealable resin layer 14 constitute an innermost layer.

As shown in FIGS. 5(b) and 5(c), the present invention coats both the surfaces of the aluminum foil (barrier layer) 12 with the chemical conversion coatings 15a and 15b, forms the adhesive resin layer 13 and the heat-sealable resin layer 14 by sandwich lamination on the inner surface of the aluminum foil 12 to form the laminated sheet 10 and heats the laminated sheet 10 by post heating at a temperature not lower than the softening point of the PEa resin forming the adhesive resin layer 13.

As shown in FIGS. 5(b) and 5(c), the packaging laminated sheet 10 of the present invention has at least the base layer 11, the chemical conversion coating 15a, the aluminum foil 12, the chemical conversion coating 15b, the adhesive resin layer 13 and the heat-sealable resin layer 14. The adhesive resin layer 13 and the heat-sealable resin layer 14 are formed by a coextrusion lamination method. The heat-sealable resin layer 14 is formed by a sandwich lamination method. The heat-sealable resin layer 14 is a nonoriented PE resin film. When the packaging laminated sheet 10 is intended for forming an embossed package body 5a as shown in FIG. 2, the packaging laminated sheet 10 must be excellent in formability to form the hollow part 7 for holding a polymer battery module 2. Materials of the layers of the packaging laminated sheet 10 and processes for bonding the layers will be described hereinafter.

The base layer 11 is an oriented polyester film or an oriented nylon film. Possible polyester resins for forming the base layer 11 are PET, PBT resins, PEN resins, PBN resins, interpolyester resins, PC resins and the like. Possible nylon resins for forming the base layer 11 are polyamide resins including nylon 6, nylon 66, copolymers of nylon 6 and nylon 66, nylon 610, polymethaxylilene adipamide (MXD6) and the like.

When a polymer battery using the packaging laminated sheet 10 is used on a piece of hardware, the base layer 11 comes into direct contact with the piece of hardware. Therefore, it is basically desirable to form the base layer 11 of an intrinsically insulating resin. Since a film forming the base layer 11 has pinholes and pinholes will be formed in the film during processing, the thickness of the base layer 11 must be 6 μm or above, preferably, in the range of 12 to 25 μm.

The base layer 11 may be a laminated film in view of providing the base layer 11 with pinhole resistance and improved insulating ability.

A laminated film for the base layer 11 includes at least one resin layer consisting of two or more layers each having a thickness of 6 μm or above, preferably, in the range of 12 to 25 μm. The following laminated structures 1) to 7), not shown, are examples of the laminated base layer 11.
1) Oriented PET resin layer/Oriented nylon layer
2) Oriented nylon layer/Oriented PET resin layer To improve the mechanical aptitude (stability when passed through processing machines and a packaging machine) and surface protecting ability (heat resistance and electrolyte resistance) of the packaging sheet and to reduce friction between a die and the base layer 11 when forming an embossed package, it is preferable that the base layer 11 consists of plural layers and the surface of the base layer 11 is coated with a fluorocarbon resin, an acrylic resin or a silicone resin. The base layer 11 may be any one of the following laminated films.

3) Fluorocarbon resin layer/Oriented PET resin layer (the fluorocarbon resin layer may be a fluorocarbon resin film or a film formed by spreading a liquid fluorocarbon resin in a film and drying the same.)

4) Silicone resin layer/Oriented PET resin layer (the silicone resin layer may be a silicone resin film or a film formed by spreading a liquid silicone resin in a film and drying the same.)

5) Fluorocarbon resin layer/Oriented PET resin layer/Oriented nylon layer

6) Silicone resin layer/oriented PET resin layer/Oriented nylon layer

7) Acrylic resin layer/Oriented nylon layer (the acrylic resin layer may be an acrylic resin film or a film formed by spreading an acrylic resin and drying the same.)

The barrier layer (aluminum foil) 12 prevents the penetration of moisture into the polymer battery. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 µm or above and is formed from a metal foil, such as an aluminum foil or a nickel foil, or a film coated with an inorganic compound, such as silicon dioxide or alumina, by evaporation. Preferably, the barrier layer 12 is an aluminum foil of a thickness in the range of 20 to 80 µm.

The inventors of the present invention made studies to reduce pinholes and to prevent the cracking of an embossed package and found that aluminum having an iron content in the range of 0.3 to 9.0% by weight, preferably, 0.7 to 2.0% by weight is more satisfactory in ductility than aluminum not containing any iron, an aluminum foil of such aluminum is less subject to the formation of pinholes when the packaging laminated sheet is bent and is more capable of facilitating forming the side walls of the embossed package than an aluminum foil of aluminum not containing any iron. Aluminum foils of aluminum having an iron content less than 0.3% by weight are not satisfactorily pinhole-resistant and do not improve the formability of the packaging laminated sheet. Aluminum foils of aluminum having an iron content exceeding 0.9% by weight are unsatisfactory in flexibility and affect adversely to the workability of the packaging laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of forming may be used.

The inventors of the present invention found through studies that a satisfactory packaging laminated sheet can be formed when both the surfaces of the barrier layer 12 of aluminum are processed by chemical conversion treatment. The chemical conversion treatment forms an acid-resistant film of a phosphate, a chromate, a fluoride or a triazine thiol compound. The acid-resistant film prevents the separation of the aluminum foil and the base layer during an embossing process, and the dissolution and corrosion of the surfaces of the aluminum foil, particularly, aluminum oxide films coating the aluminum foil, by hydrogen fluoride produced by the interaction of the electrolyte of the polymer battery module and moisture, improves the adhesive property (wettability) of the surfaces of the aluminum foil, and prevents the separation of the aluminum foil and the base layer during an embossing process and a heat-sealing process and the separation of the aluminum foil and the heat-sealable resin layer due to the effect of hydrogen fluoride produced by the interaction of the electrolyte and moisture.

It was found through the examination of various chemical conversion treatment methods using various substances that chemical conversion treatment method using a mixture of a phenolic resin, trivalent chromium fluoride and phosphoric acid forms a satisfactory acid-resistant film.

When the packaging laminated sheet is to be used for forming a pouch for containing a polymer battery module, only the inner surface of the aluminum foil on the side of the innermost layer 14 may be processed by chemical conversion treatment.

When the packaging laminated sheet is to be used for forming an embossed package for containing a polymer battery module, both the surfaces of the aluminum foil 12 are processed by chemical conversion treatment to prevent the separation of the aluminum foil 12 and the base layer 11 during an embossing process. The packaging laminated sheet provided with the aluminum foil having both the surfaces processed by the chemical conversion treatment may be used for forming pouches.

The inventors of the present invention made studies to develop a laminating method capable of laminating layers so that the layers are kept bonded with stable adhesive strength without applying and baking a PEa resin, and fabricated a laminated sheet 10 having component layers bonded with predetermined adhesive strength by a method including the steps of laminating the base layer 11 to one surface 15*a* of the surfaces treated by chemical conversion treatment of the barrier layer 12 by a dry lamination method, and forming a laminated film of the adhesive resin layer 13 of a PEa resin and the innermost layer 14 of a PE resin on the other surface 15*b* processed by the chemical conversion treatment of the barrier layer 12 by a sandwich lamination method to form a laminated structure, and heating the laminated structure at a temperature not lower than the softening point of the PEa resin forming the adhesive resin layer 13.

The packaging laminated sheet 10 may be heated by any one of a contact heating method using a hot roller, a hot air heating method using hot air and an infrared heating method using near or far infrared rays, provided that the PEa resin forming the adhesive resin layer 13 can be heated at a temperature not lower than the softening point thereof.

A packaging laminated sheet having component layers bonded together with stable adhesive strength can be formed by another method that heats the surface on the side of the innermost layer (heat-sealable resin layer) 14 of the aluminum foil 12 at a temperature not lower than the softening point of the PEa resin forming the adhesive resin layer 13 when forming the adhesive resin layer 13 and the innermost layer 14 by a sandwich lamination method.

The PEa resin is a simple resin produced by denaturing a base resin such as (1) a linear low-density polyethylene resin (LLDPE resin) having a density of 0.91 $g/cm^3$ or above, a Vicat softening point of 80° C. or above and a melting point of 110° C. or above, (2) a medium-density polyethylene resin (MOPE resin) having a density of 0.92 $g/cm^3$ or above, a Vicat softening point of 80° C. or above and a melting point of 115° C. or above or (3) a high-density polyethylene resin (HDPE resin) having a density of 0.92 g/cm³ or above, a Vicat softening point of 90° C. or above and a melting point of 125° C. or above by using an unsaturated carboxylic acid, or a blend of some of those resins.

The PEa resin forming the adhesive resin layer 13 may contain 5% or above of a low-crystalline ethylene-butene copolymer having a density of 900 kg/m³ or below, a low-crystalline propylene-butene copolymer, an amorphous ethylene-propylene copolymer, an amorphous propylene-ethylene copolymer or an ethylene-butene-propylene terpolymer to give the adhesive resin layer 13 flexibility, to improve bendability and to prevent cracking during a forming process.

The packaging laminated sheet 10 of the present invention may include, in addition to the base layer 11, the barrier layer 12, the adhesive resin layer 13 and the innermost layer (heat-sealable resin layer) 14, an intermediate layer sandwiched between the barrier layer 12 and the innermost layer 14 to improve the strength of the packaging laminated sheet 10 as a polymer battery module packaging sheet and to improve and stabilize the impermeability of the packaging laminated sheet 10.

The component layers of the packaging laminated sheet of the present invention may be processed by a surface activating treatment, such as a corona discharge treatment, a blasting treatment, an oxidation treatment or ozone treatment, to improve and stabilize film forming property, lamination property, formability (ease of forming pouches or embossed packages).

PE resins are suitable for forming the innermost layer (heat-sealable resin layer) 14 of the packaging laminated sheet 10. Films of a PE resin can be easily bonded together by heat-sealing, meet protective properties including moistureproof property and heat resistance required of the heat-sealable resin layer of a polymer battery module packaging sheet, and have desirable properties suitable for lamination and embossing.

The innermost layer (heat-sealable resin layer) 14 is a single film or a multilayer film of (1) a linear low-density polyethylene resin (LLDPE resin) having a density of 0.91 g/cm³ or above, a Vicat softening point of 80° C. or above and a melting point of 110° C. or above, (2) a medium-density polyethylene resin (MDPE resin) having a density of 0.92 g/cm³ or above, a Vicat softening point of 80° C. or above and a melting point of 115° C. or above, (3) a high-density polyethylene resin (HDPE resin) having a density of 0.94 g/cm³ or above, a Vicat softening point of 90° C. or above and a melting point of 125° C. or above, or a blend of some of those resins.

The PE resin may contain 5% or above of a low-crystalline ethylene-butene copolymer having a density of 900 kg/m³ or below, a low-crystalline propylene-butene copolymer, an amorphous ethylene-propylene copolymer, an amorphous propylene-ethylene copolymer or an ethylene-butene-propylene terpolymer to give the PE resin film flexibility, to improve bendability and to prevent cracking during a forming process. A PP resin may be added to the PE resin to make the packaging laminated sheet slide smoothly in an embossing process or a pouch forming process.

Desirably, the base layer 11 of the packaging laminated sheet of the present invention is bonded to the surface processed by the chemical conversion treatment (coating 15a) of the barrier layer 12 by a dry lamination method.

Possible adhesive resins for forming the bonding layer 16 for bonding the base layer 11 to the surface processed by the chemical conversion treatment (coating 15a) of the aluminum foil 12 are polyester resins, polyethylene imine resins, polyether resins, cyanoacrylate resins, urethane resins, organic titanium compounds, polyether-urethane resins, epoxy reins, polyester-urethane resins, imide resins, isocyanate resins, polyolefin resins and silicone resins.

EXAMPLES

Examples of the packaging laminated sheet in the eighth embodiment will be described.

The chemical conversion treatment used an aqueous solution of a phenolic resin, a chromium fluoride compound and phosphoric acid as a processing liquid. The processing liquid was applied to the surface of the aluminum foil by a roll coating method in a film, and the film was baked at 180° C. or above. The weight per unit area of the film was 10 mg/m² (dry weight).

Examples of the packaging laminated sheet in the eighth embodiment will be described.

Packaging laminated sheets in Example 8-1 and Comparative examples 8-1, 8-3 and 8-5 were processed to form 50 mm wide and 80 mm long pillow type pouches. Polymer battery modules were packaged and sealed in the pillow type pouches, respectively.

Packaging laminated sheets in Example 8-2 and Comparative examples 8-2, 8-4 and 8-6 were processed to form embossed package bodies each provided with a hollow part of 30 mm×50 mm×3.5 mm.

A 20 μm thick adhesive film of an unsaturated carboxylic acid graft linear low-density PE resin was wound around parts of tabs of polymer battery modules corresponding to heat-sealed parts of the pouches and the embossed packages.

Example 8-1

Pouch

Both the surfaces of a 20 μm thick aluminum foil were subjected to chemical conversion treatment. A 16 μm thick oriented polyester resin film was laminated to one of the surfaces of the aluminum foil by a dry lamination method. A laminated film of a 20 μm thick film (adhesive resin layer) of a PEa resin having a softening point of 90° C. and a melting point of 122° C. and a 30 μm thick film of an LLDPE resin having a softening point of 115° C. and a melting point of 123° C. was formed on the other surface of the aluminum foil by a sandwich lamination method to form a laminated sheet. The laminated sheet was heated so that the surfaces of the aluminum foil were heated at 110° C. to obtain sample packaging laminated sheets in Example 8-1.

Example 8-2

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick film (adhesive resin layer) of a PEa resin (HDPE resin) having a softening point of 120° C. and a melting point of 130° C. and a 30 μm thick film of an HDPE resin having a softening point of 125° C. and a melting point of 132° C. was formed on the other surface of the aluminum foil by a sandwich lamination method to form a laminated sheet. The laminated sheet was heated so that the surfaces of the aluminum foil were heated at 140° C. to obtain sample packaging laminated sheets in Example 8-2.

Comparative Example 8-1

Pouch

Both the surfaces of a 20 μm thick aluminum foil were subjected to chemical conversion treatment. A 12 μm thick oriented polyester resin film was laminated to one of the surfaces of the aluminum foil by a dry lamination method. A laminated film of a 20 μm thick film of a PEa resin having a softening point of 90° C. and a melting point of 122° C. (LLDPE resin having a softening point of 150° C. and a melting point of 123° C.) and a 30 μm thick film of an LLDPE resin was formed by a sandwich lamination method on the other surface of the aluminum foil to obtain sample packaging laminated sheets in Comparative example 8-1.

Comparative Example 8-2

Embossed Package

Both the surfaces of a 40 μm thick aluminum foil were subjected to chemical conversion treatment. A 25 μm thick nylon film was laminated to one of the surfaces of the aluminum foil by a dry lamination method. A 20 μm thick film of a PEa resin (HDPE) having a softening point of 120° C. and a melting point of 130° C. and a 30 μm thick film of an HOPE resin having a softening point of 125° C. and a melting point of 132° C. were formed on the other surface of the aluminum foil by a sandwich lamination method to obtain sample packaging laminated sheets in Comparative example 8-2.

Comparative Example 8-3

Pouch

An oriented polyester resin film was laminated to one of the surfaces of a 20 μm thick aluminum foil by a dry lamination method. A laminated film of a 20 μm thick film of a PEa resin (LLDPE) having a softening point of 90° C. or above and a melting point of 115° C. and a 30 μm thick film of an LLDPE resin having a softening point of 115° C. and a melting point of 123° C. was formed by a sandwich lamination method on the other surface of the aluminum foil to form a laminated sheet. The laminated sheet was heated so that the surfaces of the aluminum foil was heated at 130° C. to obtain sample laminated packaging sheets in Comparative example 8-3.

Comparative Example 8-4

Embossed Package

A 25 μm thick nylon film was bonded to one of the surfaces of a 40 μm thick aluminum foil by a dry lamination method. A laminated film of a film of a PEa (HOPE) having a softening point of 120° C. and a melting point of 130° C. and a 30 μm thick film of an HDPE resin having a softening point of 125° C. and a melting point of 132° C. was formed by a sandwich lamination method to form a laminated sheet. The laminated sheet was heated so that the surfaces of the aluminum foil were heated at 150° C. to obtain sample packaging laminated sheets in Comparative example 8-4.

Comparative Example 8-5

Pouch

An oriented polyester film was bonded to one of the surfaces of a 20 μm thick aluminum foil by a dry lamination method. A laminated film of a 20 μm thick film of a PPa resin having a softening point of 120° C. and a 30 μm thick film of a PP resin having a softening point of 140° C. and a melting point of 157° C. was formed on the other surface of the aluminum foil by a sandwich lamination method to form a laminated sheet. The laminated sheet was heated so that the surfaces of the aluminum foil were heated at 150° C. to obtain sample packaging laminated sheets in Comparative example 8-5.

Comparative Example 8-6

Pouch

An oriented polyester film was bonded to one of the surfaces of a 40 μm thick aluminum foil by a dry lamination method. A laminated film of a 20 μm thick film of a PPa resin having a softening point of 120° C. and a 30 μm thick film of a PP resin having a softening point of 140° C. and a melting point of 157° C. was formed on the other surface of the aluminum foil by a sandwich lamination method to form a laminated sheet. The laminated sheet was heated so that the surfaces of the aluminum foil were heated at 150° C. to obtain sample packaging laminated sheets in Comparative example 8-6.

Pouch Formation, Embossing and Packaging

The sample packaging laminated sheets in Example 8-1 and Comparative examples 8-1, 8-3 and 8-5 were subjected to a pouch forming process to form pouches. The sample packaging laminated sheets in Example 8-2 and Comparative examples 8-2, 8-4 and 8-6 were subjected to an embossing process to form packages. Polymer battery modules were packaged in the pouches and the embossed packages to form polymer batteries. The polymer batteries were evaluated by the following methods.

Evaluating Methods

1) Delamination During Forming

Samples were inspected for the separation of the base layer and the aluminum foil immediately after forming.

2) Chemical Resistance Test

Samples were inspected for the separation of the aluminum foil and the PE resin layer after keeping the samples in an atmosphere of 60° C. and 90% RH in a thermostat for seven days.

3) Delamination During Heat-Sealing Process

Samples were inspected for the separation of the innermost layer and the aluminum foil immediately after heat-sealing.

4) Low-Temperature Resistance

Each of sample packages was prepared by sealing an object in the package formed by processing the sample packaging laminated sheet by sealing the opening of the package by a heat-sealing process and the sample packages were dropped from a height of 50 cm in a cold environment of −40° C. Heat-sealed parts of the packages were examined for cracks.

Results

Sample packaging laminated sheets in Examples 8-1 and 8-2 were not delaminated by embossing, heat-sealing and the effect of the polymer battery modules. Any cracks were not formed in the heat-sealed parts by low-temperature resistance tests performed in the cold environment of −40° C.

Sample packaging laminated sheets in Comparative examples 8-1, 8-2, 8-3 and 8-5 were not delaminated by heat-sealing. Sample packaging laminated sheets in Comparative example 8-2 were not delaminated by embossing. The innermost layers of all the hundred sample packaging laminated sheets in Comparative examples 8-1, 8-2, 8-3 and 8-5 were separated from the aluminum foils, respectively.

Forty sample packaging laminated sheets out of hundred sample packaging laminated sheets in Comparative example 8-4 and forty-six sample packaging laminated sheets out of hundred sample packaging laminated sheets in Comparative example 8-6 were delaminated by heat-sealing. All the hundred sample packaging laminated sheets in each of Comparative examples 8-4 and 8-6 were delaminated by the chemical resistance test.

Cracks were formed in the heat-sealed parts of the twenty sample packaging laminated sheets out of the hundred sample packaging sheets in each of Comparative examples 8-5 and 8-6 when the sample polymer batteries were dropped from a height of 50 cm in the low-temperature environment of −40° C.

The chemical conversion treatment of the opposite surfaces of the aluminum foil prevents the separation of the base layer and the aluminum foil during embossing and heat-sealing. The separation of the aluminum foil and the innermost layer can be prevented because the surfaces of the aluminum foil are not corroded by hydrogen fluoride that may be produced by interaction between the electrolyte of the polymer battery module and moisture.

The laminated resin layer of the PE resin film and the PEa resin layer (adhesive resin layer) can be efficiently formed by the sandwich lamination method. Postheating can enhance the adhesive strength between the adjacent layers of the packaging laminated sheet. Thus, the laminated packaging structure of the eight embodiment can be used for packaging polymer battery modules.

Ninth Embodiment

A packaging laminated sheet, i.e., a polymer battery module packaging sheet, in a ninth embodiment according to the present invention has a moistureproof property, and is resistant to the detrimental effects of the polymer battery module and capable of being manufactured at a high productivity. When forming the packaging laminated sheet, the opposite surfaces of a barrier layer are subjected to chemical conversion treatment, an innermost layer is formed of an ERRPP resin or a resin containing an ERRPP resin, the innermost layer and an adhesive resin layer are laminated by a coextrusion lamination method to form a laminated sheet and the laminated sheet is subjected to a heating process to enhance the adhesive strength between the component layers.

The inventors of the present invention made earnest studies to develop such a packaging laminated sheet, and found that the foregoing problems can be solved by subjecting both the surfaces of an aluminum foil to chemical conversion treatment, forming an adhesive resin layer of a PPa resin, such as an unsaturated carboxylic acid graft random acid-modified polypropylene resin, on one of the surfaces of the aluminum foil, forming a single-layer or multilayer innermost layer of an ERRPP resin or a resin containing an ERRPP resin, forming a laminated film of the adhesive resin layer and the innermost layer by a coextrusion lamination method, and heating the surfaces of the aluminum foil during a coextrusion lamination method or the laminated sheet.

Figure 11:
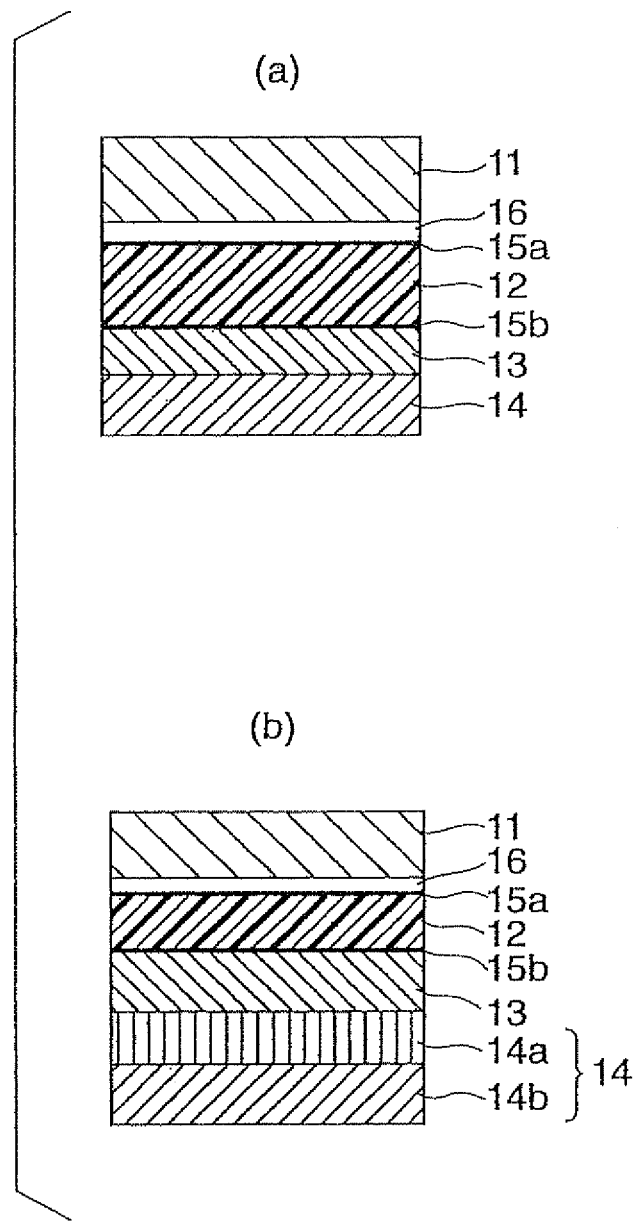
FIG. 11 is a sectional view of assistance in explaining packaging laminated sheets as polymer battery module packaging sheets in a ninth embodiment and a tenth embodiment according to the present invention.

As shown in FIG. 11(a), a packaging laminated sheet 10, i.e., a polymer battery module packaging sheet, in the ninth embodiment has, as essential components, a base layer 11, a bonding layer 16, a chemical conversion coating 15a, an aluminum foil (aluminum layer) 12, a chemical conversion coating 15b, an adhesive resin layer 13 and a heat-sealable resin layer (innermost layer) 14. The adhesive resin layer 13 is formed of a PPa resin and the heat-sealable resin layer 14 is formed of an ERRPP resin having an ethylene content in the range of 5% to 10% by mol. The heat-sealable resin layer 14 may consist of innermost resin films 14a and 14b as shown in FIG. 11(b). At least either the innermost resin film 14a or 14b may be formed of an ERRPP resin. The adhesive resin layer 13 and the heat-sealable resin layer 14 constitute an innermost layer.

Figure 12:
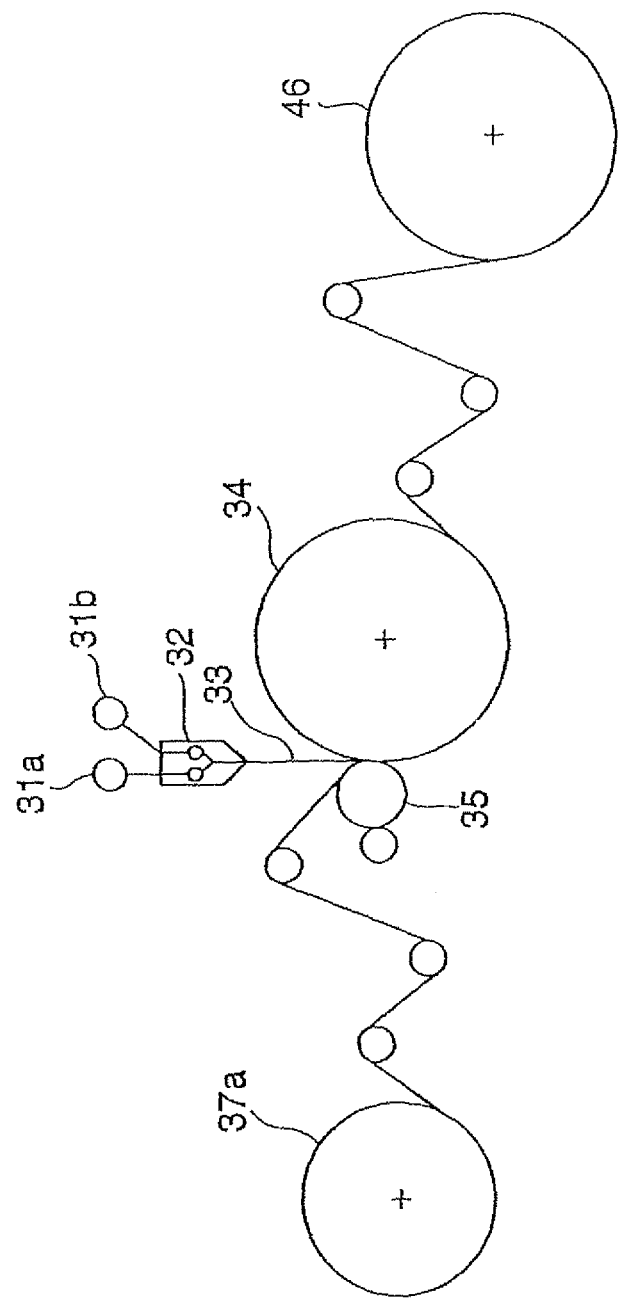
FIG. 12 is a diagrammatic view of assistance in explaining a coextrusion lamination method to be applied to manufacturing a polymer battery module packaging sheet.

Referring to FIG. 12, when manufacturing the packaging laminated sheet 10 provided with the single-layer heat-sealable resin layer 14, an extruder 31a extrudes the adhesive resin layer 13, an extruder 31b extrudes the heat-sealable resin layer 14, and the adhesive resin layer 13 and the heat-sealable resin layer 14 are bonded together by a coextrusion die 32 to obtain a molten resin layer 33. The molten resin layer 33 and a base layer unwound from a roll 37a are bonded together as the same pass between a chill roller 34 and a pressure roller 35 to form the packaging laminated sheet 10. The packaging laminated sheet 10 is taken up on a roll 37.

In the coextrusion lamination process or after the packaging laminated sheet 10 has been completed, the packaging laminated sheet 10 is heated to enhance the adhesive strength between the chemical conversion coating 15b of the aluminum foil 12 and the adhesive resin layer 13 so that the packaging laminated sheet 10 meets requirements required of a polymer battery module packaging sheet. The packaging laminated sheet 10 is heated so that the chemical conversion coating 15b is heated at a temperature not lower than the softening point of the PPa resin or the packaging laminated sheet 10 is subject to post heating to heat the same at a temperature not lower than the softening point of the PPa resin.

As shown in FIG. 11(a) or 11(b), the packaging laminated sheet 10, i.e., the polymer battery module packaging sheet, of the present invention has, as essential components, a base layer 11, a chemical conversion coating 15a, a barrier layer 12, a chemical conversion coating 15b, an adhesive resin layer 13 and a heat-sealable resin layer 14. The adhesive resin layer 13 and the heat-sealable resin layer 14 are formed and bonded together by a coextrusion lamination method. An ERRPP resin film forming the heat-sealable layer 14 is a multilayer film including at least one of layers 14a and 14b of an ERRPP resin.

Materials of the component layers of the laminated sheet 10 according to the present invention and methods of laminating the component layers will be described.

The base layer 11 of the packaging laminated sheet according to the present invention is a film of an oriented polyester resin or an oriented nylon resin. Possible polyester resins are PET resins, PBT resins, PEN resins, PBN resins, interpolyester resins, PC resins and the like. Possible nylons, i.e., polyamide resins, are nylon 6, nylon 66, copolymers of nylon 6 and nylon 66, nylon 610, polymethaxylilene adipamide (MXD6) and the like.)

When the polymer battery is used on a device (hardware), the base layer 11 touches the device. Therefore, it is desirable to form the base layer 11 of an intrinsically insulating resin. Since a film forming the base layer 11 has pinholes and pinholes will be formed in the film during processing, the thickness of the base layer 11 must be 6 μm or above. Preferably, the thickness of the base layer 11 is in the range of 12 to 25 μm.

The base layer 11 may be a laminated film in view of providing the base layer 11 with a high pinhole-resistant property and an improved insulating ability.

Preferably, the base layer 11 includes at least one resin layer consisting of two or more layers each having a thickness of 6 μm or above, preferably, in the range of 12 to 25 μm. The following laminated structures 1) to 7) are examples of the laminated base layer 11.

1) Oriented PET resin layer/Oriented nylon layer
2) oriented nylon layer/Oriented PET layer To improve the mechanical aptitude (stability when passed through processing machines and a packaging machine) and surface protecting ability (heat resistance and electrolyte resistance) of the packaging sheet and to reduce friction between a die and the base layer 11 when forming the embossed package body, it is preferable that the base layer 11 consists of plural layers and the surface of the base layer 11 is coated with a coating of a fluorocarbon resin, an acrylic resin or a silicone resin. The base layer 11 may be any one of the following laminated films.

3) Fluorocarbon resin layer/Oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same.)
5) Fluorocarbon resin layer/Oriented PET resin layer/Oriented nylon layer
6) Silicone resin layer/Oriented PET resin layer/Oriented nylon layer
7) Acrylic resin layer/Oriented nylon layer (the acrylic resin layer may be an acrylic resin film or a film formed by spreading an acrylic resin and drying the same.)

The barrier layer 12 prevents the penetration of moisture into the polymer battery. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 μm or above and is formed from a foil of a metal, such as aluminum or nickel, or a film coated with an inorganic compound, such as silicon dioxide or alumina, by evaporation. Preferably, the barrier layer 12 is an aluminum foil of a thickness in the range of 20 to 80 μm.

The inventors of the present invention made studies to reduce pinholes and to prevent the cracking of an embossed battery package and found that an aluminum having an iron content in the range of 0.3 to 9.0% by weight, preferably, in the range of 0.7 to 2.0% by weight is more satisfactory in ductility than aluminum not containing any iron, and an aluminum foil of such aluminum is less subject to the formation of pinholes when a laminated sheet including the aluminum foil of such aluminum is folded and is more capable of facilitating forming walls of an embossed battery package than an aluminum foil of aluminum not containing any iron. Aluminum having an iron content less than 0.3% by weight is unable to form a satisfactorily pinhole-resistant foil and does not have improved formability. Aluminum having an iron content exceeding 9.0% by weight is unsatisfactory in flexibility and affects adversely to the workability of the laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of embossing may be used.

The inventors of the present invention found through studies that a satisfactory packaging laminated sheet can be formed by using an aluminum foil having opposite surfaces coated with chemical conversion coatings formed by chemical conversion treatment as the barrier layer 12. The chemical conversion treatment forms acid-resistant films of a phosphate, a chromate, a fluoride or a triazine thiol compound. Thus the separation of the aluminum foil 12 and the base layer 11 during an embossing process can be prevented, the dissolution and corrosion of the surfaces of the aluminum foil 12, particularly, aluminum oxide films coating the aluminum foil, by hydrogen fluoride produced by the interaction of the electrolyte of the polymer battery module and moisture can be effectively prevented, the adhesive property (wettability) of the surface of the aluminum foil is improved, the separation of the base layer and the aluminum foil can be prevented and the separation of the aluminum foil and the innermost layer due to the effect of hydrogen fluoride produced by the interaction between the electrolyte and moisture can be effectively prevented by the chemical conversion treatment of the aluminum foil.

It was found through experimental chemical conversion treatment using various substances that chemical conversion treatment method using a mixture of a phenolic resin, trivalent chromium phosphate and phosphoric acid has satisfactory effect.

When the packaging laminated sheet is intended for use for forming pouches, only one surface on the side of the innermost layer of the aluminum foil may be processed by the chemical conversion treatment.

When both the surfaces of the aluminum foil are coated with the chemical conversion coatings, the separation of the aluminum foil and the base layer can be prevented when processing the packaging laminated sheet to form an embossed package. The packaging laminated sheet including the aluminum foil having both the surfaces coated with the chemical conversion coatings may be used for forming pouches.

The inventors of the present invention made studies to develop a laminating method capable of laminating layers with stable adhesive strength and have found that the packaging laminated sheet 10 having component layers bonded together with desired adhesive strength can be formed by bonding the base layer 11 to the chemical conversion coating 15a formed on one of the surfaces processed by chemical conversion treatment of the barrier layer 12 by a dry lamination method and forming the adhesive resin layer 13 of a PPa resin and the heat-sealable resin layer 14 of an ERRPP resin by a coextrusion lamination method on the other surface of the barrier layer 12 to form a laminated structure, and heating the laminated structure at a temperature not lower than the softening point of the PPa resin forming the adhesive resin layer 13.

The packaging laminated sheet 10 may be heated by any one of a contact heating method using a hot roller, a hot air heating method using hot air and an infrared heating method using near or far infrared rays, provided that the adhesive resin can be heated at a temperature not lower than the softening point thereof.

The ethylene content of the ERRPP resin forming the heat-sealable resin layer 14 is in the range of 5% to 10% by mol, preferably, in the range of 6% to 8% by mol.

The inventors of the present invention found that the whitening and cracking of the packaging laminated sheet when forming pouches and embossed packages can be prevented by forming the heat-sealable resin layer 14 of an ERRPP resin.

The ERRPP resin for forming the heat-sealable resin layer 14 is flexible as compared with an ordinary RPP resin and hence the same is inferior in sliding property to the ordinary RPP resin. Therefore the heat-sealable resin layer 14 may contain an antiblocking agent (AB agent). The AB agent content of the heat-sealable resin layer 14 is in the range of about 0.1% to about 2.0% buy weight.

When the heat-sealable resin layer 14 consists of the layers 14a and 14b, the inner one of the layers 14a and 14b may contain the AB agent. The AD agent contained in the heat-sealable resin layer 14 reduces the friction coefficient of the surface of the heat-sealable resin layer 14, improves the sliding property of the heat-sealable resin layer 14 and improves the workability of the polymer battery module packaging sheet when forming pouches or embossed packages.

Possible AB agents are inorganic lubricant powders having a mean particle size of 15 μm or below, such as silica powder and zeolite powder, and organic lubricant beads, such as acrylic resin beads and polyester resin beads.

Possible PPa resins for forming the adhesive resin layer 13 are: (1) homopolymers having a melting point of 150° C. or above, (2) ethylene-propylene copolymers (random copolymers) having a Vicat softening point of 105° C. or above and a melting point of 130° C. or above and (3) polymers or blend of polymers produced by acid-modified polymerization using an unsaturated carboxylic acid.

The PPa resin may contain 5% or above of a low-crystalline ethylene-butene copolymer having a density of 900 kg/m$^3$ or below, a low-crystalline propylene-butene copolymer, an amorphous ethylene-propylene copolymer, an amorphous propylene-ethylene copolymer or an ethylene-butene-propylene terpolymer to give the PPa resin film flexibility, to improve bendability and to prevent cracking during a forming process.

Preferably, the heat-sealable resin layer 14 of the packaging laminated sheet of the present invention is formed of an ERRPP resin. Films of an ERRPP resin can be easily bonded together by heat-sealing, meet protective properties including moistureproof property and heat resistance required of the heat-sealable resin layer of a polymer battery module packaging sheet, and have desirable properties suitable for lamination and embossing.

Desirably, the heat-sealable resin layer 14 has a thickness in the range of 30 to 100 μm and is formed of an ERRPP resin having a melting point of 120° C. or above.

The heat-sealable resin layer 14 may be a single film of the ERRPP resin or a multilayer film including at least one layer of the ERRPP resin.

The followings are concrete examples of the construction of the heat-sealable resin layer, in which right-hand end films are those forming the innermost layer facing a polymer battery module.

(1) ERRPP resin film containing AB agent
(2) ERRPP resin film/ERRPP resin film containing AB agent
(3) ERRPP resin film/PP resin film
(4) ERRPP resin film/PP resin film/ERRPP resin film containing AB agent
(5) PP resin film/ERRPP resin film containing AB agent
(6) ERRPP resin film/LLDPE resin film/ERRPP resin film containing AB agent
(7) ERRPP resin film/HomoPP resin film In (1) to (7), ERRPP denotes an ethylene-rich random polypropylene resin, PP denotes a random polypropylene having an ethylene content in the range of 3% to 4% by mol, HomoPP denotes a homopolypropylene resin, LLDPE denotes a linear low-density polyethylene resin, "/" indicates coextrusion.

The heat-sealable layer consisting of the ERRPP resin film and the homoPP resin film (the construction (7)) whitens sometimes when the same is subjected to deep drawing. However, the packaging laminated sheet provided with such a heat-sealable layer has a satisfactory emboss-formability because the homoPP resin film has a high slip property.

Desirably, the base layer 11 of the packaging laminated sheet 10, i.e., the polymer battery module packaging sheet, of the present invention is bonded to the surface of the barrier layer 12 coated with the chemical conversion coating 15a by a dry lamination method.

Possible adhesives for forming the bonding layer 16 used for bonding the base layer 11 to the chemical conversion coating 15a of the barrier layer 12 by dray lamination are polyester adhesives, polyethylene adhesives, polyether adhesives, cyanoacrylate adhesives, urethane adhesives, inorganic titanium compounds, polyether-urethane adhesives, epoxy adhesives, polyester-urethane adhesives, imide adhesives, isocyanate adhesives, polyethylene in adhesives and silicone adhesives.

The packaging laminated sheet, i.e., the polymer battery module packaging sheet, of the present invention may include, in addition to the base layer 11, the barrier layer 12, the adhesive resin layer 13 and the heat-sealable resin layer 14, an intermediate layer sandwiched between the barrier layer 12 and the heat-sealable layer 14 to enhance the strength of the packaging laminated sheet and to improve and stabilize the barrier property of the packaging laminated sheet.

The component layers of the packaging laminated sheet may be processed by a surface activating treatment, such as a corona discharge treatment, a blasting treatment, an oxidation treatment or ozone treatment, to improve and stabilize film faulting property, lamination property, formability (ease of forming pouches or embossed packages).

EXAMPLES

Examples of the packaging laminated sheet in the ninth embodiment will be described hereinafter. The chemical conversion process applies an aqueous solution of a phenolic resin, trivalent chromium fluoride compound and phosphoric acid in a film to the surface of the barrier layer 12 by a roll coating method and baked the film at 180° C. or above. The weight per unit area of the film is 10 mg/m$^2$ (dry weight).

Examples of the polymer battery module packaging sheet will be concretely described.

Packaging laminated sheets in examples were subjected to single-side embossing to form embossed packages each having a hollow part of 30 mm×50 mm×3.5 mm. The formability of the packaging laminated sheets was evaluated.

Examples used a PPa resin produced by acid-modified polymerization using an unsaturated carboxylic acid and containing a RPP resin having a softening point of 105° C. and a melting point of 146° C. as a base resin.

ERRPP resins having an ethylene content of 7% by mol and a melting point of 132° C. were used. RPP resins having an ethylene content of 3% by mol and a melting point of 140° C. were used.

Example 9-1

Pouch

Both the surfaces of a 20 μm thick aluminum foil were subjected to chemical conversion treatment. A 25 μm thick nylon film was laminated to one of the surfaces of the aluminum foil by a dry lamination method. A laminated film of a 20 μm thick Film of a PPa resin as an adhesive resin film and a 30 μm thick film of an ERRPP resin was bonded to the other surface of the aluminum foil by a coextrusion lamination method to form a laminated sheet. The laminated sheet was heated at a temperature not lower than the softening point of the PPa resin to obtain sample packaging laminated sheets in Example 9-1.

Silica powder having a mean particle size of 10 μm was added to the ERRPP resin film in a silica content of 0.1% by weight.

Example 9-2

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick Film of a PPa resin as an adhesive resin film and a 30 μm thick film of an ERRPP resin was bonded to the other surface of the aluminum foil by a coextrusion lamination method to form a laminated sheet. The laminated sheet was heated at a temperature not lower than the softening point of the PPa resin to obtain sample packaging laminated sheets in Example 9-2.

Silica powder having a mean particle size of 10 μm was added to the ERRPP resin film in a silica content of 0.2% by weight.

Example 9-3

Embossed Package

Both the surfaces of a 40 μm thick aluminum foil were subjected to chemical conversion treatment. A 25 μm thick nylon film was laminated to one of the surfaces of the aluminum foil by a dry lamination method. The other surface of the aluminum foil was heated at a temperature not lower than the softening point of a PPa resin for forming the adhesive resin film, and a laminated film of a 20 μm thick Film of a PPa resin as an adhesive resin film and a 30 μm thick film of an ERRPP resin was bonded to the heated surface of the aluminum foil by a coextrusion lamination method to obtain sample packaging laminated sheets in Example 9-3.

Silica powder having a mean particle size of 10 μm was added to the ERRPP resin film in a silica content of 0.2% by weight.

Example 9-4

Embossed Package

Both the surfaces of each of 40 μm thick aluminum foils were subjected to chemical conversion treatment. A 25 μm thick nylon film was laminated to one of the surfaces of each of the aluminum foils by a dry lamination method. Laminated films each of a 20 μm thick film (adhesive resin layer) of a PPa resin and a 30 μm thick film of an ERRPP resin containing one of the following AB agents were formed on the other surfaces of the aluminum foils, respectively, by a coextrusion lamination method to form laminated sheets. The laminated sheets were heated at a temperature not lower than the softening point of the PPa resin to obtain sample packaging laminated sheets in Examples 9-4-1 to 9-4-4.

AB Agents

Example 9-4-1: 0.5% by weight zeolite powder having a mean particle size of 8 μm Example 9-4-2: 1.2% by weight zeolite powder having a mean particle size of 8 μm Example 9-4-3: 0.8% by weight acrylic resin powder having a mean particle size of 10 μm Example 9-4-4: 1.5% by weight acrylic resin powder having a mean particle size of 10 μm

Example 9-5

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick Film of a PPa resin as an adhesive resin film and a 30 μm thick film of an ERRPP resin was bonded to the other surface of the aluminum foil by a coextrusion lamination method to form a laminated sheet. The laminated sheet was heated at a temperature not lower than the softening point of the PPa resin to obtain sample packaging laminated sheets in Example 9-5.

Silica powder having a mean particle size of 10 μm was added to a 5 μm thick ERRPP resin layer serving as the innermost layer of the ERRPP resin film in a silica content of 1.0% by weight.

Comparative Example 9-1

Pouch

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick Film of a PPa resin as an adhesive resin film and a 30 μm thick film of a PP resin having an ethylene content of 3% by weight was bonded to the other surface of the aluminum foil by a coextrusion lamination method to form a laminated sheet. The laminated sheet was heated at a temperature not lower than the softening point of the PPa resin to obtain sample packaging laminated sheets in Comparative example 9-1.

Comparative Example 9-2

Embossed Package

Both the surfaces of a 40 µm thick aluminum foil were subjected to chemical conversion treatment. A 25 µm thick nylon film was laminated to one of the surfaces of the aluminum foil by a dry lamination method. A laminated film of a 20 µm thick Film of a PPa resin as an adhesive resin film and a 30 µm thick film of a RPP resin having an ethylene content of 3% by weight was bonded to the other surface of the aluminum foil by a coextrusion lamination method to form a laminated sheet. The laminated sheet was heated at a temperature not lower than the softening point of the PPa resin to obtain sample packaging laminated sheets in Comparative example 9-2.

Comparative Example 9-3

Embossed Package

Both the surfaces of a 40 µm thick aluminum foil were subjected to chemical conversion treatment. A 25 µm thick nylon film was laminated to one of the surfaces of the aluminum foil by a dry lamination method. A laminated film of a 20 µm thick Film of a PPa resin as an adhesive resin film and a 30 µm thick film of an ERRPP resin was bonded to the other surface of the aluminum foil by a coextrusion lamination method to obtain sample packaging laminated sheets in Example 9-3.

The ERRPP resin film contained silica powder having a mean particle size of 10 µm in 0.2% by weight.

Comparative Example 9-4

Embossed Package

Both the surfaces of a 40 µm thick aluminum foil were subjected to chemical conversion treatment. A 25 µm thick nylon film was laminated to one of the surfaces of the aluminum foil by a dry-lamination method. A laminated film of a 20 µm thick Film of a PPa resin as an adhesive resin film and a 30 µm thick film of an ERRPP resin containing an AB agent was bonded to the other surface of the aluminum foil by a coextrusion lamination method to form a laminated sheet. The laminated sheet was heated at a temperature not lower than the softening point of the PPa resin to obtain sample packaging laminated sheets in Example 9-4.

Pouch Formation, Embossing and Packaging

The sample packaging laminated sheets in Example 9-1 and Comparative example 9-1 were subjected to a pouch forming process to form pouches. The sample packaging laminated sheets in Examples 9-3 to 9-5 and Comparative examples 9-2 to 9-4 were subjected to single-side embossing to form embossed packages each having a hollow part of 55 mm×30 mm×3.5 mm. Polymer battery modules were packaged in the pouches and the embossed packages to form polymer batteries. The polymer batteries were evaluated by the following methods. The width of the sealed parts of the pouches and the embossed packages formed from the packaging laminated sheets in examples and comparative examples was 5 mm.

Evaluating Methods

1) Delamination, Whitening and Cracking During Forming

Samples were inspected for the separation of the base layer and the aluminum foil, whitening and cracking immediately after forming.

2) Chemical Resistance Test

A carbonate solvent containing a lithium salt were sealed in sample pouches and sample embossed packages formed from the packaging laminated sheets in examples and comparative examples and the sample pouches and the sample embossed packages were inspected for the separation of the aluminum foil and the resin layer after keeping the sample pouches and the sample embossed packages in an atmosphere of 60° C. and 90% RH in a thermostat for seven days.

Results

Sample packaging laminated sheets in Examples 9-1 to 9-5 were not whitened and not cracked during pouch formation and embossing. Cracks were formed in the inner surfaces of the bent parts of the fifteen sample pouches out of 100 sample pouches formed from the packaging laminated sheets in Comparative example 9-1. Bends in the fifty sample embossed packages formed from the packaging laminated sheets in Comparative example 9-2 whitened slightly.

The sample embossed packages formed from the packaging laminated sheets in Example 9-3 had no problem at all relating to whitening, cracking and chemical resistance. All the sample packaging laminated sheets in Comparative example 9-3 were delaminated.

The sample packaging laminated sheets in Examples 9-4-1 to 9-4-4, which differ from each other in the type and content of the AB agent, were stable in the embossing process. All the 100 sample packaging laminated sheets in Comparative example 9-4 were creased during the embossing process, and pinholes were formed in the fifteen sample packaging laminated sheets of the same.

The sample embossed packages formed from the packaging laminated sheets in Example 9-5 were not whitened and not cracked and had no problem relating to chemical resistance.

The packaging laminated sheets, i.e., the polymer battery module packaging sheets, of the present invention each provided with the heat-sealable layer of the ERRPP resin neither whiten nor crack when bent to form a pouch and when embossed to form an embossed package. The pouches and embossed packages formed from the packaging laminated sheets of the present invention exhibited remarkably stable sealing performance. The separation of the aluminum foil and the base layer during the heat-sealing process and the embossing process could be prevented by the chemical conversion treatment of both the surfaces of the aluminum foil. The chemical conversion coatings formed on both the surfaces of the aluminum foil prevented the corrosion of the surfaces of the aluminum foil by hydrogen fluoride produced by the interaction of the electrolyte of the polymer battery module and moisture and the separation of the aluminum foil and the layer on the side of the polymer battery module due to the corrosion of the surfaces of the aluminum foil.

Since the ERRPP resin film serving as the heat-sealable resin layer, i.e., the innermost layer, can be bonded to the aluminum foil by the PPa resin, i.e., the adhesive resin, by a coextrusion lamination method, the packaging laminated sheet of the present invention can be manufactured at a high productivity. The heat-sealable resin layer and the aluminum foil can be bonded together by a sufficiently high adhesive strength by subjecting the laminated sheet to postheating or by heating the surface of the aluminum foil when applying the PPa resin to the aluminum foil by a coextrusion lamination method.

Tenth Embodiment

A packaging laminated sheet, i.e., a polymer battery module packaging sheet, in a tenth embodiment according to the present invention has a moistureproof property, and is resistant to the detrimental effects of the polymer battery module and capable of being manufactured at a high productivity. When forming the packaging laminated sheet, the opposite surfaces of a barrier layer are subjected to chemical conversion treatment, an innermost layer is laminated to the barrier layer by a coextrusion lamination method to form a laminated sheet and the laminated sheet is subjected to a heating process to enhance the adhesive strength between the component layers.

The inventors of the present invention made earnest studies to develop such a packaging laminated sheet, and found that the foregoing problems can be solved by subjecting both the surfaces of an aluminum foil to chemical conversion treatment, forming an adhesive resin layer of a PPa resin, such as an unsaturated carboxylic acid graft random acid-modified polypropylene resin, on one of the surfaces of the aluminum foil and forming an innermost layer of an ERRPP resin, and by a packaging laminated sheet manufacturing method including the steps of subjecting both the surfaces of an aluminum foil to chemical conversion treatment, extruding a PPa resin as an adhesive resin onto the inner surface of the aluminum foil, laminating an ERRPP resin film to the aluminum foil by a sandwich lamination method to form a laminated sheet and subjecting the laminated sheet to postheating.

Postheating enhances the adhesive strength between the barrier layer and the adhesive resin layer and between the adhesive resin layer and the innermost layer.

The adhesive strength may be enhanced by a method that heats the surface to which the adhesive resin layer is to be bonded of the aluminum foil at a temperature not lower than the softening point of the PPa resin when extruding the PPa resin onto the surface of the aluminum foil for sandwich lamination.

As shown in FIG. 11(a), a packaging laminated sheet 10, i.e., a polymer battery module packaging sheet, in the tenth embodiment has, as essential components, a base layer 11, a bonding layer 16, a chemical conversion coating 15a, an aluminum foil (aluminum layer) 12, a chemical conversion coating 15b, an adhesive resin layer 13 and a heat-sealable resin layer (innermost layer) 14. The adhesive resin layer 13 is formed of a PPa resin and the heat-sealable resin layer 14 is formed of an ERRPP resin. The heat-sealable resin layer 14 may consist of innermost resin films 14a and 14b as shown in FIG. 11(b). At least either the innermost resin film 14a or 14b may be formed of an ERRPP resin. The adhesive resin layer 13 and the heat-sealable resin layer 14 constitute an innermost layer.

In the sandwich lamination process the surface of the aluminum foil 12 facing the heat-sealable layer 14 is heated at a temperature not lower than the softening point of the PPa resin or the packaging laminated sheet 10 is subjected to postheating to heat the packaging laminated sheet 10 at a temperature not lower than the softening point of the PPa resin. As shown in FIG. 11(a) or 11(b), chemical conversion coatings 15a and 1b are formed on both the surfaces, respectively, of the aluminum foil 12, i.e., the barrier layer, the adhesive resin layer 13 is formed on the inner surface of the aluminum foil 12 by extrusion and the heat-sealable resin layer 14 of the ERRPP resin is bonded to the inner surface of the aluminum foil 12 by the adhesive resin layer 13 by a sandwich lamination method (FIG. 9). The packaging laminate sheet 10 thus formed is subjected to postheating or the inner surface of the aluminum foil 12 is heated at a temperature not lower than the softening point of the PPa resin forming the adhesive resin layer 13.

The packaging laminated sheet 10, i.e., the polymer battery module packaging sheet, in the tenth embodiment has, as essential components, the base layer 11, the chemical conversion coating 15a, the barrier layer 12, i.e., the aluminum foil, the chemical conversion coating 15b, the adhesive resin layer 13 and the heat-sealable resin layer 14. The heat-sealable resin layer 14 is laminated to the aluminum foil 12 by a sandwich lamination method. The heat-sealable layer 14 is a multilayer film including at least one of the layers 14a and 14b of an ERRPP resin.

Materials of the component layers of the laminated sheet 10 and methods of laminating the component layers will be described.

The base layer 11 of the packaging laminated sheet 10 is a film of an oriented polyester resin or an oriented nylon resin. Possible polyester resins are PET resins, PST resins, PEN resins, PBN resins, interpolyester resins, PC resins and the like. Possible nylons, i.e., polyamide resins, are nylon 6, nylon 66, copolymers of nylon 6 and nylon 66, nylon 610, polymethaxylilene adipamide (MXD6) and the like.

When the polymer battery is used on a device (hardware), the base layer 11 touches the device. Therefore, it is desirable to form the base layer 11 of an intrinsically insulating resin. Since a film forming the base layer 11 has pinholes and pinholes will be formed in the film during processing, the thickness of the base layer 11 must be 6 μm or above. Preferably, the thickness of the base layer 11 is in the range of 12 to 25 μm.

The base layer 11 may be a laminated film in view of providing the base layer 11 with a high pinhole-resistant property and an improved insulating ability.

Preferably, the base layer 11 includes at least one resin layer consisting of two or more layers each having a thickness of 6 μm or above, preferably, in the range of 12 to 25 μm. The following laminated structures 1) to 7) are examples of the laminated base layer 11.
1) Oriented PET resin layer/Oriented nylon layer
2) Oriented nylon layer/Oriented PET layer To improve the mechanical aptitude (stability when passed through processing machines and a packaging machine) and surface protecting ability (heat resistance and electrolyte resistance) of the packaging sheet and to reduce friction between a die and the base layer 11 when forming the embossed package body, it is preferable that the base layer 11 consists of plural layers and the surface of the base layer 11 is coated with a coating of a fluorocarbon resin, an acrylic resin or a silicone resin. The base layer 11 may be any one of the following laminated films.
3) Fluorocarbon resin layer/Oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same)

5) Fluorocarbon resin layer/Oriented PET resin layer/Oriented nylon layer

6) Silicone resin layer/Oriented PET resin layer/Oriented nylon layer

7) Acrylic resin layer/Oriented nylon layer (the acrylic resin layer may be an acrylic resin film or a film formed by spreading an acrylic resin and drying the same.)

The barrier layer 12 prevents the penetration of moisture into the polymer battery. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 μm or above and is formed from a foil of a metal, such as aluminum or nickel, or a film coated with an inorganic compound, such as silicon dioxide or alumina, by evaporation. Preferably, the barrier layer 12 is an aluminum foil of a thickness in the range of 20 to 80 μm.

The inventors of the present invention made studies to reduce pinholes and to prevent the cracking of an embossed battery package and found that an aluminum having an iron content in the range of 0.3 to 9.0% by weight, preferably, in the range of 0.7 to 2.0% by weight is more satisfactory in ductility than aluminum not containing any iron, and an aluminum foil of such aluminum is less subject to the formation of pinholes when a laminated sheet including the aluminum foil of such aluminum is folded and is more capable of facilitating forming walls of an embossed battery package than an aluminum foil of aluminum not containing any iron. Aluminum having an iron content less than 0.3% by weight is unable to form a satisfactorily pinhole-resistant foil and does not have improved formability. Aluminum having an iron content exceeding 9.0% by weight is unsatisfactory in flexibility and affects adversely to the workability of the laminated sheet in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of embossing may be used.

The inventors of the present invention found through studies that a satisfactory packaging laminated sheet can be formed by using an aluminum foil having opposite surfaces coated with chemical conversion coatings formed by chemical conversion treatment as the barrier layer 12. The chemical conversion treatment forms acid-resistant films of a phosphate, a chromate, a fluoride or a triazine thiol compound. Thus the separation of the aluminum foil 12 and the base layer 11 during an embossing process can be prevented, the dissolution and corrosion of the surfaces of the aluminum foil 12, particularly, aluminum oxide films coating the aluminum foil, by hydrogen fluoride produced by the interaction of the electrolyte of the polymer battery module and moisture can be effectively prevented, the adhesive property (wettability) of the surface of the aluminum foil is improved, the separation of the base layer and the aluminum foil can be prevented and the separation of the aluminum foil and the innermost layer due to the effect of hydrogen fluoride produced by the interaction between the electrolyte and moisture can be effectively prevented by the chemical conversion treatment of the aluminum foil.

It was found through experimental chemical conversion treatment using various substances that chemical conversion treatment method using a mixture of a phenolic resin, trivalent chromium phosphate and phosphoric acid has satisfactory effect.

When the packaging laminated sheet is intended for use for forming pouches, only one surface on the side of the innermost layer 14 of the aluminum foil 12 may be processed by the chemical conversion treatment.

When both the surfaces of the aluminum foil are coated with the chemical conversion coatings, the separation of the aluminum foil 12 and the base layer 11 can be prevented when processing the packaging laminated sheet to form an embossed package. The packaging laminated sheet including the aluminum foil 12 having both the surfaces coated with the chemical conversion coatings may be used for forming pouches.

The inventors of the present invention made studies to develop a laminating method capable of laminating layers with stable adhesive strength and have found that the packaging laminated sheet 10 having component layers bonded together with desired adhesive strength can be formed by bonding the base layer 11 to the chemical conversion coating 15*a* formed on one of the surfaces processed by chemical conversion treatment of the barrier layer 12 by a dry lamination method forming the adhesive resin layer 13 of a PPa resin and the heat-sealable resin layer 14 of an ERRPP resin by a sandwich lamination method on the other surface of the barrier layer 12 coated with the chemical conversion coating 15*b* to form a laminated structure, and heating the laminated structure at a temperature not lower than the softening point of the PPa resin forming the adhesive resin layer 13.

The packaging laminated sheet 10 may be heated by any one of a contact heating method using a hot roller, a hot air heating method using hot air and an infrared heating method using near or far infrared rays, provided that the adhesive resin can be heated at a temperature not lower than the softening point thereof.

The inner surface of the aluminum foil 12 on the side of the heat-sealable resin layer 14 may be heated at a temperature not lower than the softening point of the PPa resin during sandwich lamination to provided a laminated structure having stable adhesive strength.

The ethylene content of the ERRPP resin forming the heat-sealable resin layer 14 is in the range of 5% to 10% by mol, preferably, in the range of 6% to 8% by mol.

The inventors of the present invention found that the whitening and cracking of the packaging laminated sheet when forming pouches and embossed packages can be prevented by forming the heat-sealable resin layer 14 of an ERRPP resin.

The ERRPP resin for forming the heat-sealable resin layer 14 is flexible as compared with an ordinary RPP resin and hence the same is inferior in sliding property to the ordinary RPP resin. Therefore the heat-sealable resin layer 14 may contain an antiblocking agent (AB agent). The AB agent content of the heat-sealable resin layer 14 is in the range of about 0.1% to about 2.0% buy weight.

When the heat-sealable resin layer 14 consists of the layers 14*a* and 14*b*, the inner one of the layers 14*a* and 14*b* may contain the AB agent. The AB agent contained in the heat-sealable resin layer 14 reduces the friction coefficient of the surface of the heat-sealable resin layer 14, improves the sliding property of the heat-sealable resin layer 14 and improves the workability of the polymer battery module packaging sheet when forming pouches or embossed packages.

Possible AB agents are inorganic lubricant powders having a mean particle size of 15 µm or below, such as silica powder and zeolite powder, and organic lubricant beads, such as acrylic resin beads and polyester resin beads.

Possible PPa resins for forming the adhesive resin layer 13 are: (1) homopolymers having a Vicat softening point of 115° C. or above and a melting point of 150° C. or above, (2) ethylene-propylene copolymers (random copolymers) having a Vicat softening point of 105° C. or above and a melting point of 130° C. or above and (3) polymers or blend of polymers produced by acid-modified polymerization using an unsaturated carboxylic acid.

The PPa resin may contain 5% or above of a low-crystalline ethylene-butene copolymer having a density of 900 kg/m$^3$ or below, a low-crystalline propylene-butene copolymer, an amorphous ethylene-propylene copolymer, an amorphous propylene-ethylene copolymer or an ethylene-butene-propylene terpolymer to give the PPa resin film flexibility, to improve bendability and to prevent cracking during a forming process.

Preferably, the heat-sealable resin layer 14 of the packaging laminated sheet of the present invention is formed of an ERRPP resin. Films of an ERRPP resin can be easily bonded together by heat-sealing, meet protective properties including moistureproof property and heat resistance required of the heat-sealable resin layer of a polymer battery module packaging sheet, and have desirable properties suitable for lamination and embossing.

Desirably, the heat-sealable resin layer 14 has a thickness in the range of 30 to 100 µm and is formed of an ERRPP resin having a melting point of 120° C. or above.

The heat-sealable resin layer 14 may be a single film of the ERRPP resin or a multilayer film including at least one layer of the ERRPP resin.

The followings are concrete examples of the construction of the heat-sealable resin layer, in which right-hand end films are those forming the innermost layer facing a polymer battery module.
(1) ERRPP resin film containing AB agent
(2) ERRPP resin film/ERRPP resin film containing AB agent
(3) ERRPP resin film/PP resin film
(4) ERRPP resin film/PP resin film/ERRPP resin film containing AB agent
(5) PP resin film/ERRPP resin film containing AB agent
(6) ERRPP resin film/LLDPE resin film/ERRPP resin film containing AB agent
(7) ERRPP resin film/HomoPP resin film
In (1) to (7), ERRPP denotes an ethylene-rich random polypropylene resin, PP denotes a random polypropylene having an ethylene content in the range of 3% to 4% by mol, HomoPP denotes a homopolypropylene resin, LLDPE denotes a linear low-density polyethylene resin, "/" indicates coextrusion.

The heat-sealable layer consisting of the ERRPP resin film and the homoPP resin film (the construction (7)) whitens sometimes when the same is subjected to pouch formation. However, the packaging laminated sheet provided with such a heat-sealable layer has a satisfactory emboss-formability because the homoPP resin film has a high slip property.

The packaging laminated sheet 10, i.e., the polymer battery module packaging sheet, of the present invention may include, in addition to the base layer 11, the barrier layer 12, the adhesive resin layer 13 and the heat-sealable resin layer 14, an intermediate layer sandwiched between the barrier layer 12 and the heat-sealable layer 14 to enhance the strength of the packaging laminated sheet and to improve and stabilize the barrier property of the packaging laminated sheet.

The component layers of the packaging laminated sheet 10 may be processed by a surface activating treatment, such as a corona discharge treatment, a blasting treatment, an oxidation treatment or ozone treatment, to improve and stabilize film forming property, lamination property, formability (ease of forming pouches or embossed packages).

Desirably, the base layer 11 of the packaging laminated sheet 10, i.e. the polymer battery module packaging sheet, is bonded to the surface of the barrier layer 12 coated with the chemical conversion coating 15*a* by a dry lamination method.

Possible adhesives for forming the bonding layer 16 used for bonding the base layer 11 to the chemical conversion coating 15*a* of the barrier layer 12 by dray lamination are polyester adhesives, polyethylene adhesives, polyethylene imine adhesives, polyether adhesives, cyanoacrylate adhesives, urethane adhesives, inorganic titanium compounds, polyether-urethane adhesives, epoxy adhesives, polyester-urethane adhesives, epoxy adhesives, polyester-urethane adhesives, imide adhesives, isocyanate adhesives, polyolefin adhesives and silicone adhesives.

EXAMPLES

Examples of the packaging laminated sheet in the tenth embodiment will be described hereinafter. The chemical conversion process applies an aqueous solution of a phenolic resin, trivalent chromium fluoride compound and phosphoric acid in a film to the surface of the barrier layer 12 by a roll coating method and baked the film at 180° C. or above. The weight per unit area of the film is 10 mg/m$^2$ (dry weight).

Examples of the polymer battery module packaging sheet will be concretely described.

Packaging laminated sheets in examples were subjected to single-side embossing to form embossed packages each having a hollow part of 30 mm×50 mm×3.5 mm. The formability of the packaging laminated sheets was evaluated.

Examples used a PPa resin produced by acid-modified polymerization using an unsaturated carboxylic acid and containing a RPP resin having a softening point of 105° C. and a melting point of 146° C. as a base resin.

ERRPP resins having an ethylene content of 7% by mol and a melting point of 132° C. were used. RPP resins having an ethylene content of 3% by mol and a melting point of 140° C. were used.

Example 10-1

Pouch

Both the surfaces of a 20 µm thick aluminum foil were subjected to chemical conversion treatment. A 25 µm thick nylon film was laminated to one of the surfaces of the aluminum foil by a dry lamination method. A laminated film of a 20 µm thick Film of a PPa resin as an adhesive resin film and a 30 µm thick film of an ERRPP resin was bonded to the other surface of the aluminum foil by a sandwich lamination method to form a laminated sheet. The laminated sheet was heated at a temperature not lower than the softening point of the PPa resin to obtain sample packaging laminated sheets in Example 10-1.

Silica powder having a mean particle size of 10 μm was added to the ERRPP resin film in a silica content of 0.2% by weight.

Example 10-2

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick Film of a PPa resin as an adhesive resin film and a 30 μm thick film of an ERRPP resin was bonded to the other surface of the aluminum foil by a sandwich lamination method to form a laminated sheet. The laminated sheet was heated at a temperature not lower than the softening point of the PPa resin to obtain sample packaging laminated sheets in Example 10-2.

Silica powder having a mean particle size of 10 μm was added to the ERRPP resin film in a silica content of 0.2% by weight.

Example 10-3

Embossed Package

Both the surfaces of a 40 μm thick aluminum foil were subjected to chemical conversion treatment. A 25 μm thick nylon film was laminated to one of the surfaces of the aluminum foil by a dry lamination method. The other surface of the aluminum foil was heated at 150° C. by irradiating the same surface with infrared rays and blowing hot air against the same surface while a laminated film of a 20 μm thick Film of a PPa resin as an adhesive resin film and a 30 μm thick film of an ERRPP resin was being bonded to the heated surface of the aluminum foil by a sandwich lamination method to obtain sample packaging laminated sheets in Example 10-3.

Silica powder having a mean particle size of 10 μm was added to the ERRPP resin film in a silica content of 0.2% by weight.

Example 10-4

Embossed Package

Both the surfaces of each of 40 μm thick aluminum foils were subjected to chemical conversion treatment. A 25 μm thick nylon film was laminated to one of the surfaces of each of the aluminum foils by a dry lamination method. Laminated films each of a 20 μm thick film (adhesive resin layer) of a PPa resin and a 30 μm thick film of an ERRPP resin containing one of the following AB agents were formed on the other surfaces of the aluminum foils, respectively, by a sandwich lamination method to form laminated sheets. The laminated sheets were heated at a temperature not lower than the softening point of the PPa resin to obtain sample packaging laminated sheets in Examples 10-4-1 to 10-4-4.

AB Agents

Example 10-4-1: 0.5% by weight zeolite powder having a mean particle size of 8 μm Example 10-4-2: 1.2% by weight zeolite powder having a mean particle size of 8 μm Example 10-4-3: 0.8% by weight acrylic resin powder having a mean particle size of 10 μm Example 10-4-4: 1.5% by weight acrylic resin powder having a mean particle size of 10 μm Example 10-5

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick Film of a PPa resin as an adhesive resin film and a 30 μm thick multilayer film consisting of a 5 μm thick ERRPP resin film, a 20 μm thick PP resin film and a 5 μm thick ERRPP resin film was bonded to the other surface of the aluminum foil by a sandwich lamination method to form a laminated sheet. The laminated sheet was heated at a temperature not lower, than the softening point of the PPa resin to obtain sample packaging laminated sheets in Example 10-5.

Silica powder having a mean particle size of 10 μm was added to the 5 μm thick ERRPP resin film serving as the innermost layer of the multilayer flint in a silica content of 0.2% by weight.

Comparative Example 10-1

Pouch

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick Film of a PPa resin as an adhesive resin film and a 30 μm thick film of a PP resin was bonded to the other surface of the aluminum foil by a sandwich lamination method to form a laminated sheet. The laminated sheet was heated at a temperature not lower than the softening point of the PPa resin to obtain sample packaging laminated sheets in Comparative example 10-1.

Comparative Example 10-2

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick Film of a PPa resin as an adhesive resin film and a 30 μm thick film of a PP resin was bonded to the other surface of the aluminum foil by a sandwich lamination method to form a laminated sheet. The laminated sheet was heated at a temperature not lower than the softening point of the PPa resin to obtain sample packaging laminated sheets in Comparative example 10-2.

Comparative Example 10-3

Embossed Package

Both the surfaces of a 40 μm thick aluminum foil were subjected to chemical conversion treatment. A 25 μm thick nylon film was laminated to one of the surfaces of the aluminum foil by a dry lamination method. A laminated film of a 20 μm thick Film of a PPa resin as an adhesive resin film and a 30 μm thick film of an ERRPP resin was bonded to the other surface of the aluminum foil by a sandwich lamination method to obtain sample packaging laminated sheets in Example 10-3.

The ERRPP resin film contained silica powder having a mean particle size of 10 μm in 0.2% by weight.

Comparative Example 10-4

Embossed Package

Both the surfaces of a 40 μm thick aluminum foil were subjected to chemical conversion treatment. A 25 μm thick nylon film was laminated to one of the surfaces of the aluminum foil by a dry-lamination method. A laminated film of a 20 μm thick Film of a PPa resin as an adhesive resin film and a 30 μm thick film of an ERRPP resin not containing any AB agent was bonded to the other surface of the aluminum foil by a sandwich lamination method to form a laminated sheet. The laminated sheet was heated at a temperature not lower than the softening point of the PPa resin to obtain sample packaging laminated sheets in Example 10-4.

Pouch Formation, Embossing and Packaging

The sample packaging laminated sheets in Example 10-1 and Comparative example 10-1 were subjected to a pouch forming process to form pouches. The sample packaging laminated sheets in Examples 10-2 to 10-5 and Comparative examples 10-2 to 10-4 were subjected to single-side embossing to form embossed packages each having a hollow part of 55 mm×30 mm×3.5 mm. Polymer battery modules were packaged in the 100 poaches of each example and each comparative example and the 100 embossed packages of each example and each comparative example to form polymer batteries. The polymer batteries were evaluated by the following methods. The width of the sealed parts of the pouches and the embossed packages formed from the packaging laminated sheets in examples and comparative examples was 5 mm.

Evaluating Methods

1) Delamination, Whitening and Cracking During Forming

Samples were inspected for the separation of the base layer and the aluminum foil, whitening and cracking immediately after forming.

2) Chemical Resistance Test

A carbonate solvent containing a lithium salt were sealed in sample pouches and sample embossed packages formed from the packaging laminated sheets in examples and comparative examples and the sample pouches and the sample embossed packages were inspected for the separation of the aluminum foil and the resin layer after keeping the sample pouches and the sample embossed packages in an atmosphere of 60° C. and 90% RH in a thermostat for seven days.

Results

Sample packaging laminated sheets in Examples 10-1 to 10-5 were not whitened and not cracked during pouch formation and embossing. Cracks were formed in the inner surfaces of the bent parts of the fifteen sample pouches out of 100 sample pouches formed from the packaging laminated sheets in Comparative example 10-1. Bends in the fifty sample embossed packages formed from the packaging laminated sheets in comparative example 10-2 whitened.

The sample embossed packages formed from the packaging laminated sheets in Example 10-3 had no problem at all relating to whitening, cracking. All the sample packaging laminated sheets in Comparative example 10-3 were delaminated.

The sample packaging laminated sheets in Examples 9-4-1 to 9-4-4, which differ from each other in the type and content of the AB agent, were stable in the embossing process. All the 100 sample packaging laminated sheets in Comparative example 10-4 were creased during the embossing process, and pinholes were formed in the twenty sample packaging laminated sheets of the same.

The sample embossed packages formed from the packaging laminated sheets in Example 10-5 were not whitened and not cracked and had no problem relating to chemical resistance.

The packaging laminated sheets, i.e., the polymer battery module packaging sheets, of the present invention each provided with the heat-sealable layer of the ERRPP resin neither whiten nor crack when bent to form a pouch and when embossed to form an embossed package. The pouches and embossed packages formed from the packaging laminated sheets of the present invention exhibited remarkably stable sealing performance. The separation of the aluminum foil and the base layer during the heat-sealing process and the embossing process could be prevented by the chemical conversion treatment of both the surfaces of the aluminum foil. The chemical conversion coatings formed on both the surfaces of the aluminum foil prevented the corrosion of the surfaces of the aluminum foil by hydrogen fluoride produced by the interaction of the electrolyte of the polymer battery module and moisture and the separation of the aluminum foil and the layer on the side of the polymer battery module due to the corrosion of the surfaces of the aluminum foil.

Since the ERRPP resin film serving as the heat-sealable resin layer, i.e., the innermost layer, can be bonded to the aluminum foil by the PPa resin, i.e., the adhesive resin, by a sandwich lamination method, the packaging laminated sheet of the present invention can be manufactured at a high productivity. The heat-sealable resin layer and the aluminum foil can be bonded together by a sufficiently high adhesive strength by subjecting the laminated sheet to postheating or by heating the surface of the aluminum foil when applying the PPa resin to the aluminum foil by a sandwich lamination method.

What is claimed is:
1. A polymer battery module packaging sheet comprising:
a laminate body forming an embossed type outer packaging, the laminate body including at least a substrate layer formed of a nylon film, a first adhesive layer, a first chemical conversion layer, an aluminum layer, a second chemical conversion layer, a second adhesive layer, and an innermost layer that are laminated in this order;
wherein:
the aluminum layer is formed of annealed aluminum having an iron content of 0.3 to 9.0 percent by weight, and the innermost layer is formed of cast polypropylene that contains 5% or above of a low-crystalline propylene-butene copolymer or an ethylene-butene-propylene terpolymer,
the first chemical conversion layer and the second chemical conversion layer are formed by performing a phosphoric acid chromate treatment comprising applying a film of an aqueous solution comprising a phenolic resin, a trivalent chromium fluoride compound, and phosphoric acid to surfaces of the alu- minum layer and heating the aluminum layer at a surface temperature in a range of from 170 to 200° C., the laminate body further includes an intermediate layer arranged between the aluminum layer and the innermost layer, the aluminum layer has a thickness of from 40 μm to 80 μm; and an ozonated surface is formed on the second adhesive layer.

2. The polymer battery module packaging sheet according to claim 1, wherein the first adhesive layer and the second adhesive layer are formed by performing dry lamination method.

3. The polymer battery module packaging sheet according to claim 1, wherein the aqueous solution consists essentially of water, the phenolic resin, the trivalent chromium fluoride compound, and the phosphoric acid.

4. The polymer battery module packaging sheet according to claim 1, wherein a dried weight of the film is about 10 mg/m$^2$.

* * * * *

UNITED STATES PATENT AND TRADEMARK OFFICE
CERTIFICATE OF CORRECTION

PATENT NO. : 9,537,120 B2
APPLICATION NO. : 13/495740
DATED : January 3, 2017
INVENTOR(S) : Takanori Yamashita et al.

It is certified that error appears in the above-identified patent and that said Letters Patent is hereby corrected as shown below:

On the Title Page

Item (75), Inventors, change "Rikiyama Yamashita" to --Rikiya Yamashita--

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*